United States Patent
Weinstock et al.

(10) Patent No.: US 6,223,143 B1
(45) Date of Patent: Apr. 24, 2001

(54) QUANTITATIVE RISK ASSESSMENT SYSTEM (QRAS)

(75) Inventors: Robert M Weinstock; Carol S Smidts, both of Bethesda; Ali Mosleh, Columbia; Yung-Hsien Chang, Hyattsville; Sankaran Swaminathan; Francisco J Groen, both of College Park; Zhibin Tan, Beltsville, all of MD (US)

(73) Assignee: The United States Government as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/143,969

(22) Filed: Aug. 31, 1998

(51) Int. Cl.$^7$ ............................................. G06N 7/00
(52) U.S. Cl. .................................. 703/17; 714/1; 705/7
(58) Field of Search ................................ 703/1, 6, 7, 8, 703/13, 17; 714/1, 25, 26; 705/7

(56) References Cited

U.S. PATENT DOCUMENTS

| | | |
|---|---|---|
| 4,870,575 | 9/1989 | Rutenberg . |
| 4,998,208 | 3/1991 | Buhrow et al. . |
| 5,421,004 | 5/1995 | Carpenter et al. . |
| 5,508,928 | 4/1996 | Tran . |
| 5,519,618 | 5/1996 | Kastner et al. . |
| 5,548,718 | 8/1996 | Seigel et al. . |
| 5,570,280 | 10/1996 | Nunnally et al. . |
| 5,586,252 | 12/1996 | Barnard et al. . |
| 5,604,841 | 2/1997 | Hamilton et al. . |
| 5,636,124 | 6/1997 | Rischar et al. . |
| 5,655,074 | 8/1997 | Rauscher . |
| 5,798,950 | * 8/1998 | Fitzgerald ............................ 703/17 |

OTHER PUBLICATIONS

*CAFTA For Windows, Fault Tree Analysis System*, User's Manual, Version 3.1, Jul. 1995, 170 pages, Electric Power Research Institute, Palo Alto, California and Science Applications International Corporation, Los Altos, California.

*Probabilistic Risk Assessment of the Space Shuttle, A Study of the Potential of Losing the Vehicle During Nominal Operation, vol. I: Final Report*, prepared by Science Applications International Corporation, Advanced Technology Division, New York, NY, Feb. 28, 1995, N95–26398, 159 pages.

(List continued on next page.)

Primary Examiner—Kevin J. Teska
Assistant Examiner—Kyle J. Choi

(57) ABSTRACT

A quantitative risk assessment system (QRAS) builds a risk model of a system for which risk of failure is being assessed, then analyzes the risk of the system corresponding to the risk model. The QRAS performs sensitivity analysis of the risk model by altering fundamental components and quantifications built into the risk model, then re-analyzes the risk of the system using the modifications. More particularly, the risk model is built by building a hierarchy, creating a mission timeline, quantifying failure modes, and building/editing event sequence diagrams. Multiplicities, dependencies, and redundancies of the system are included in the risk model. For analysis runs, a fixed baseline is first constructed and stored. This baseline contains the lowest level scenarios, preserved in event tree structure. The analysis runs, at any level of the hierarchy and below, access this baseline for risk quantitative computation as well as ranking of particular risks. A standalone Tool Box capability exists, allowing the user to store application programs within QRAS.

28 Claims, 34 Drawing Sheets

OTHER PUBLICATIONS

*Probabilistic Risk Assessment of the Space Shuttle, A Study of the Potential of Losing the Vehicle During Nominal Operation, vol. II: Integrated Loss of Vehicle Model*, prepared by Science Applications International Corporation, Advanced Technology Division, New York, NY, Feb. 28, 1995, N95–26399, 579 pages.

*Probabilistic Risk Assessment of the Space Shuttle, A Study of the Potential of Losing the Vehicle During Nominal Operation, vol. III: Basic Events & Minimal Cutsets*, prepared by Science Applications International Corporation, Advanced Technology Division, New York, NY, Feb. 28, 1995, N95–26400, 355 pages.

*Probabilistic Risk Assessment of the Space Shuttle, A Study of the Potential of Losing the Vehicle During Nominal Operation, vol. IV: System Models and Data Analysis*, prepared by Science Applications International Corporation, Advanced Technology Division, New York, NY, Feb. 28, 1995, N95–26401, 436 pages.

*Probabilistic Risk Assessment of the Space Shuttle, A Study of the Potential of Losing the Vehicle During Nominal Operation, vol. V: Auxiliary Shuttle Risk Analysis*, prepared by Science Applications International Corporation, Advanced Technology Division, New York, NY, Feb. 28, 1995, N95–26403, Parts 1 and 2, 736 pages.

* cited by examiner

FIG. 9

OTIs

By Subsystem
Subsystem A:
OTI1 start & stop
OTI2 start & stop
●

●

●

OTI k

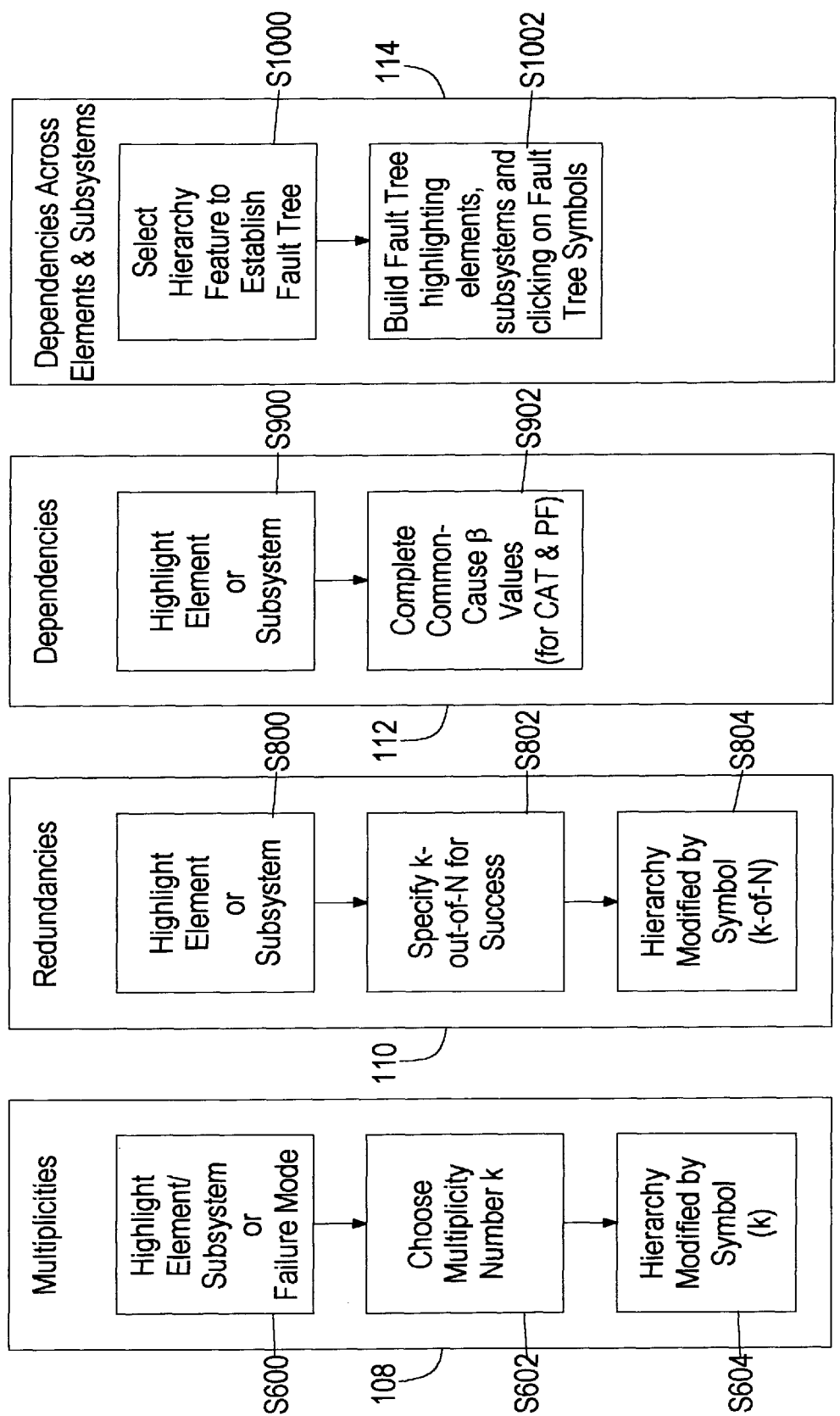

Note: Design{Options for Selecting Risk Ranking o Ranking by Scenario
    o mean     o median     o uncertainty o Ranking by Failure Mode/Initiating Event
    o mean     o median     o uncertainty o Ranking by Elements/Subsystems
{For Clusters, display: o    both clusters and singleton
                       o    only the singleton representative
                             of a cluster
                       o    only the cluster-exclude singleton
                             representatives of cluster} o Ranking by Single Point Failures (i.e, singleton scenarios only)
    o mean     o median     o uncertainty

QUANTITATIVE RISK ASSESSMENT SYSTEM (QRAS)

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention relates generally to risk analysis systems, and, in particular, to computer-based risk assessment systems.

2. Description of the Related Art

The prior art includes many software tools, primarily CAFTA, ETA, RISKMAN, and IRRAS. In addition, performing risk analysis through the construction of fault trees is known.

The state-of-the-art in risk assessment software is now described. The current software packages/systems for probabilistic risk assessment (PRA) utilize a fault-tree model approach, an event tree model approach, or event trees with fault trees attached to branch points. Two main examples are CAFTA for WINDOWS and Riskman. Other software of the same genre includes IRRAS—with the WINDOWS based version called SAPPHIRE.

The fundamental problem with fault trees, though, is they only provide an upper bound to the true risk (and this is not a least upper bound). Riskman and CAFTA use fault trees. CAFTA is essentially a large fault tree program. Riskman uses top level event trees and, in general, hangs fault trees at the branch points.

Therefore, the Quantitative Risk Assessment System (QRAS) model of the present invention, as explained herein below, gives a better approximation to the true but unknown risk.

From a structural point of view, a fault tree only looks at the base events and creates cut sets, and then finds the minimal cut sets. However, none of the prior art software handles all of the elements simultaneously. The prior art software does not allow one to change an element (a failure mode or a failure mode quantification) and have it changed everywhere it applies. If one changes the set up of a system in CAFTA, the prior generated cut sets still exist (in file form).

On the other hand, in QRAS of the present invention, as explained herein below, if a user changes the structure (e.g., a failure mode or a failure mode quantification) of the system for which risk is being analyzed, then the baseline will be removed and all analysis runs pertaining to it will not exist. (More particularly, in QRAS of the present invention, the user must first supply a password to delete the baseline. Alternatively in QRAS of the present invention, the entire project can be saved and a new project created by a copy/paste function or simply by using WINDOWS Explorer, and then this new project can be modified.) That is, in QRAS of the present invention, all of the analysis runs will not exist unless the entire model is preserved unchanged. In CAFTA, on the other hand, a cut set file can exist, even though one can then change the original fault tree model and the cut set file, although inaccurate, refers both to the old system (because it has the refer-back name), but it does not really apply because the system has changed.

In addition, event sequence diagrams are known. Also known are failure modes, as are demand-based and time-based quantifications of failure modes, such as point estimate/uncertainty distribution, writing the probability (P) as a function of variables, logistic regression for P, limit state functions, exponential with uncertainty in $\lambda$, piecewise exponential, weibull—with uncertainty on $\beta$, $\eta$, standby redundancy, conditional probability (exponential), and conditional probability (weibull).

Also known is risk ranking individually by mean, by median, and by uncertainty (for a scenario or a failure mode). No software makes a distinction between scenarios that immediately propagate to failure (i.e., single point failures) and scenarios with one or more pivotal events, as in the present invention. No software internally collects the probabilities of failure over scenarios and then ranks the individual elements or subsystems using those fundamental units of failure, as in the present invention. A singleton, which is an initiating event followed immediately by an end state, itself is known, but the present invention allows an immediate determination of what are those single point failures (i.e., singletons).

There are, in addition, WINDOWS-based software programs for creating and analyzing reliability block diagrams, and for incorporating uncertainties. There is also WINDOWS-based software for failure modes and effects analysis, etc.

However, there is no conventional risk assessment software incorporating as a unit the following: ease-of-use; the availability of as many quantification methods; the linkage via a hierarchy (with plain text for names) to a time-based quantification and the abilities to store documentation; and perform sensitivity analysis (linked to original risk analysis)—as in the present invention.

Although each individual quantification or statistical method used by QRAS of the present invention is known, the combination of these methods used as they are in QRAS of the present invention is unique. Moreover, there is no other software that handles event sequence diagrams (ESDs) and automatically translates the ESDs into event trees, as in the present invention.

Further, the prior art systems are not particularly user-friendly. More specifically, none of the prior art systems allows the range of failure probability characterizations as in the present invention, none are based on a hierarchical arrangement with the features as in the present invention, none include a WINDOWS-based event-sequence diagram builder to automatically create event trees, as in the present invention. In addition, the prior art systems include limited sensitivity analysis capabilities. Also, and most importantly, the prior art systems do not integrate the above-mentioned features in a cohesive, simple, yet powerful platform.

SUMMARY OF THE INVENTION

An object of the present invention is to provide a user-friendly risk analysis system.

Another object of the present invention is to provide a large range of failure probability characterizations generally, and, in particular, for engineering applications.

A further object of the present invention is to provide user-friendly, WINDOWS-based screen features such as event sequence diagram generation.

Yet another object of the present invention is to provide a risk analysis system with an easily-understood and generated hierarchical decomposition of systems.

Yet a further object of the present invention is to provide a risk analysis system as a totally integrated package.

The present invention is a computer-based software system which assesses risk at the failure mode, subsystem, and element (i.e., a group of subsystems) levels, based upon user supplied quantifications of failure modes, event sequences, system decomposition, and system operating times. The present invention is executed on a workstation in a WINDOWS environment, allowing access to the features and functions of the present invention from either a main menu screen or top level screen options, by use of either a mouse or keyboard input.

The software system of the present invention provides features and functions such as building an element/subsystem/failure mode hierarchy (herein after also referred to as an element/subsystem hierarchy or a hierarchy); creating a mission timeline; performing failure mode quantification; building and quantifying event sequence diagrams (ESDs); including multiplicities, dependencies, and redundancies; creating a fixed baseline (all lowest level simulations, stored); and performing sensitivity analyses, all based upon user input.

In the present invention, the above-mentioned features and functions are fully integrated with each other. More particularly, the present invention integrates features such as the mission time line, an event sequence diagram generator, failure probability characterizations, and sensitivity analyses. For example, the present invention includes integration of failure modes with the time line, the event sequences, the failure probability characterizations, the analyses to compute risk and rank individual risks, and the sensitivity analysis.

Further, the present invention includes an entire sensitivity or "what if" package allowing modifications of system or failure mode probabilities, times of operation, and event scenarios to assess how risks could be mitigated.

In addition, the present invention executes multiple projects, and provides a "copy/paste" feature across multiple projects to allow upgraded or system replacements to be examined by a particular project.

The present invention also provides links to other, conventional, commercial off-the-shelf software products, which links provide input from the present invention directly to the commercial off-the-shelf products and receive into the present invention input directly from the commercial off-the-shelf products.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 shows the parameters by which the OTIs are defined by the present invention;

FIG. 15A is a flowchart 108 of including multiplicities in the QRAS 12 of the present invention;

FIG. 15B is a flowchart 110 of including redundancies in the QRAS 12 of the present invention;

FIG. 15C is a flowchart 112 of including dependencies in the QRAS 12 of the present invention;

FIG. 15D is a flowchart 114 of dependencies across elements 64 and subsystems 66 included in the QRAS 12;

FIG. 17 shows options 118 for selecting risk ranking provided by the Create Fixed Baseline 56 and Generate Analysis Runs 58 modules of the present invention;

DESCRIPTION OF THE PREFERRED EMBODIMENTS

Figure 1:
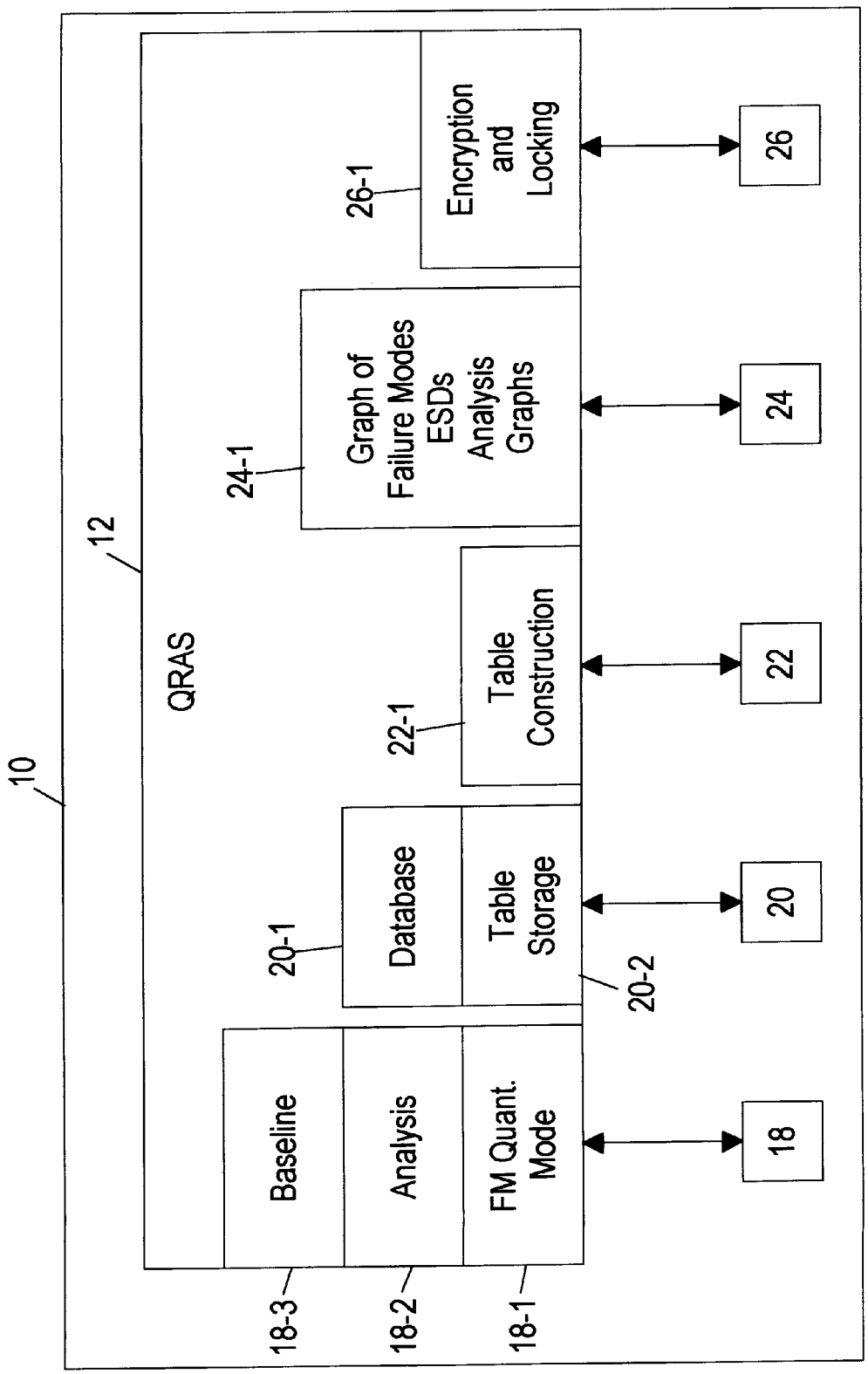
FIG. 1 is a logical diagram of a software system 10 which includes the QRAS (Quantitative Risk Assessment System) 12 of the present invention and a toolbox 16.

FIG. 1 is a logical diagram of a software system 10 which includes the QRAS (Quantitative Risk Assessment System) 12 of the present invention and a toolbox 16.

More particularly, the QRAS 12 is preferably written in C++ (Borland), with the user interface and screen development performed in DELPHI (Borland). Toolbox 16, which is a set of internal codes/programs called by QRAS 12 rather than actual "tools", includes conventional programs such as MATHEMATICA (Wolfram Research) for equation resolution, PARADOX (Borland) for database management, ORPHEUS (TurboPower Software) for table construction, SLGGRAPH (SLG Data Systems and Analysis) for graph generation, and SAPPHIRE (Michael P. Johnson) for encryption and locking.

Both the QRAS 12 and the conventional commercial, off-the-shelf software packages included in the toolbox 16 are preferably running under the WINDOWS 95 operating system.

The particular functions within QRAS 12 to which the conventional commercial, off-the-shelf software packages included in toolbox 16 interface are mentioned with reference to FIG. 1, and are explained herein below during the detailed description of QRAS 12 beginning with reference to FIG. 4.

As shown in FIG. 1, QRAS 12 interfaces to MATHEMATICA 18 to construct a Failure Mode (FM) Quantitative Mode 18-1, perform analyses 18-2, and to baseline 18-3 the analyses 18-2 within QRAS 12. The failure mode quantitative mode function 18-1 resides in the Quantify Failure Modes/Documentation module 50 and in the Build and Quantify ESDs module 52 shown in FIG. 4; the perform analyses function 18-2 is a file of stored analyses (i.e., the quantitative results, the scenarios, and their ranking) and resides in the Generate Analysis Runs module 58 shown in FIG. 4; and the baseline function 18-3 is a datafile containing scenarios, run at the lowest level and stored, and resides in the Create Fixed Baseline module 56 shown in FIG. 4.

Likewise, QRAS 12 interfaces to PARADOX 20 for database management 20-1 and table storage 20-2. The database management function 20-1 is the database supporting the build hierarchy module 46 shown in FIG. 4; the Create Mission Timeline module 48 shown in FIG. 4; the Quantify Failure Modes/Documentation module 50 shown in FIG. 4; the Build and Quantify ESDs module 52 shown in FIG. 4; the Generate Analysis Runs module 58 shown in FIG. 4; and the Perform Sensitivity Analysis module 60 shown in FIG. 4.

Further, QRAS 12 interfaces to ORPHEUS 22 for table construction 22-1 within QRAS 12. QRAS 12 also interfaces to SLGGRAPH 24 for graphing failure mode probabilities, constructing event sequence diagrams (ESDs), and developing analysis graphs 24-1 within QRAS 12. The analysis graphs function 24-1 applies to, and supports, the Quantify Failure Modes/Documentation module 50 shown in FIG. 4; the Build and Quantify ESDs module 52 shown in FIG. 4; and the Generate Analysis Runs module 58 shown in FIG. 4.

In addition, QRAS 12 interfaces to SAPPHIRE 26 for encryption and locking 26-1 performed within QRAS 12. The encryption and locking function 26-1 is called from the "file" menu, and applies to and supports the Build Hierarchy module 46 shown in FIG. 4; the Create Mission Timeline module 48 shown in FIG. 4; the Quantify Failure Modes/Documentation module 50 shown in FIG. 4; the Build and Quantify ESDs module 52 shown in FIG. 4; and the Create Fixed Baseline module 56 shown in FIG. 4.

MATHEMATICA 18, PARADOX 20, ORPHEUS 22, SLGGRAPH 24, and SAPPHIRE 26 are conventional and are known in the art.

As will be apparent from the description that follows, QRAS 12 provides a seamless integration to the above-mentioned commercial, off-the-shelf software packages included in the toolbox 16. QRAS 12 initiates execution of any and all of the commercial, off-the-shelf software packages included in the toolbox 16 and incorporates the output of the commercial, off-the-shelf software packages included in toolbox 16 into the QRAS 12.

The QRAS 12 of present invention can be executed by any WINDOWS 95—based workstation or equivalent, although QRAS 12 is designed to run on a 200 mhz personal computer in a WINDOWS 95 environment. Ideally, a 15 or 17 inch monitor should be used, and the screen resolution must be set to 1024×768.

Figure 2:
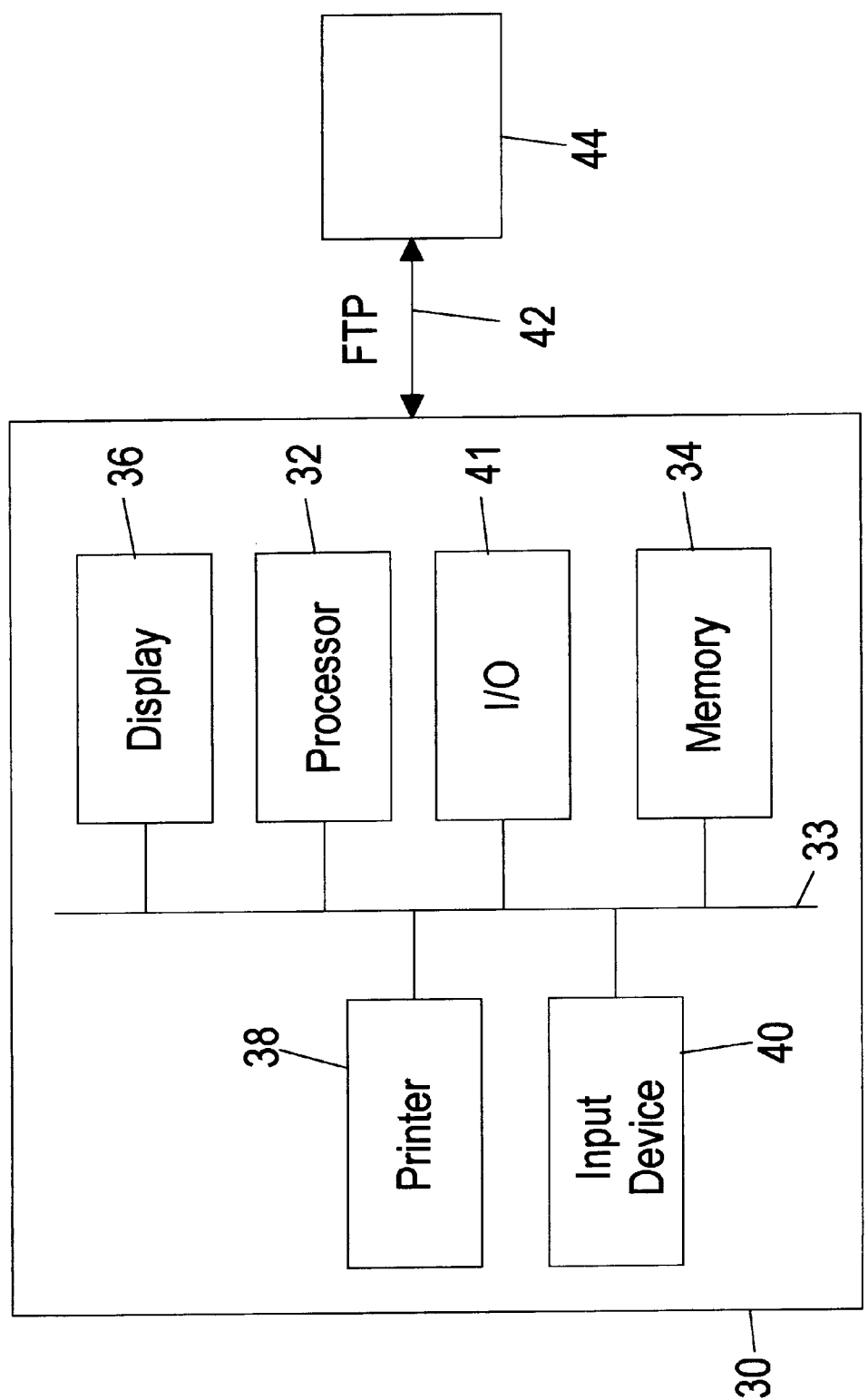
FIG. 2 shows an example of a conventional workstation 30 executing QRAS 12 of the present invention.

An example of a conventional workstation 30 executing QRAS 12 of the present invention is shown in FIG. 2. As shown in FIG. 2, workstation 30 includes a processor 32 executing the software system 10 (which includes QRAS 12 of the present invention); a memory 34 storing the software system 10; user interfaces such as a display 36, a printer 38, and an input device 40; and I/O device 41, all coupled to each other by bus 33. In the present invention, the input device includes a keyboard and/or a mouse.

Also shown in FIG. 2 is a communication line 42 interfacing to another workstation 44, preferably using File Transfer Protocol (FTP). In the present invention, multiple users may contribute to and supply the above-mentioned quantifications of failure modes, event trees, system decomposition, and system operating times developed on another workstation 44 to the QRAS 12 residing on the workstation 30 through communication line 42, or by providing same on, for example, a diskette.

Figure 3:
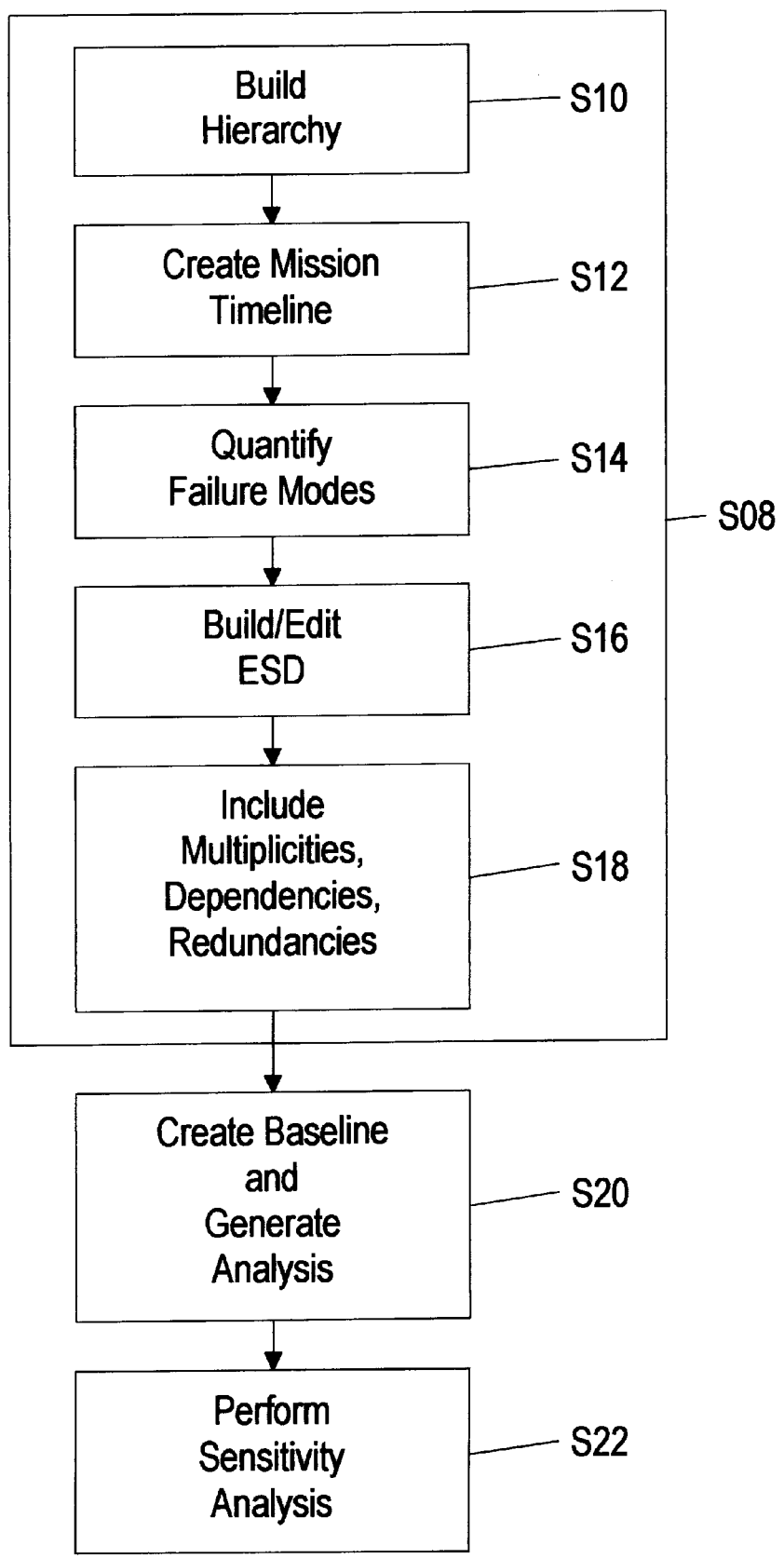
FIG. 3 is a flow chart of the functions executed by the QRAS 12 of the present invention.

The QRAS 12 performs three high-level functions, including building a risk model, running an analysis, and running sensitivity analyses. FIG. 3 is a flow chart of the functions executed by the QRAS 12: a risk model is built in step S08; an analysis is run in step S20; and sensitivity analyses are run in step S22.

Referring now to FIG. 3, the QRAS 12 in step S08 builds the risk model. More particularly, in step S10, an element/ subsystem/failure mode hierarchy is constructed. Then, in step S12, a mission timeline is created. Next, in step S14, failure modes are quantified. In step S16, event sequence diagrams are then built or edited. Multiplicities, dependencies, and redundancies are included in step S18.

In step S20, a system baseline is created, and a failure analysis is generated. Sensitivity analysis is performed in step S22.

The above-mentioned steps are explained in further detail with reference to corresponding modules shown in FIG. 4 and executing the steps.

Figure 4:
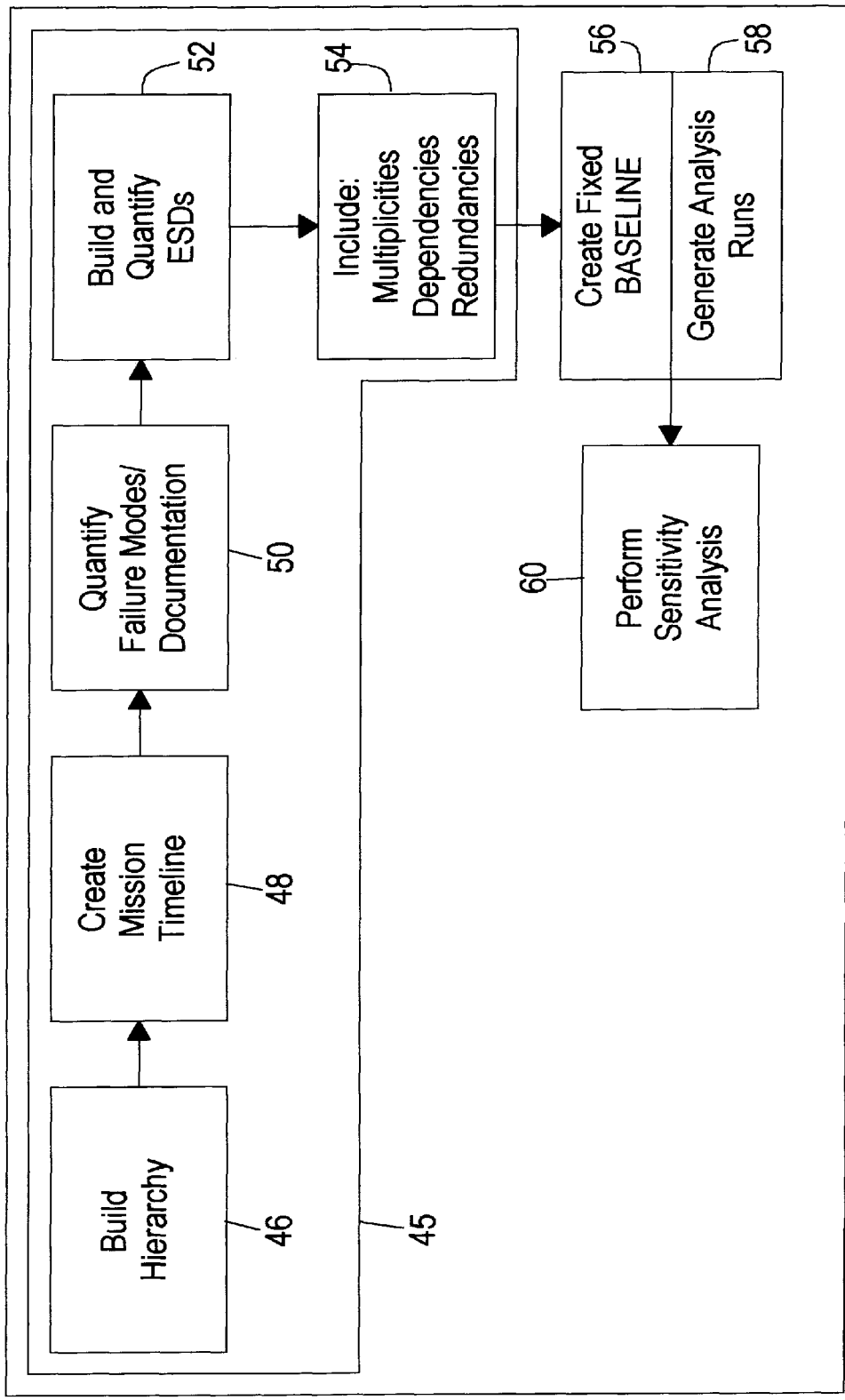
FIG. 4 is a top level design/flow of the QRAS 12 of the present invention.

FIG. 4 is a top level design/flow of the QRAS 12 of the present invention. As shown in FIG. 4, the QRAS 12 builds the risk model using the build risk model module 45. The build risk model module corresponds to the build risk model step S08 shown in FIG. 3. More particularly, the QRAS 12 builds a hierarchy with the build hierarchy module 46, then creates a mission timeline with the create mission timeline module 48, quantifies failure modes with the quantify failure modes/documentation module 50, builds/edits event sequence diagrams with the build and quantify ESDs module 52, and includes multiplicities, dependencies, and redundancies with the Include: Multiplicities, Dependencies, Redundancies module 54. The foregoing modules 46–54 shown in FIG. 4 correspond, respectively, to steps S10–S18 shown in FIG. 3.

Analysis runs are generated by QRAS 12 by the create fixed baselines 56/generate analysis runs 58 module of the QRAS 12, corresponding to the create baseline and generate analysis step S20 of FIG. 3.

Sensitivity analysis is performed by the perform sensitivity analysis module 60, corresponding to the perform sensitivity analysis step S22 shown in FIG. 3. Sensitivity analysis is performed by altering sensitivities (which are discussed in further detail herein below). The risk analyses are re-run with the altered sensitivities. Although not shown in FIG. 4, but explained in further detail herein below, each of functions 46–60 of the QRAS 12 is initiated and modified by a user either from a main menu from which one or more of the functions 46–60 is selected, or through selection of one or more of functions 46–60 from a tool bar displayed on each screen of the QRAS 12. The operation and flow of modules 46–60 is explained in further detail herein below.

Figure 5A:
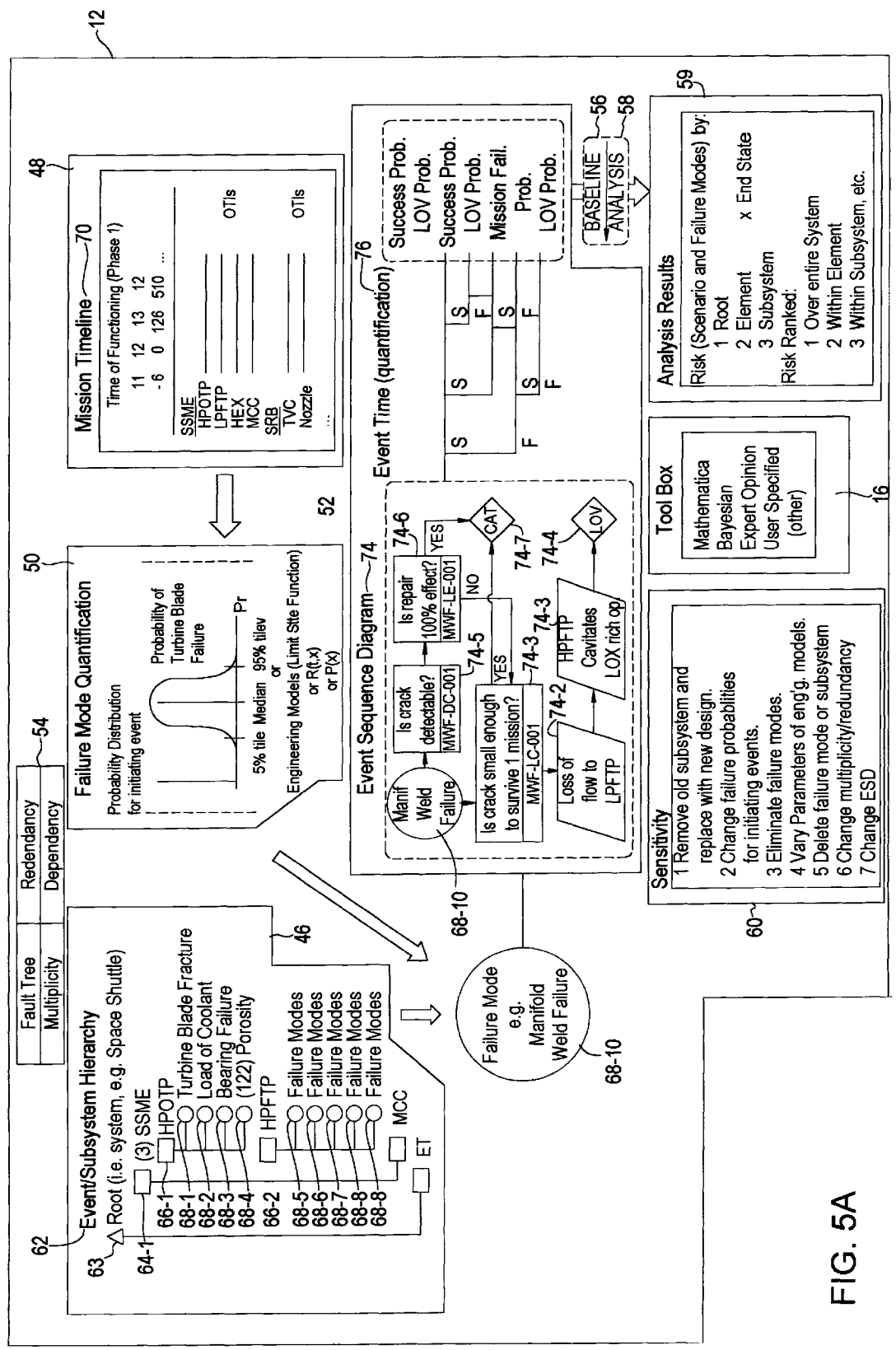
FIG. 5A is a graphical depiction of the top level architecture of the QRAS 12 of the present invention, showing examples of output generated by modules 46–60 of the QRAS 12 of the present invention.

Beginning with FIG. 5A, the present invention is explained using examples of risk analysis based upon the Space Shuttle. It will be appreciated by those skilled in the art that the present invention is applicable to any engineered hardware complex system, including engineering systems, the failure analysis of which can be characterized by element/subsystem/failure mode hierarchy.

FIG. 5A is a graphical depiction of the top level architecture of the QRAS 12 of the present invention, showing examples of output generated by modules 46–60 of the QRAS 12. The multiplicities, dependencies, and redundancies module 54 shown separately in FIG. 4 also includes a fault tree and is integrated into the functions shown in FIG. 5A, as explained in further detail with reference to FIGS. 13, 14A, 14B, and 15A–D.

As shown in FIG. 5A, the build hierarchy module 46 of FIG. 4 develops an element/subsystem/failure mode hierarchy 62 based upon user input. The element/subsystem/failure mode hierarchy 62 includes a root 63, which corresponds to and uniquely identifies a system being analyzed by the QRAS 12. In the example shown in FIG. 5A, the root 63 corresponds to the Space Shuttle.

The hierarchy 62, which is a hierarchical decomposition of the system, is then broken down into more specific subsystems, two of which are shown in FIG. 5A as SSME (Space Shuttle main engine) 64-1 and ET (external tank) 64-2.

The hierarchy 62 includes the root 63 (the top level of the system to be analyzed), elements 64 (collections of subsystems), subsystems 66, and failure modes 68. In the QRAS 12, the system 63 is broken down into its component parts, and at the lowest level, failure modes 68 are associated with these parts.

Using the Space Shuttle as an example, the root 63 would be the Space Shuttle itself, and the elements 64 are the Space Shuttle Main Engines (SSMEs) 64-1, the External Tank (ET) 64-2, the Solid Rocket Boosters (SRBs) (not shown in FIG. 5A), the Solid Rocket Motors (SRMs) (not shown in FIG. 5A), and the Orbiter (not shown in FIG. 5A).

The subsystems 66 below the SSME include, for example, the High Pressure Oxidizer Turbopump (HPOTP) 66-1 and 66-2, Main Combustion Chamber (MCC), 66-3, etc. Failure modes for the HPOTP 66-1 include turbine blade fracture 68-1, bearing failure 68-2, beating failure 68-3, porosity 68-4, etc. As part of the SSME (element 64-1), the number "(3)" is indicated as the multiplicity number. Likewise, as part of the porosity (failure mode 68-4), the number "(122)" is indicated as the multiplicity number. The multiplicity number is explained in detail with reference to FIG. 13.

Once constructed, the hierarchy 62 appears on the left side of most screens of the QRAS 12, and serves as a navigator. For example, once a specific failure mode 68 is selected by the user (by pointing the mouse to a specific failure mode 68 and clicking on that failure mode), and then subsequent operations pertain only to that failure mode 68. In the example shown in FIG. 5A, the failure mode of a manifold weld failure 68-10 is shown.

As shown in FIG. 5A, after creating the hierarchy 62, the create mission timeline module 46 creates a mission timeline 70 based upon user input. The time line 70 establishes the mission phases and the time intervals for each subsystem's operation (these time intervals are referred to as operational time intervals, or OTIs). The phases are the main time segments for which the user wishes to estimate risk. For example, the phases for the Space Shuttle are "Ascent," "On-orbit," and "Reentry." Since the OTIs indicate times of operation, any time-distributed failure densities use these times to compute probabilities.

After creating the hierarchy 62 and the mission time line 70, the quantify failure modes/documentation module 50 quantifies the failure modes 72 based upon user input. As shown in FIG. 5A, failure mode quantification 72 may be in the form of a probability distribution (as shown), engineering models, or as functions well-known to those of ordinary skill in the art.

Next, the QRAS 12 creates an event sequence diagram 74 for each failure mode 68 through the build and quantify ESDs module 52. In the event sequence diagram 74 shown in FIG. 5A, a series of queries (74-1 through 74-7 in the example shown in FIG. 5A) are performed to determine whether the manifold weld failure 68-10 leads to a catastrophic result (CAT) or to a loss of vehicle (LOV). To quantify the ESD by the build and quantify ESDs module 52, an event tree 76 is then constructed corresponding to each event sequence diagram 74, indicating whether each pathway shown in the event tree leads to success (S) or failure (F) of the system being analyzed.

Next, the hierarchy 62, the mission timeline 70, the failure mode quantification 72, the event sequence diagram 74, and the event tree 76 are baselined by the create fixed baseline module 56. An analysis is run by the generate analysis runs module 58, over the selected phases and level of the hierarchy 62 (for example, the level may be the Space Shuttle Main Engines (SSMEs) so that results are obtained at the SSME level and all levels below it).

Analysis results 59 obtained by the generate analysis runs module 58 are shown in FIG. 5A. As shown in FIG. 5A, the user may select risk (scenario and failure modes) by root, element, or subsystem, and may view the risk ranked over the entire system, within an element, or within a subsystem, using the QRAS 12.

QRAS 12 also provides the function of allowing the user to modify failure mode values, eliminate failure modes, replace subsystems with other models, etc., and view risk analysis based thereon, in what is referred to as sensitivity runs, which are executed by the Sensitivity Analysis module 60. More particularly, the sensitivity analysis module 60 removes the old (baselined) subsystem and replace it with a new design, changes failure possibilities for initiating events, eliminates failure modes, varies parameters of engineering models, deletes a failure mode or a subsystem, changes multiplicity and/or redundancy, and changes event sequence diagrams, all based upon user input.

The toolbox 16 available to the user through the QRAS 12 includes conventional commercial programs such as MATHEMATICA, BAYESIAN, EXPERT OPINION, or other, user-specified, capabilities for inclusion into the above-mentioned features.

Therefore, as shown in FIG. 5A, for a given system, and based upon user input, QRAS 12: creates a hierarchy and mission time line; then quantifies the failure modes (with point estimate probabilities and uncertainties); draws event sequence diagrams showing the potential progression of events given failure; and with this model, runs risk analyses using the Analysis and Sensitivity modules.

Figure 5B:
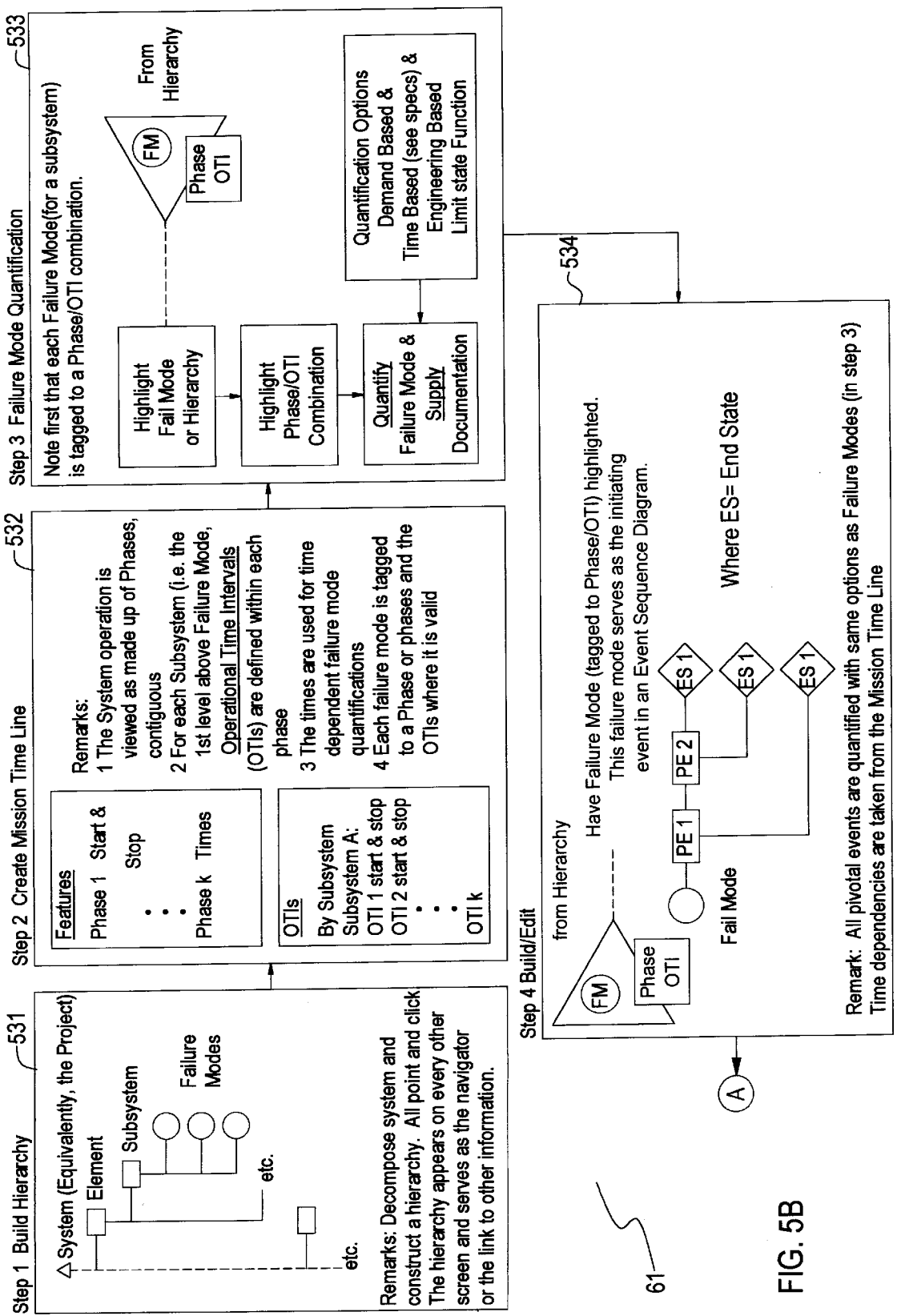
FIGS. 5B–D are flow charts showing the global design of QRAS 12 of the present invention, including the architecture and information flow.
Figure 5C:
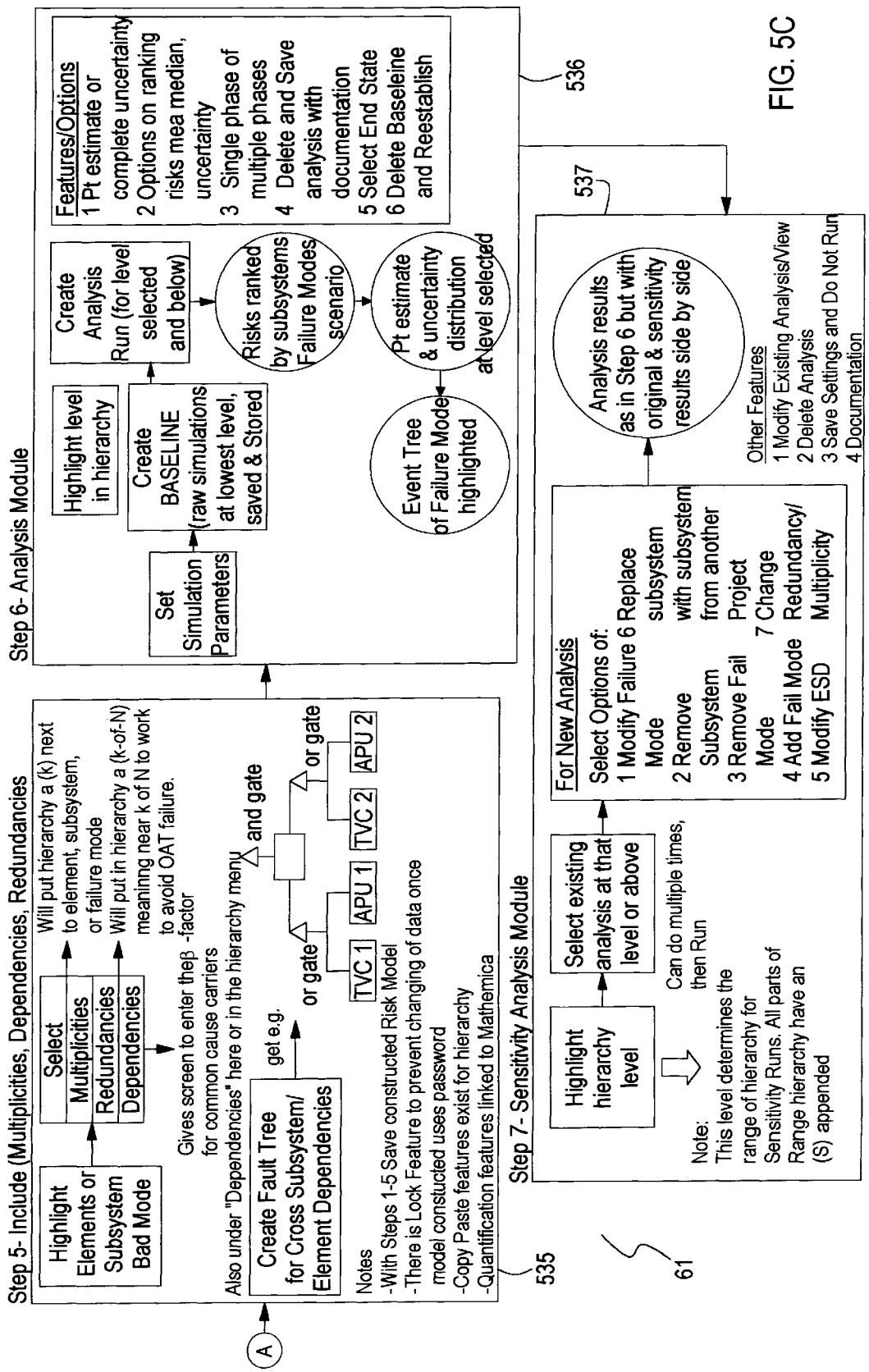
Figure 5D:
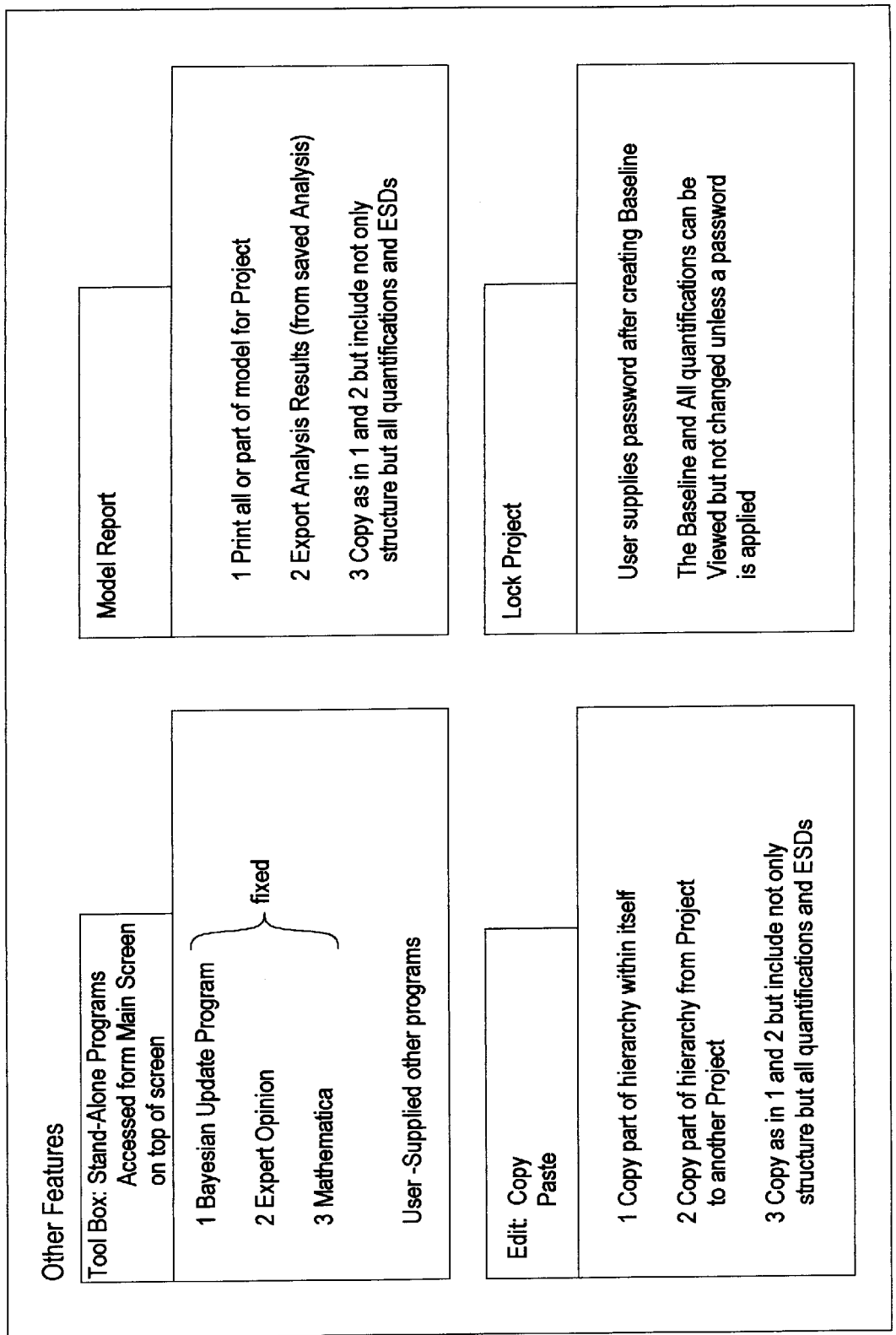

FIGS. 5B–D show a flow chart showing the global design of QRAS 12 of the present invention, including the architecture and information flow shown in Steps 1–6 (FIGS. 5B and 5C) and other features (FIG. 5D). Steps 1–6 of the flow of QRAS 12 (numbered as steps S31–S37, respectively) and the other features of QRAS 12 (numbered as step S38) are shown graphically in FIGS. 5B–D and are explained in detail with reference to FIGS. 6–20.

More particularly, step S31 of FIG. 5B corresponds to the Build Hierarchy step S10 shown previously in FIG. 3 and to the Build Hierarchy module 46 shown previously in FIGS. 4 and 5A, and is explained in detail with reference to FIG. 6. Step S32 of FIG. 5B corresponds to the Create Mission Timeline step S12 shown previously in FIG. 3 and to the Create Mission Timeline module 48 shown previously in FIGS. 4 and 5A, and is explained in detail with reference to FIGS. 7–9. Step S33 of FIG. 5B corresponds to the Quantify Failure Modes step S14 shown previously in FIG. 3 and to the Quantify Failure Modes/Documentation module 50 shown previously in FIGS. 4 and 5A, and is explained in detail with reference to FIG. 10. Step S34 of FIG. 5B corresponds to the Build/Edit ESD step S16 shown previously in FIG. 3 and to the Build and Quantify ESDs module 52 shown previously in FIGS. 4 and 5A, and is explained in detail with reference to FIGS. 11 and 12.

Step S35 of FIG. 5C corresponds to the Include Multiplicities, Dependencies, and Redundancies step S18 shown previously in FIG. 3 and to the Include: Multiplicities, Dependencies, and Redundancies module 54 shown previously in FIGS. 4 and 5A, and is explained in detail with reference to FIGS. 13, 14A, 14B, and 15A–15D.

Step S36 of FIG. 5C corresponds to the Create Fixed Baseline and Generate Analysis step S20 shown previously in FIG. 3 and to the Create Fixed Baseline module 56 and to the Generate Analysis Runs module 58 shown previously in FIGS. 4 and 5A, and is explained in detail with reference to FIGS. 16 and 17. Step S37 of FIG. 5C corresponds to the Perform Sensitivity Analysis step S22 shown previously in FIG. 3 and to the Perform Sensitivity Analysis module 60 shown previously in FIGS. 4 and 5A, and is explained in detail with reference to FIG. 18. Step S38 of FIG. 5D corresponds to the tool box 16 shown previously in FIG. 5A, and is explained in detail with reference to FIGS. 19 and 20A–C.

Next, each of QRAS 12 modules 46–60 are explained in detail.

Figure 6:
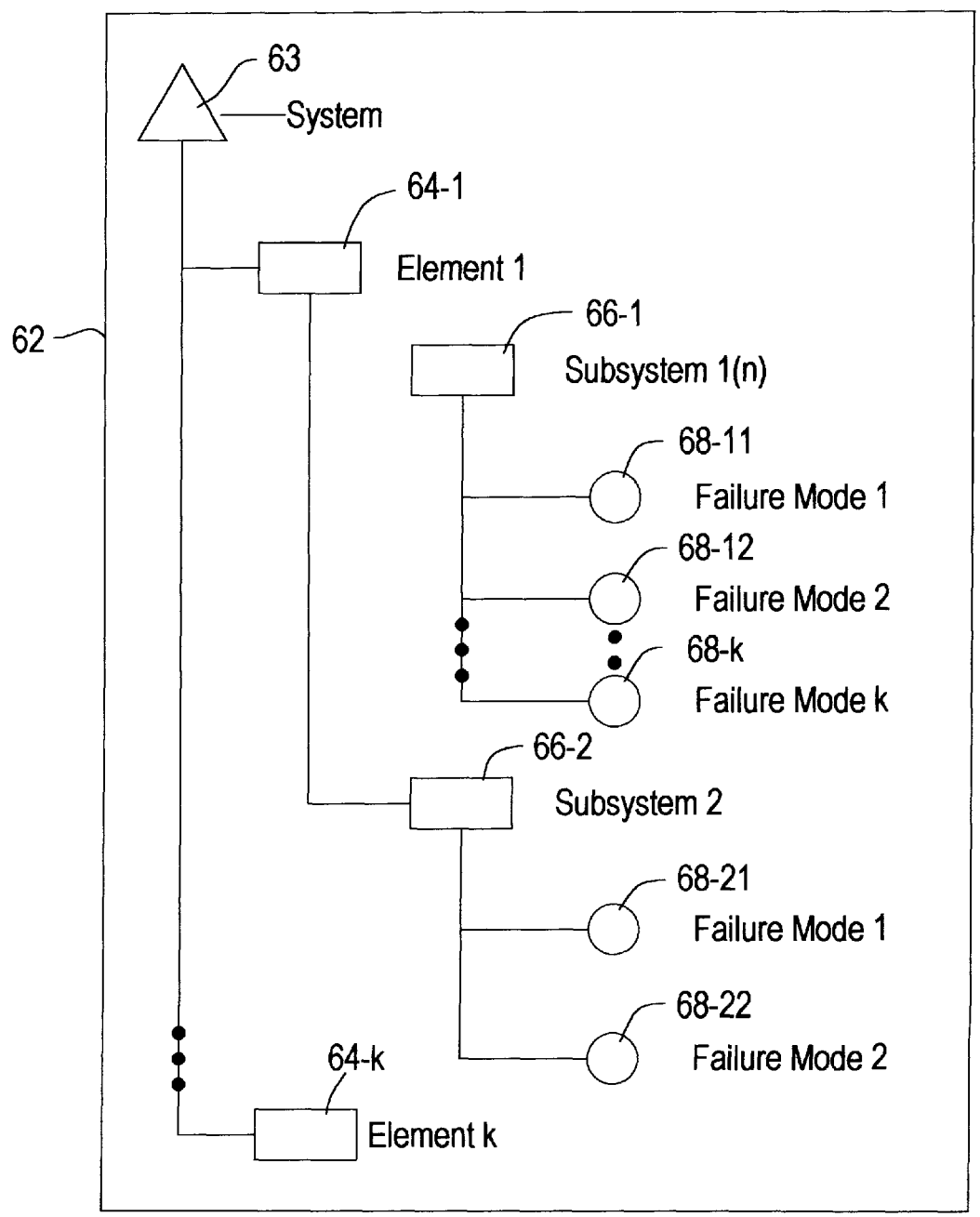
FIG. 6 is a diagram of an element/subsystem/failure mode hierarchy 62 produced by the build hierarchy module 46 of the QRAS 12 of the present invention shown in FIG. 4.

FIG. 6 is a diagram of an element/subsystem/failure mode hierarchy 62 produced by the build hierarchy module 46 of the QRAS 12 shown in FIG. 4. The build hierarch module 46 corresponds to the build hierarchy step S10 shown in FIG. 3.

As shown in FIG. 6, the element/subsystem/failure mode hierarchy 62 includes a root 63 (corresponding to a system). The root 63 includes k elements, 64-1 through 64-k. Each element 64 includes subsystems 66, and each subsystem 66 includes failure modes 68.

The build hierarchy module 46 builds the element/subsystem/failure mode hierarchy 62 based upon user input. The build hierarchy module 46 decomposes a system and constructs the element/subsystem/failure mode hierarchy 62, based upon user input. Using the build hierarchy module 46 and based upon user input, the QRAS 12 establishes a system (or root) 63, then adds an element 64-1 to the root 63, adds a subsystem 66-1 to the element 64-1, and adds failure modes 68-11 through 68-1k to element 64-1. Likewise, QRAS 12 renames or deletes any or all of the system 63, the elements 64, the subsystems 66, and the failure modes 68, using the build hierarchy module 46 and user input thereto.

Also based upon user input, the build hierarchy module 46 moves up or down all or part of the element/subsystem/failure mode hierarchy 62, stores, accesses and displays documentation and images of the elements 64 and subsystems 66 provided therewith, and displays a fault tree constructed by the build hierarchy module 46 from the element/subsystem/failure mode hierarchy 62.

In addition, the element/subsystem/failure mode hierarchy 62 appears on every other screen displayed by the QRAS 12 as a navigator, and links to features and functions provided in other modules of the QRAS 12 by allowing the user to highlight (by pointing and clicking using a mouse) as a symbol the system 63, any of the elements 64, any of the subsystems 66, or any of the failure modes 68. The element/subsystem/failure mode hierarchy 62 uses the highlighted symbol as a reference link to the other functions.

The build hierarchy module 46, through user input, copies (or pastes) all or part of the hierarchy 62 to another project (not shown in FIG. 6) or within the same project 63. In this regard, the build hierarchy module 46 provides the functions of "Paste", which copies only the structure of the hierarchy 62, and "Paste special", which copies the structure of the hierarchy 62 and all quantifications 72 and event sequence diagrams 74.

Figure 7:
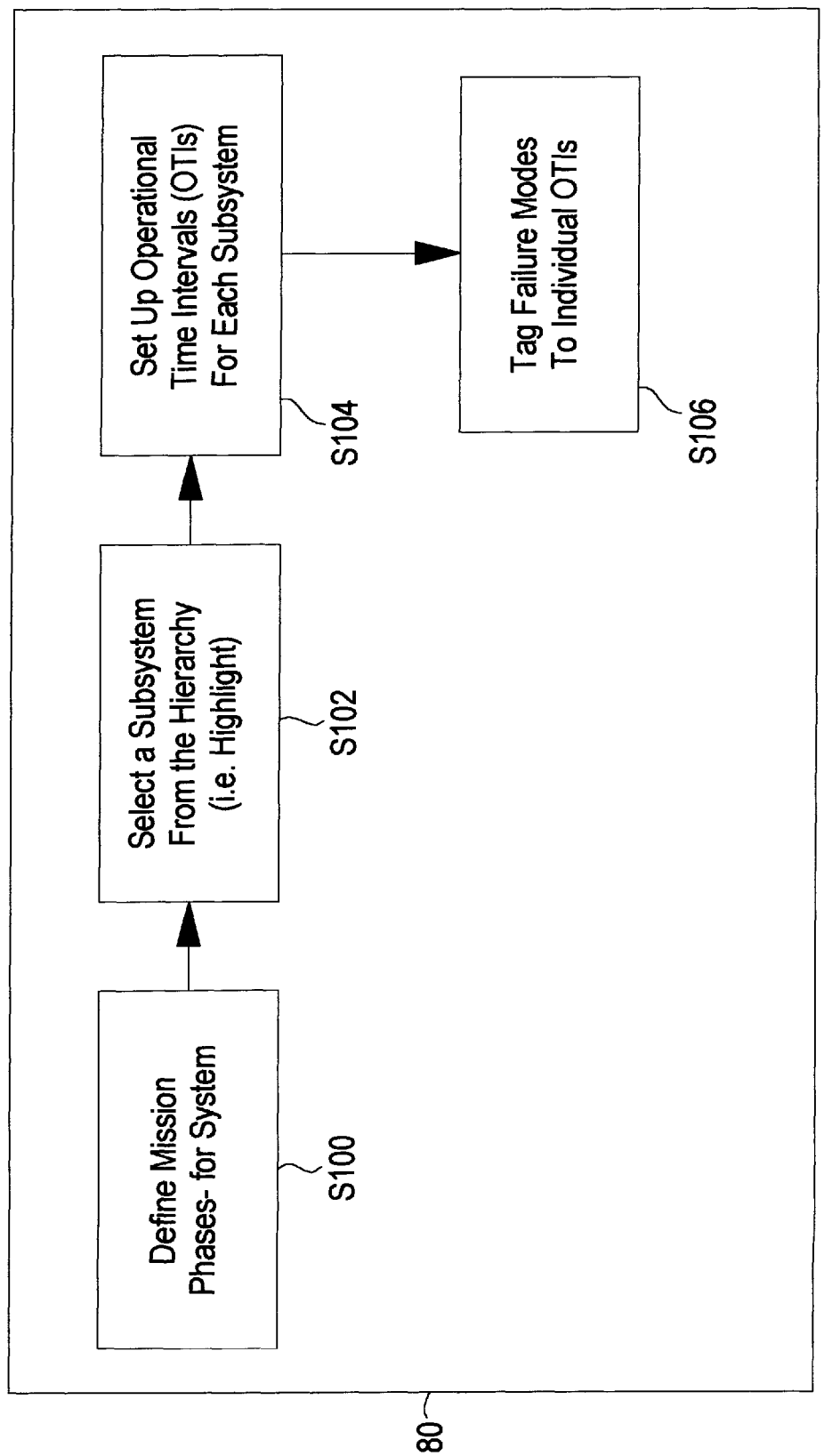
FIG. 7 is a flowchart 80 of the steps carried out by the create mission timeline module 48 of FIG. 4, corresponding to the create mission timeline step S12 of FIG. 3, of the present invention.

FIG. 7 is a flowchart 80 of the steps carried out by the create mission timeline module 48 of FIG. 4, corresponding to the create mission timeline step S12 of FIG. 3.

As shown in FIG. 7, the create mission timeline module 48, in step S100, defines mission phases based upon user input. Mission phase definition is discussed in further detail, with reference to FIG. 8.

Next, in step S102, the create mission timeline module 48 selects a subsystem 66 from the hierarchy 62, by highlighting by the user the subsystem 66 on a screen displayed by the create mission timeline module 48, typically by pointing to the subsystem 66 with a mouse and clicking on the subsystem 66.

In step S104, the create mission timeline module 48 sets up operational time intervals (OTIs) for each subsystem, based upon user input. OTIs are discussed in further detail with reference to FIG. 9. Then, in step S106, failure modes are tagged to individual OTIs by the create mission timeline module 48.

After completion of step S106, each project (or system 62) has distinct phases of operation, and, for each failure mode, the OTIs are designated within each phase.

The create mission timeline module 48 adds or deletes one or more phases, adds or deletes one or more OTIs, and tags a failure mode to an OTI, based upon user input.

Figure 8:
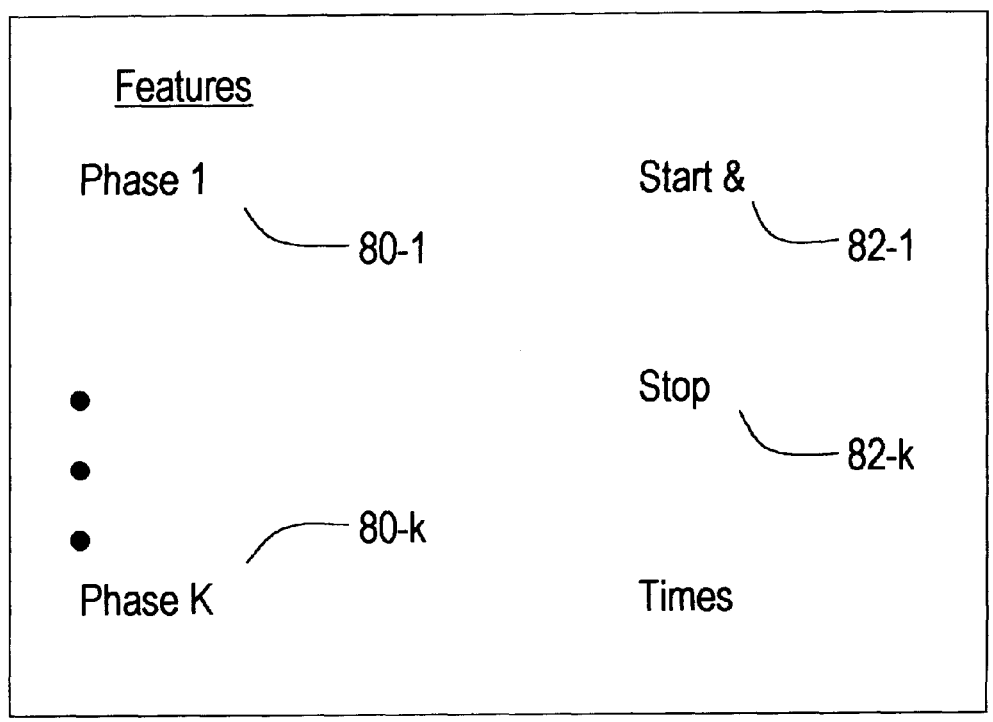
FIG. 8 shows the features of the phases defined in the create mission timeline module 48 of the present invention.

FIG. 8 shows the features of the phases defined in the create mission timeline module 48. The operation of the system 63 for which risk is being assessed by the QRAS 12 is viewed as comprising contiguous phases. As shown in FIG. 8, start and stop times 82-1 through 82-k corresponding to each of phases 1 through k (80-1 through 80-k) for the system are defined by the user and input into QRAS 12. The phases may overlap with each other.

FIG. 9 shows the parameters by which the OTIs are defined. For each subsystem 66, OTIs are defined within each phase. The OTIs are used for time dependent failure mode quantifications, explained herein below.

In the create mission timeline module 48, each failure mode is tagged to (or associated with) a phase or phases and the OTIs where valid.

The mission phase times and OTI times may run from −x to +y. That is, the mission phase times and OTI times can be negative numbers, if desired. In the Space Shuttle, for example, the ascent phase runs from −5 minutes to +13 minutes.

Figure 10:
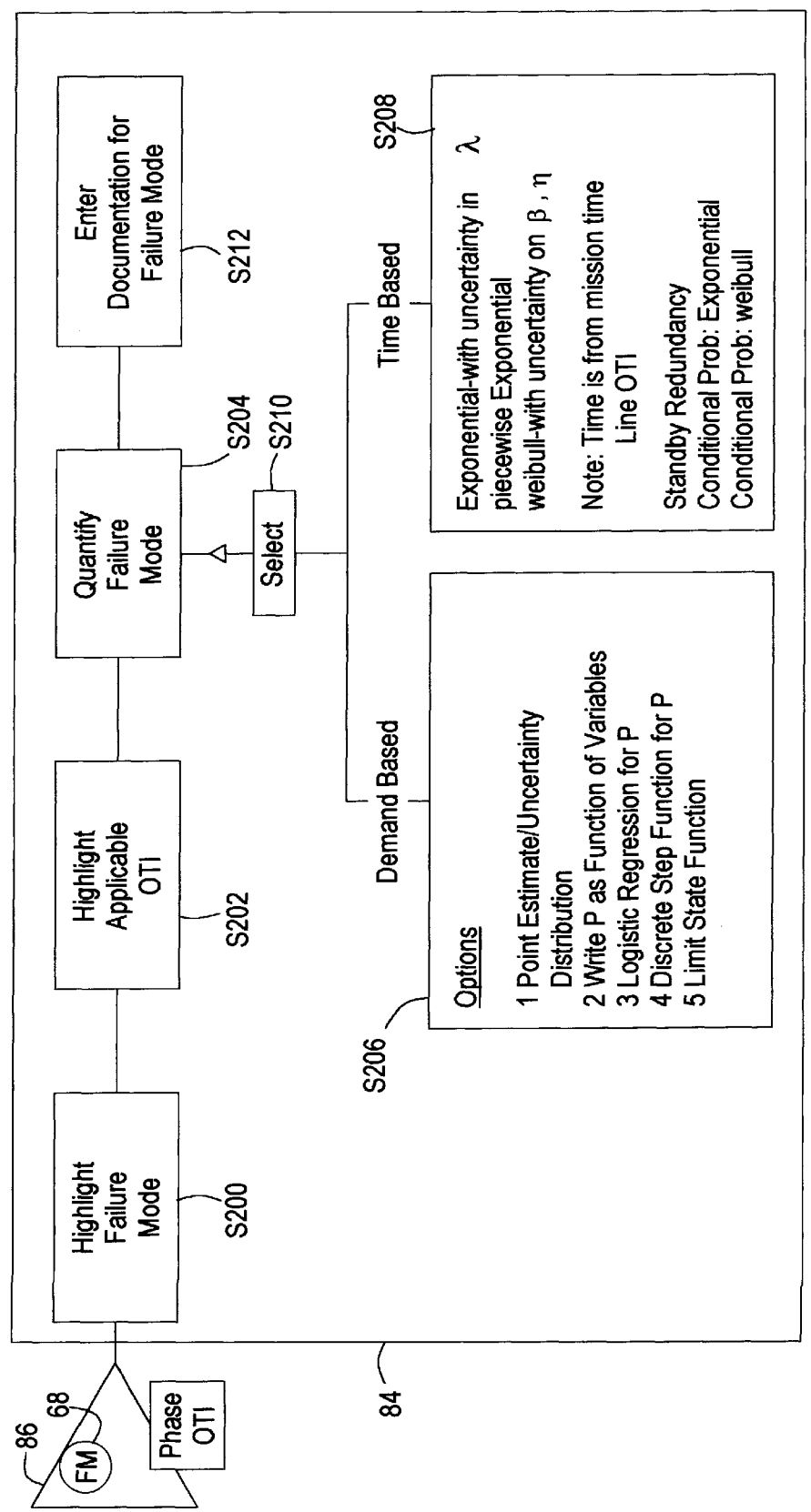
FIG. 10 is a flowchart 84 of the functions provided by the Quantify Failure Modes/Documentation module 50 of the present invention shown in FIG. 4.

FIG. 10 is a flowchart 84 of the functions provided by the Quantify Failure Modes/Documentation module 50 shown in FIG. 4. The Quantify Failure Modes/Documentation module 50 corresponds to, and implements the functions provided in, the quantify failure modes step S14 shown in FIG. 3.

As shown in FIG. 10, a failure mode is highlighted in step S200. The highlighted failure mode 86 is input from the hierarchy 62, and includes a combination of the failure mode 68, the phase, and the OTI. Likewise, the applicable, corresponding OTI is highlighted in step S202.

Failure modes are then quantified in step S204. Failure modes are either demand based or time based. Demand based failure modes are shown in step S206, and include point estimate/uncertainty distribution, writing the probability (P) as a function of variables, a logistic regression for P, a discrete step function for P, or a limit state function.

On the other hand, time based failure modes are shown in step S208. As shown in step S208, time based failure modes include exponential, with uncertainty in λ; piecewise exponential; wiebull, with uncertainty on β, η; standby redundancy; conditional probability: exponential; and conditional probability: weibull. Further, engineering based limit state function and expressing the probability of failure directly as a function of physical variables (and their uncertainties) are provided. Time input is from the mission time line OTI. The β is the fraction of all failures of a unit (e.g., subsystem or element) which occur concurrently with other identical units due to a common cause. The QRAS 12 assumes that all units fail simultaneously, and that $0 \leq \beta \leq 1$.

A selection is then made in step S210, between the demand based failure mode and the time based failure mode.

Documentation for the failure mode is then entered, in step S212. Documentation includes explanations and assumptions provided by an engineer quantifying the failure mode. The documentation is stored in QRAS 12, and includes images as well as text.

Figure 11:
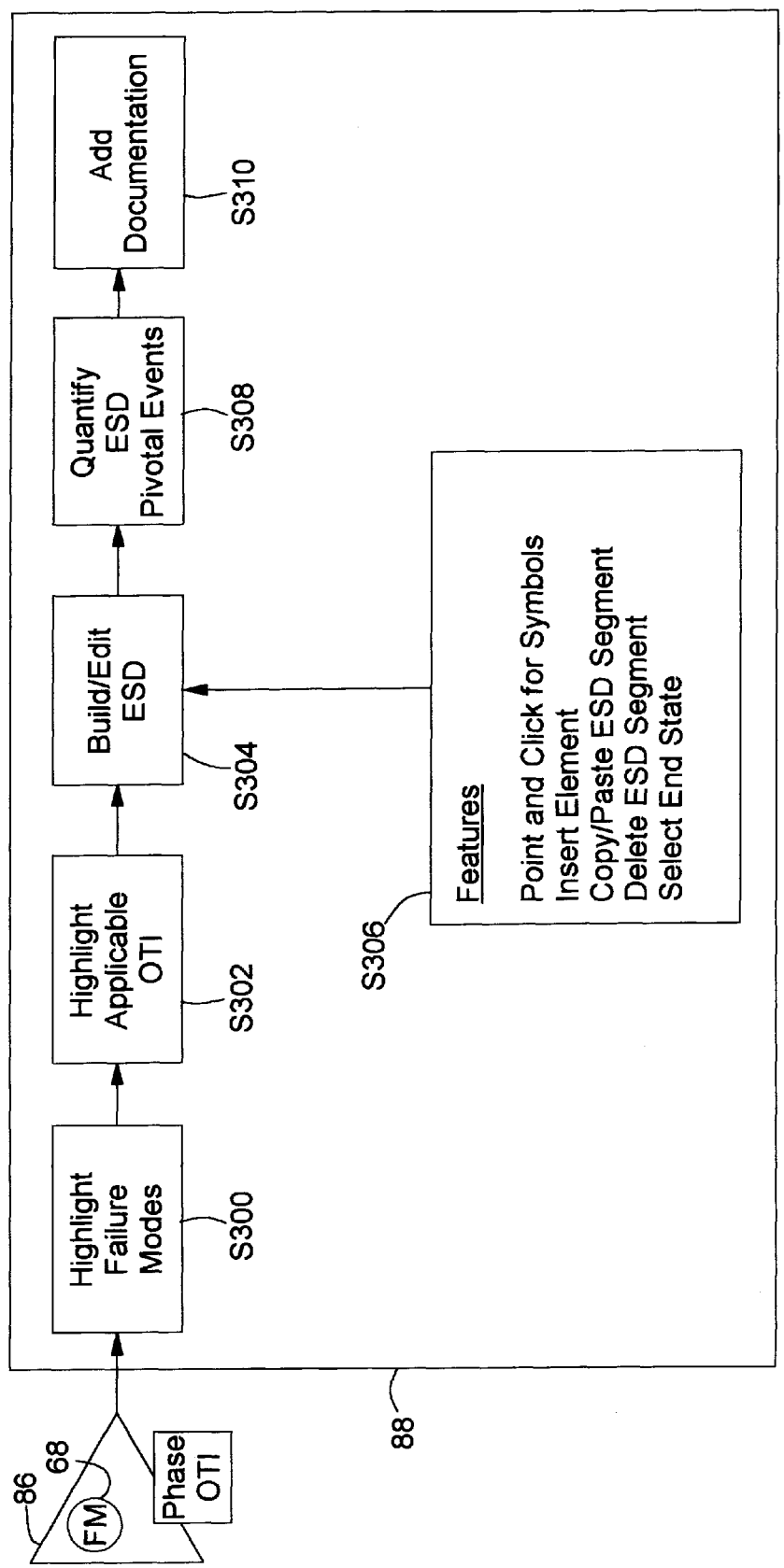
FIG. 11 is a flowchart 88 of the functions provided by the Build and Quantify ESDs module 52 of the present invention shown in FIG. 4.

FIG. 11 is a flowchart 88 of the functions provided by the Build and Quantify ESDs module 52 shown in FIG. 4. The Build and Quantify ESDs module 52 corresponds to, and implements the functions provided in, the Build/Edit ESD step S16 shown in FIG. 3.

As shown in FIG. 11, a failure mode is highlighted in step S300. The highlighted failure mode 86 is input from the hierarchy 62, and includes a combination of the failure mode 68, the phase, and the OTI. Likewise, the applicable, corresponding OTI is highlighted in step S302.

Then, in step S304, the event sequence diagram (ESD) is built/edited. The event sequence diagram is explained in further detail with reference to FIG. 12. Features which are included by the build/edit ESD step S304 into the Build and Quantify ESDs module 52 include point and click for symbols; insert element; copy/paste ESD segment; delete ESD segment; and select end state. The foregoing features are available for a given type of ESD symbol, such as the end state, and are presented when the user "right clicks" on the symbol.

ESD end states are defined in table 1:

TABLE 1

| ESD End State | Definition |
|---|---|
| CAT | catastrophic |
| SEVH | severity high |
| SEVM | severity medium |
| SEVL | severity low |
| MS | mission success |
| PF | permanent failure |

The permanent failure end state is used with the redundancy feature of the QRAS 12.

Next, in step S308, the ESD pivotal events are quantified. Documentation is added in step S310. As described herein above, documentation includes explanations and assumptions provided by an engineer quantifying the failure mode. The documentation is stored in QRAS 12, and includes images as well as text.

Figure 12:
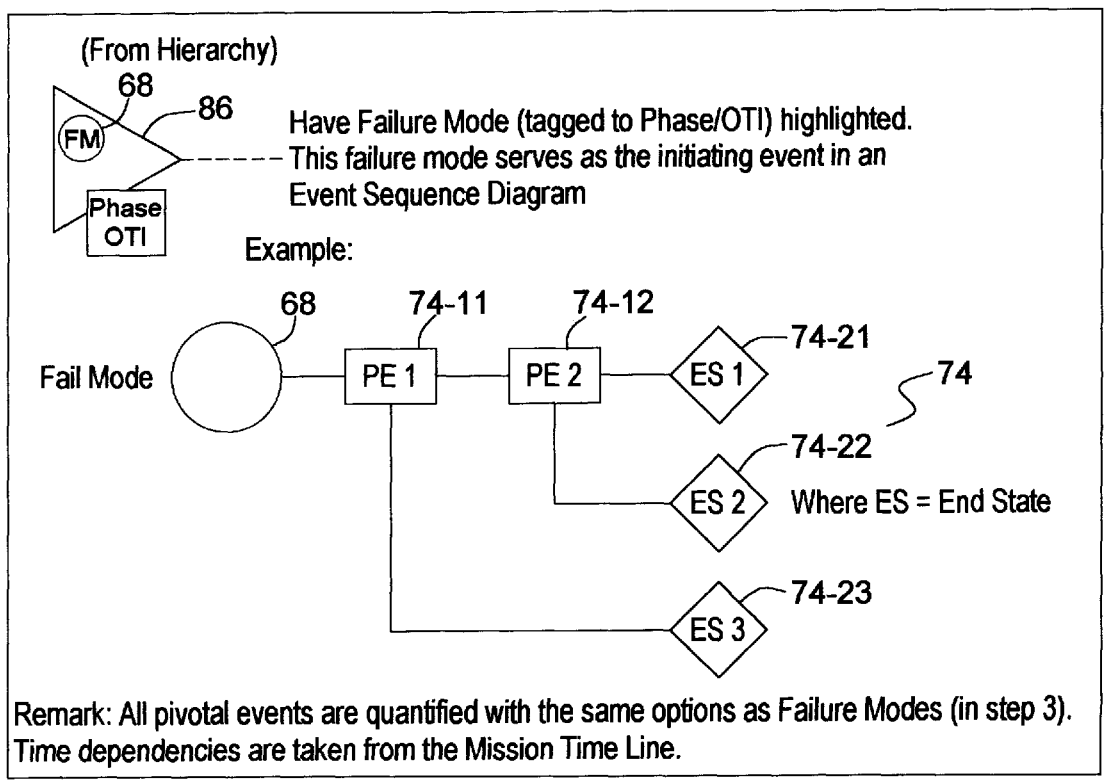
FIG. 12 is a detailed diagram of an event sequence diagram produced by the build/edit ESD step S304 of the present invention shown in FIG. 11.

FIG. 12 is a detailed diagram of an event sequence diagram produced by the build/edit ESD step S304 shown in FIG. 11. The highlighted failure mode 86 (from the hierarchy 62 and which is tagged to the phase/OTI) serves as the initiating event in the event sequence diagram 74. The event sequence diagram 74 includes pivotal events (PE) 74-11 (PE1), 74-12 (PE2), . . . , 74-1n (PEn), and each pivotal event reaches an end state (ES) 74-21 (ES1), 74-22 (ES2), 74-23 (ES3), . . . , 74-2m(ESm). All pivotal events are quantified with the same options as the failure modes, discussed with reference to FIG. 10. Time dependencies are taken from the mission timeline 70. Definitions pertinent to features included in the Event Sequence Diagrams 74 are:

Comment Boxes (CB). CBs can appear anywhere in the ESD. They are used for filling in descriptive information regarding the development of an ESD scenario. They have no probabilistic interpretation and are not quantifiable. They do not appear in the event tree which is automatically generated from the ESD.

Demand Based Events. These are:

(a) Events which occur at the specific time (absolute mission time or time relative to the occurrence of a previous event) an item is called upon (demanded) to function. The outcome of such an event is binary, either success or failure, yes or no, etc. The failure of components to start belong to this class of events; e.g., APU fails to start, SRM fails to ignite.

(b) Events which occur over an interval of time, for which the probability of failure over the length of the interval is expressed as a point estimate and an uncertainty distribution. In effect the time interval is considered to be a single demand and the item's performance is classified as either success or failure; e.g., the failure probability of an SSME over the Space Shuttle's ascent phase of 520 seconds may be expressed as a point value with an uncertainty distribution-in this sense, the success or failure of the SSME in that interval is a demand based event.

End State (ES). An ES is the last event in an ESD scenario, and is a termination point of an ESD scenario. Each scenario in an ESD terminates in a single ES. An ESD can have many scenarios.

Allowable ESs are:

(a) Catastrophic (CAT)
(b) Mission Success (MS)
(c) Mission Success (MSR) (but with failure of a redundant subsystem)
(d) Loss of Mission (LOM) (but, not catastrophic)

Permanent Failure (PF) (of a subsystem) (this end state is to allow the off-line use of QRAS ESDs for calculating intermediate results—usually of redundant subsystems—that is subsequently used in other on-line QRAS ESDs that lead to one or more of the end states in (a) through (d), above).

Severity High, Medium, or Low (SEVH, SEVM, SEVL, respectively): These allow the user to define other degradation categories that may be useful to track.

Event Sequence Diagram (ESD). An ESD depicts one or more accident or failure scenarios, all of which begin with a single initiating event, may include one or more pivotal events and/or time conditions, and terminate in one or more specified end states.

Initiating Event (IE). This is the first event in an ESD. An IE is an abnormality, malfunction, or failure (human, hardware, software, process, or other) that causes a deviation from desired operation. IEs are synonymous with failure modes in the QRAS system hierarchy in a specific operational time interval. Each ESD begins with a single IE. An IE can be a time distributed event during a particular time interval (the time-to-event distribution, or a point estimate and uncertainty for the event probability over the time interval, and the start and end times (absolute time) for the interval must be specified) or it can be a demand based event occurring at a specific point in time (the point estimate and uncertainty of the event probability).

Operational Time Interval (OTI). A time interval which is subordinate to a phase and unique to a specific subsystem. The runtime of a subsystem in a particular phase may be divided into multiple OTIs.

Phase. One of a number of time intervals unique to the top-level system under analysis; e.g., for the Space Shuttle: pre-ascent, ascent, on-orbit, and re entry/landing are four phases.

Pivotal Event (PE). An event in an ESD scenario after the initiating event and before the end state(s). Pivotal events (PEs) determine whether and how an IE propagates to a specified end state. PEs may be protective, mitigative, aggravative, or benign events which help determine whether and how an IE propagates to a specified end state. Multiple PEs may be used to reach an end state. It is also permissible to have no PEs in those cases where an IE propagates directly to a single end state. A PE name should be phrased as a question that can be answered "Yes" or "No" and should be entered into the upper part of the PE box. Designators of PEs are defined automatically by QRAS and entered into the lower part of the PE box. The two outlinks are annotated "Yes" or "No." Each outlink is represented by a line emanating from the PE. "Yes" lines are horizontal and come from the right side of a PE. "No" lines are vertical and come from the bottom of a PE. The PE "Yes" outlink is assigned a time distributed or demand based probability of occurrence and an uncertainty in accordance with the specifications for characterizing a failure probability. The probability of the "No" outlink is automatically be computed by the QRAS system.

Time Distributed Events. In contrast to "demand based events" (see earlier definition), these are events with specified time-to-occurrence distributions within a given time interval. The failure of components while in operation belongs to this class of events; e.g., APU fails to run after it has run for a time, t, given that it has started to run.

Time Condition (TC). A time condition determines the path that is followed through an ESD scenario beyond the TC point, depending on an absolute or relative time constraint. TCs are based on deterministic time limits and the allowable choices are:

| | | |
|---|---|---|
| a. $t \geq a$ | d. $t < b$ | g. $a \leq t < b$ |
| b. $t > a$ | e. $a \leq t \leq b$ | h. $a < t \leq b$ |
| c. $t \leq b$ | f. $a < t < b$ | | where t is the time variable over the time interval of the ESD and a and b are values of absolute or relative time; e.g., mission elapsed time or time relative to (after) another specified event (the time units are assumed to be the same as the default units of the "phase" in which the ESD applies). For the Space Shuttle, default time units for its phases are: pre-ascent in seconds, ascent in seconds measured from T-0 (with SSME start at T-6), on-orbit in days measured from end of ascent, and entry in minutes measured to wheel stop. The two outlinks are annotated "Yes" or "No." Each outlink is represented by a line emanating from the time switch. "Yes" lines are horizontal and come from the right side of a time switch. "No" lines are vertical and come from the bottom. TCs that are satisfied are effectively transparent to the scenarios in which they reside. TCs that are not satisfied divert their scenarios onto alternate paths. TCs appear in the event tree automatically generated from the ESD by the QRAS system. TCs work in conjunction with IEs or PEs. A TC may be placed in a scenario after a time dependent PE and attached to either of its outlinks, whichever is appropriate. A TC may also be used in an ESD which begins with a time dependent IE.

FIGS. 13, 14A, 14B, and 15A–D are flowcharts of the functions provided by the Include: Multiplicities, Dependencies, Redundancies module 54 shown in FIG. 4. The Include: Multiplicities, Dependencies, Redundancies module 54 corresponds to, and implements the functions provided in, the Include: Multiplicities, Dependencies, Redundancies step S18 shown in FIG. 3.

Figure 13:
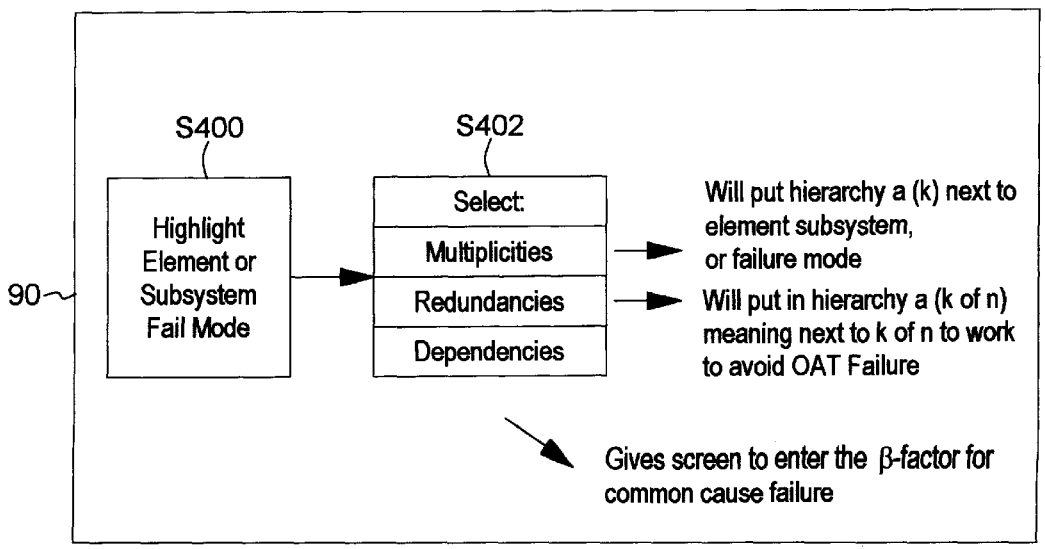
FIG. 13 is a flowchart 90 of an overview of the Include module 54 of the present invention.

FIG. 13 is a flowchart 90 of an overview of the Include module 54. As shown in step S400 of FIG. 13, the user highlights an element 64, a subsystem 66, or a failure mode 68 in the hierarchy 62, using the Include module 54. Next, in step S402, the user selects using the Include module 54, the inclusion of either multiplicities, redundancies, or dependencies. Multiplicities place within the hierarchy 62 a multiplicity number k next to the selected element, subsystem, or failure mode. The multiplicity number k indicates that the selected element, subsystem, or failure mode is accounted for k times in analyzing the risk of system 63 by the QRAS 12. For example, and referring now to FIG. 5A, the hierarchy 62 indicates therein with a multiplicity number (3) that there are 3 SSMEs within the Space Shuttle 63. Therefore, instead of having to build 3 identical elements, one for each SSME, the user indicates with the multiplicity number (3) that 3 SSMEs must be accounted for by the QRAS 12 in analyzing the risk for the Space Shuttle 63. Likewise, and also shown in FIG. 5A, multiplicity number (122) indicates that there are 122 failure modes for the porosity in the subsystem 66-1.

Also as shown in step S402, the user may select redundancies using the Include module 54. Redundancies enter into the hierarchy a factor of k-of-N, meaning that the system 63 needs k of N elements 64, subsystems 66, or failure modes 68 to work to avoid catastrophic failure.

In addition, and also as shown in step S402, the user may select dependencies using the Include module 54. The selection of Dependencies causes the Include module 54 to display a screen allowing the user to enter the β for the selected element, subsystem, or failure mode. The β is the factor for common cause failures.

Figure 14A:
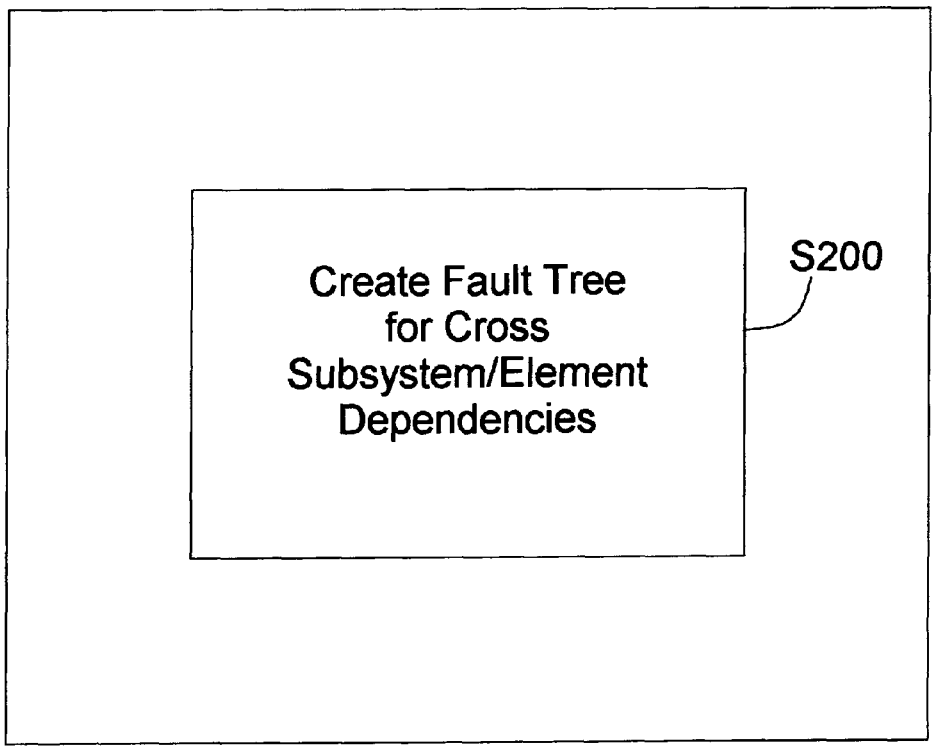
FIG. 14A shows the step of creating a fault tree for cross subsystem/element dependencies by the present invention.

Also from the Dependencies selection, or from the hierarchy 62, the Include module 54 creates a fault tree for cross subsystem 66 or element 64 dependencies, as shown in step S500 in FIG. 14A. An example of a fault tree 92 is shown in FIG. 14B.

Figure 14B:
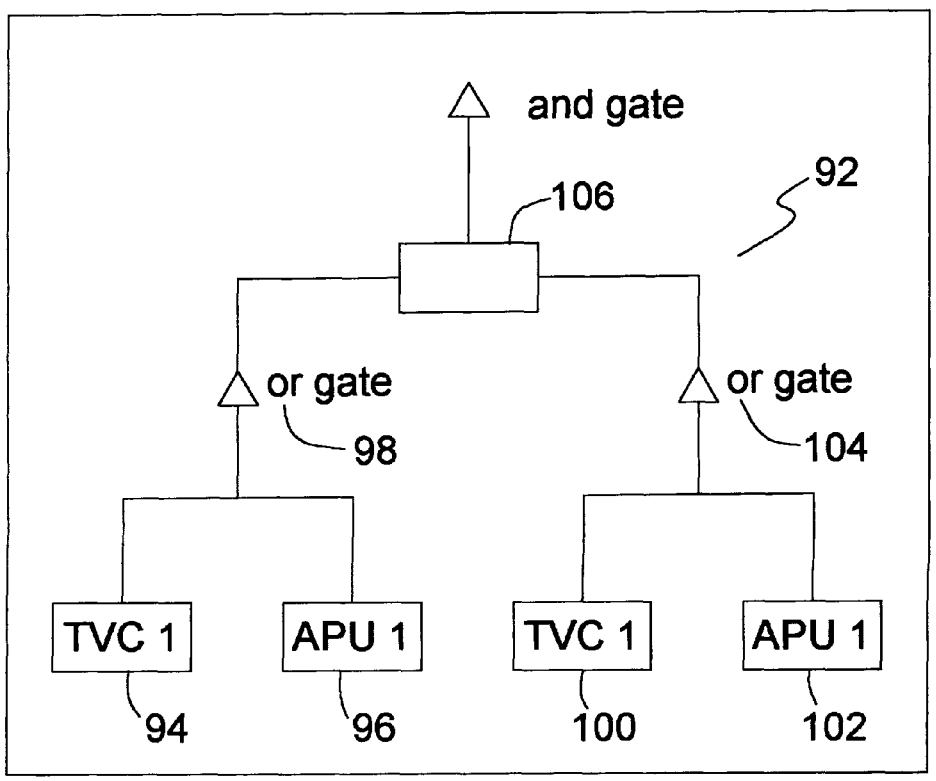
FIG. 14B shows an example of a fault tree 92 produced by the present invention.

As shown in FIG. 14B, fault tree 92 accounts for situations in which and/or logic regarding multiple elements or subsystems is included in assessing by QRAS 12 the risk associated with system 63. In the fault tree 92 example shown in FIG. 14B, failure modes 94, 96, 100, and 102 contribute to the risk for system 63 based upon logic associated with OR gates 98 and 104, an AND gate 106.

FIGS. 15A–D are flowcharts of the functions provided by the Include: Multiplicities, Dependencies, Redundancies module 54 shown in FIG. 4. The Include: Multiplicities, Dependencies, Redundancies module 54 corresponds to, and implements the functions provided in, the Include: Multiplicities, Dependencies, Redundancies step S18 shown in FIG. 3.

Multiplicities are included in the QRAS 12 as shown in flowchart 108 in FIG. 15A. In step S600, the Include module 54 highlights an element 64, subsystem 66 or failure mode 68 based upon user input. Then in step S602, a multiplicity number k is chosen by the user and input into the Include module 54. Then, the hierarchy 62 is modified by the symbol k. For example, by using the Include module 54, if the user highlights a subsystem 66-1 (step S600) and inputs k=3 as the multiplicity number (step S602), then the hierarchy 62 is modified by Include module 54 to repeat subsystem 66-1 3 times within the hierarchy 62 or (preferably) to maintain only one representation within the hierarchy 62 of subsystem 66-1 but indicate within the hierarchy 62 that subsystem 66-1 should be processed as repeated 3 times (step S604).

Redundancies are included in the QRAS 12 as shown in flowchart 110 in FIG. 15B. In step S800, the Include module 54 highlights an element 64 or subsystem 66 based upon user input. Then in step S802, the Include module 54 allows the user to input a k-out-of-N number for success, and stores the number input by the user. The hierarchy 62 is modified by the Include module 54 by the symbol (K-of-N), in step S804.

Dependencies are included in the QRAS 12 as shown in flowchart 112 in FIG. 15C. In step S900, the Include module 54 highlights an element 64 or subsystem 66 based upon user input. Then in step S902, the Include module 54 completes, based also on user input, common cause β values for catastrophic failure (CAT) and permanent failure (PF).

Dependencies across elements 64 and subsystems 66 are included in the QRAS 12 as shown in flowchart 114 in FIG. 15D. In step S1000, the hierarchy feature (i.e., an element 64 or subsystem 66) about which the fault tree 92 is to be established is selected by the Include module 54 based upon user input. Then in step S1002, the Include module 54 builds the fault tree 92 by allowing the user to highlight elements 64 and/or subsystems 66 and to "click" with the mouse on Fault Tree Symbols (i.e., AND-OR logic symbols).

Once steps S10–S18 shown in FIG. 3 have been completed by, respectively, modules 46–54 shown in FIG. 4, a risk model for system 63 has been constructed by QRAS 12. Once the risk model is constructed, the QRAS 12 includes a lock feature (with password) to prevent unauthorized users from changing data provided in the risk model. In addition, Copy/Paste features exist for the hierarchy 62. Further, quantification features provided in the quantify failure modes/documentation module 50 are linked to Mathematica.

The Create Fixed Baseline 56 and Generate Analysis Runs 58 modules correspond to, and implement the functions provided in, the Create Baseline and Generate Analysis step S20 shown in FIG. 3.

The Create Fixed Baseline 56 and Generate Analysis Runs 58 modules shown in FIG. 4 provide 4 main options: (1) create a baseline simulation; (2) delete baseline; (3) view a prior stored analysis; and (4) create a new analysis. The delete baseline option (2), when selected by the user, simply removes the current baseline from QRAS 12. The view a prior stored analysis option (3), when selected by the user, simply retrieves from memory a prior stored analysis, and displays the analysis to the user. The create a baseline simulation option (1) and the create a new analysis option (4) are explained in further detail, with reference to FIG. 16.

Figure 16:
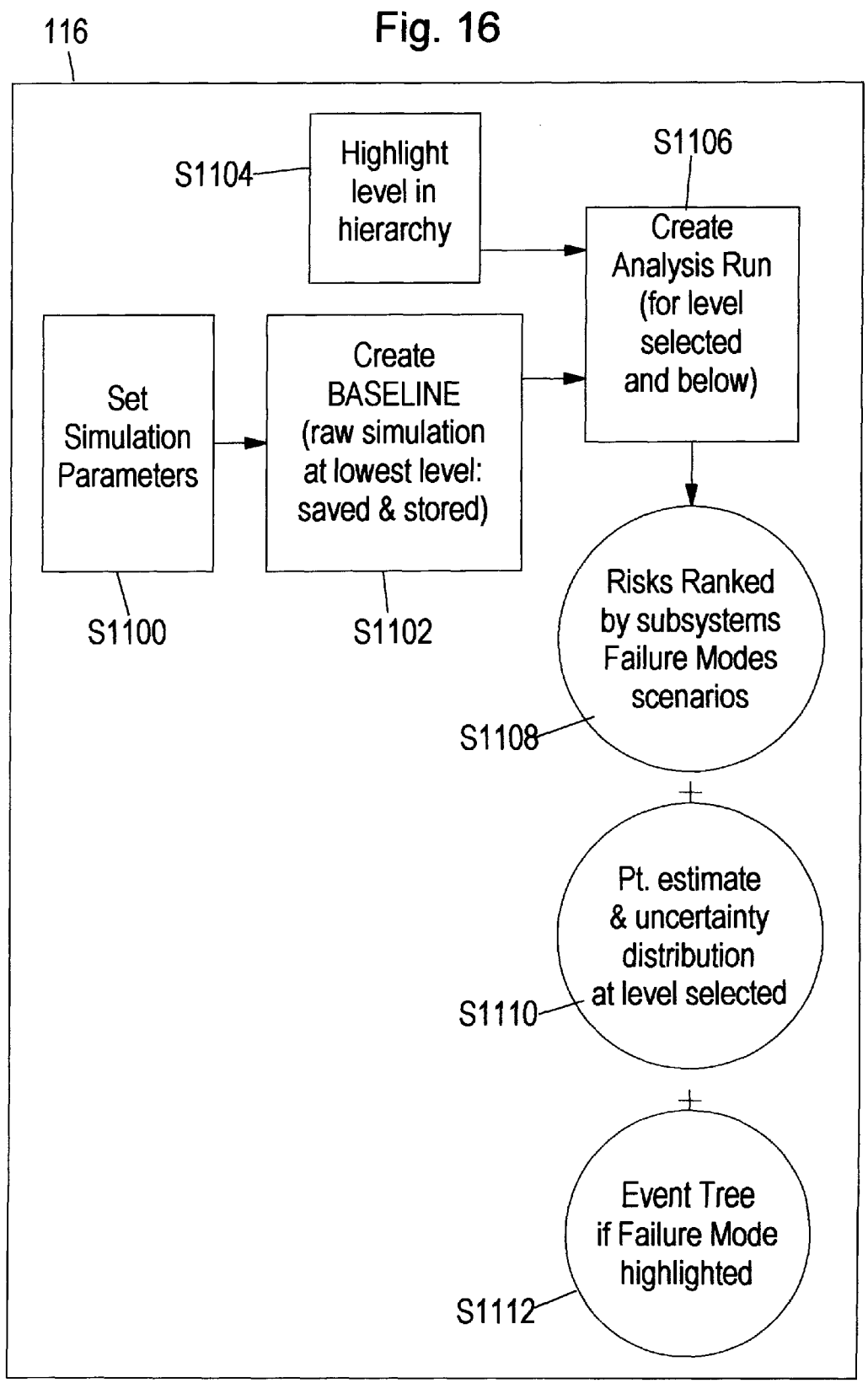
FIG. 16 is a flowchart of the create a baseline simulation option (1) and the create a new analysis option (4) functions provided by the Create Fixed Baseline 56 and Generate Analysis Runs 58 modules of the present invention shown in FIG. 4.

FIG. 16 is a flowchart of the create a baseline simulation option (1) and the create a new analysis option (4) functions provided by the Create Fixed Baseline 56 and Generate Analysis Runs 58 modules shown in FIG. 4.

Selection of the create a baseline simulation (option (1)) results in the flowchart 116 shown in FIG. 16 being executed, beginning with step S1100 and continuing through step S1112. In step S1100 shown in FIG. 16, simulation parameters are first set, based on user input. Then, in step S1102, the baseline simulation is created. Creating a baseline simulation includes resolving all event sequence diagrams 74 and executing simulations created and stored at the level of the phase/OTI/Scenario.

The baseline is created based upon simulations run at the lowest level possible, i.e., the failure mode level 68. The simulations are saved and stored as the baseline. The baseline is then password-protected, so that the same analysis results for each execution of QRAS for each system 63. Only a user having the password is able to change the baseline.

Selection of the create a new analysis (option (4)) also results in the flowchart 116 shown in FIG. 16 being executed. Execution of flowchart 116 begins with step S1104.

In step S1104, the level (system 63, element 64, subsystem 66, or failure mode 68) of the hierarchy 62 is then selected by being highlighted based upon user input.

An analysis run is created in step S1106 for the selected level and the levels below the selected level. For example, if an element 64 is highlighted, then an analysis run is created for the element 64, the subsystems 66 belonging to that element 64, and the failure modes 68 belonging to each subsystem 66 belonging to the element 64.

Risks are then ranked by subsystems, failure modes, and scenarios, in step S1108. Options for ranking of risks provided by QRAS 12 include mean, median, or uncertainty. A more detailed discussion of ranking of risks by QRAS 12 is provided with reference to FIG. 17.

Point estimates and uncertainty distributions are run at the selected (highlighted) level, in step S1110. QRAS 12 provides point estimates or complete uncertainty.

In step S1112, an event tree 76 is created by QRAS 12 if a failure mode 68 is selected by being highlighted.

The Create Fixed Baseline 56/Generate Analysis Runs 58 modules provide analysis runs for a single phase or for multiple phases. Further, the analysis can be deleted, or saved with documentation. Also, an end state can be selected based upon user input, and the baseline can be deleted and reestablished.

FIG. 17 shows options 118 for selecting risk ranking provided by the Create Fixed Baseline 56 and Generate Analysis Runs 58 modules. As shown in FIG. 17, risk is ranked by scenario, by failure mode/initiating event, by elements/subsystems, or by single point failures.

For all of the above-mentioned ranking options, further options to rank by mean, median, or uncertainty are also provided.

If the option of ranking by elements/subsystems is selected, then for clusters, several display options are provided such as displaying both clusters and singletons, displaying only the singleton representation of a cluster, and displaying only the cluster and excluding the singleton representative of the cluster.

If the option of ranking by a single point failure is selected, then only singleton scenarios apply.

Figure 18:
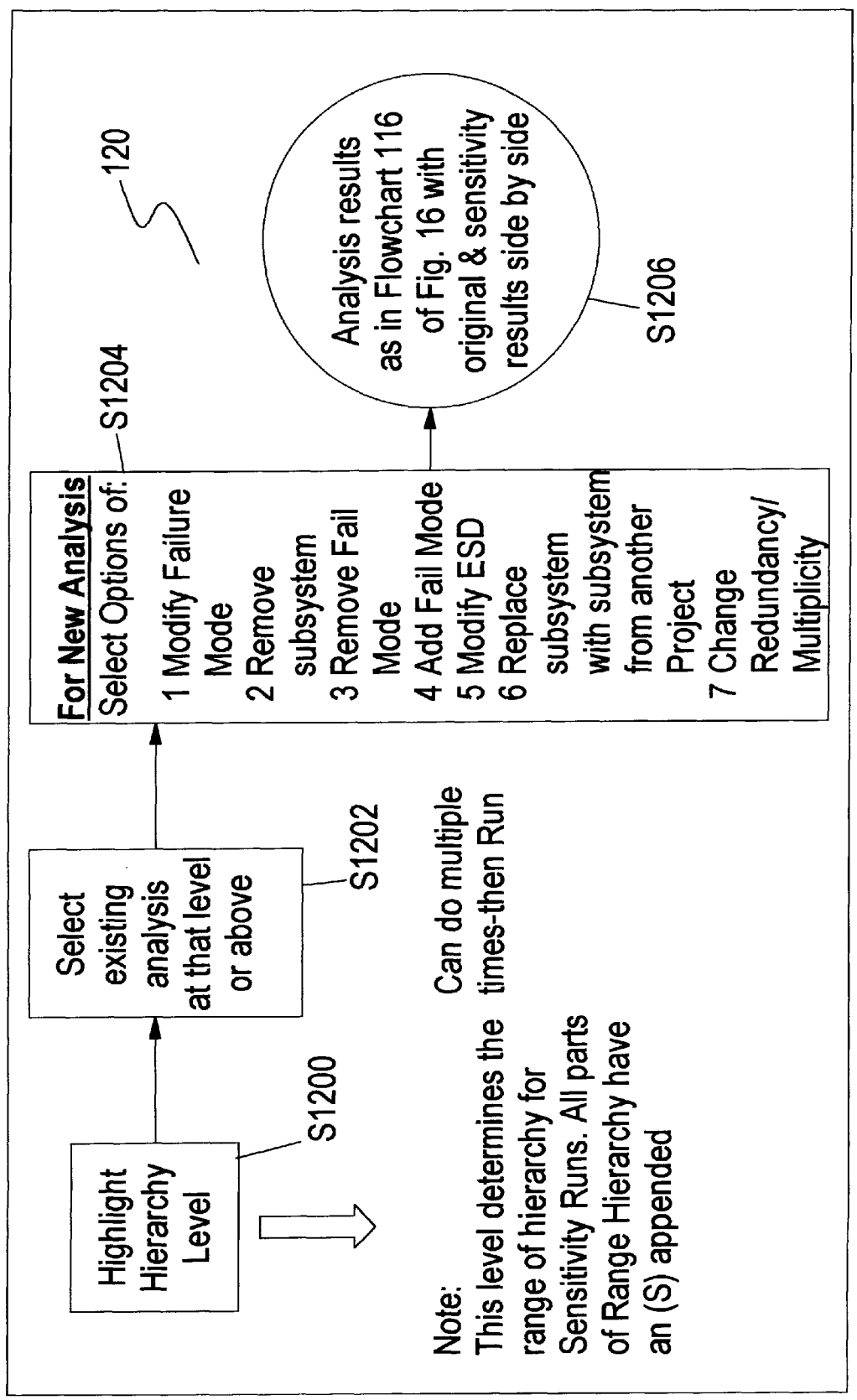
FIG. 18 is a flowchart 120 of the functions provided by the Perform Sensitivity Analysis module 60 of the present invention shown in FIG. 4.

FIG. 18 is a flowchart 120 of the functions provided by the Perform Sensitivity Analysis module 60 shown in FIG. 4. The Perform Sensitivity Analysis module 60 corresponds to, and implements the functions provided in, the Perform Sensitivity Analysis step S20 shown in FIG. 3. The main functions provided by the Perform Sensitivity Analysis module 60 include the options of (1) creating a new analysis, (2) modifying an existing analysis, (3) deleting an existing analysis, and (4) viewing a prior analysis.

For option (3), delete existing analysis, the sensitivity analysis module 60 simple deletes an existing analysis selected by the user. For option (4), viewing a prior analysis, the sensitivity analysis module 60 simply displays to the user a prior analysis retrieved from memory.

When the user selects either option (1), creating a new analysis, or (2), modifying an existing analysis, flowchart 120 shown in FIG. 18 is executed. As shown in step S1200, a hierarchy level is highlighted based upon user input. The hierarchy level determines the range of hierarchy for sensitivity runs. All parts of the range hierarchy have an (S) appended thereto. Then, for modification of an existing analysis (option (2)), an existing analysis is selected at the highlighted hierarchy level or above, in step S1202. An existing analysis can be selected for modification multiple times, then run.

When option (1), creating a new analysis, is selected, step S1204 is executed. In step S1204, selection from the following options provided by the sensitivity analysis module 60 is available:

1 Modify Failure Mode
2 Remove Subsystem
3 Remove Fail Mode
4 Add Fail Mode
5 Modify ESD
6 Replace subsystem with subsystem from another Project
7 Change Redundancy/Multiplicity.

After a new analysis has been run in step S1204, analysis results as in steps S1108, S1110, and S1112 in flowchart 116 of FIG. 16 are provided, but with the original analysis and the sensitivity results presented side-by-side, in step S1206.

Other features provided by the sensitivity analysis module 60 include saving modified settings, but not running an analysis, and viewing documentation provided and stored in QRAS 12.

Figure 19:
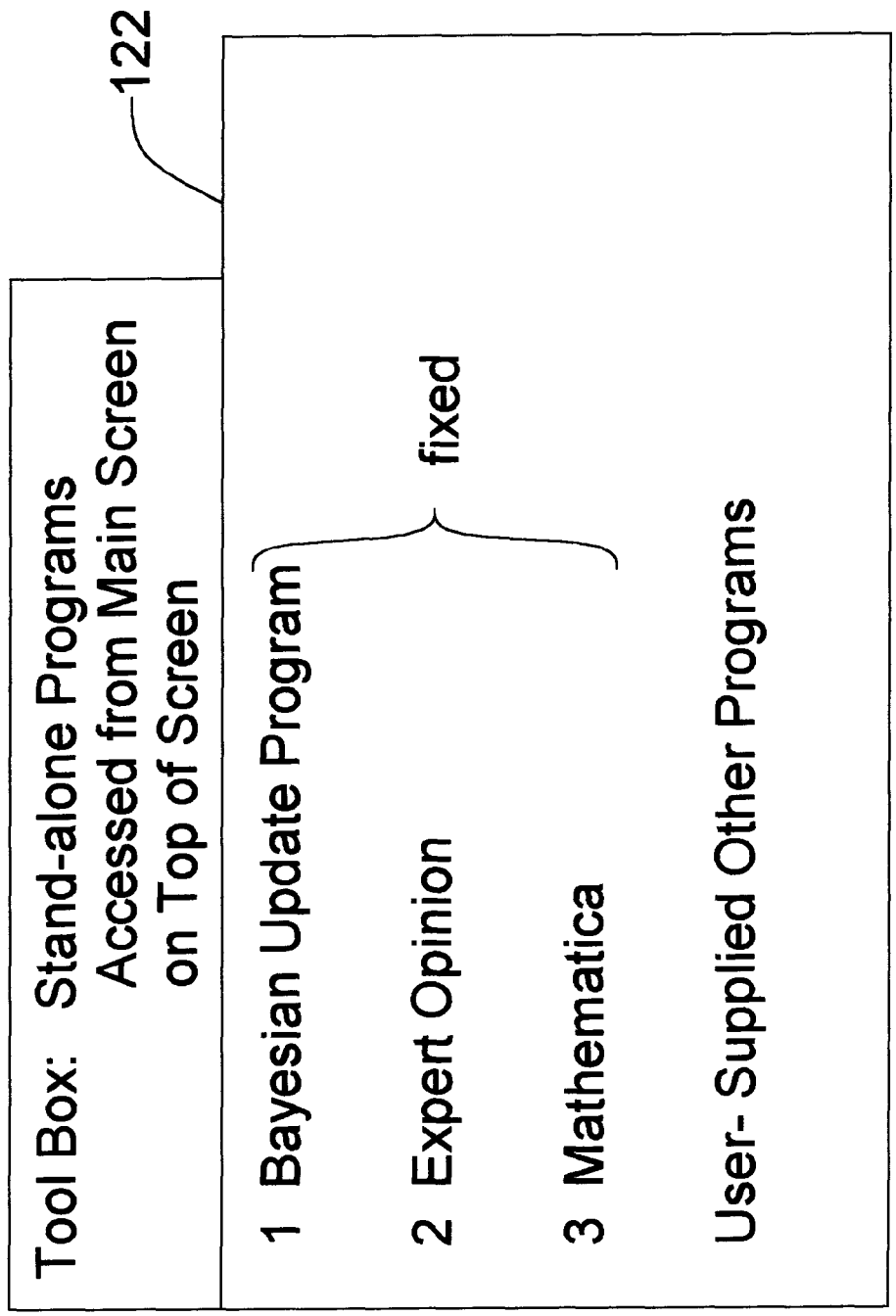
FIG. 19 shows a selection 122 of stand-alone programs 122 accessed from the main screen of QRAS 12 of the present invention and residing in the toolbox 16 shown in FIG. 5A.

FIG. 19 shows a selection 122 of stand-alone programs 122 accessed from the main screen of QRAS 12 and residing in the toolbox 16 shown in FIG. 5A. QRAS 12 provides a seamless interface to each of the programs 122, initiating execution of the selected program, providing required input, and displaying results to the user. As shown in FIG. 19, the QRAS toolbox 16 provides access to the following programs 122:

1. Bayesian Update Program
2. Expert Opinion
3. Mathematica

The Bayesian Update Program (1), Expert Opinion (2), and Mathematica (3) are fixed programs provided with QRAS 12. MATHEMATICA and the BAYESIAN UPDATE PROGRAM are known. Expert Opinion includes various techniques of analyzing risk posed by experts in the field. Additional programs, such as a Monte-Carlo Simulation Program to handle hyper-distributions, for example, can be added to QRAS 12 by the individual users. The toolbox 16 allows users to add programs of their choice.

Figure 20A:
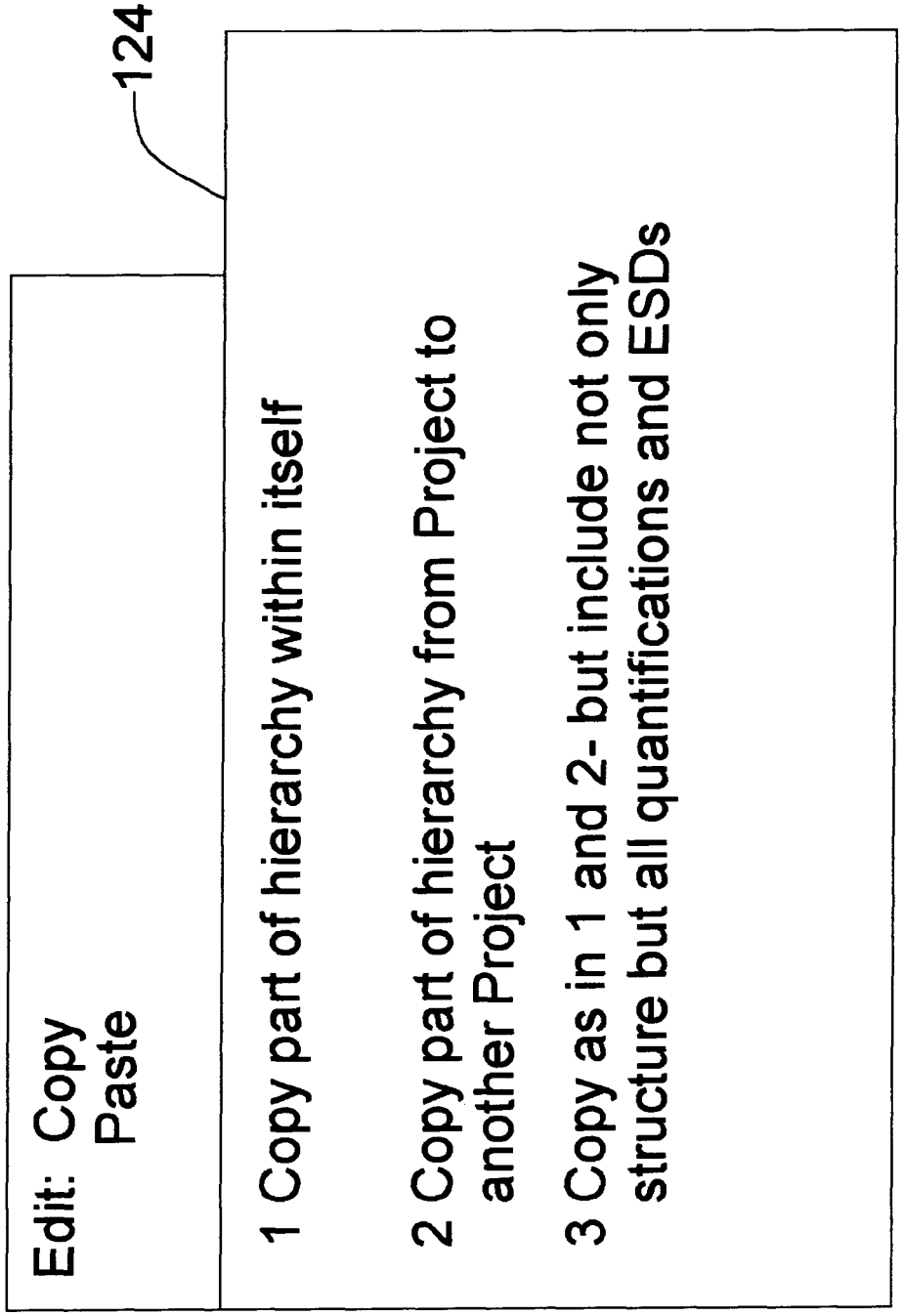
FIG. 20A shows edit functions copy and paste, applicable principally to the build hierarchy module 46 of the present invention and provided therein.
Figure 20B:
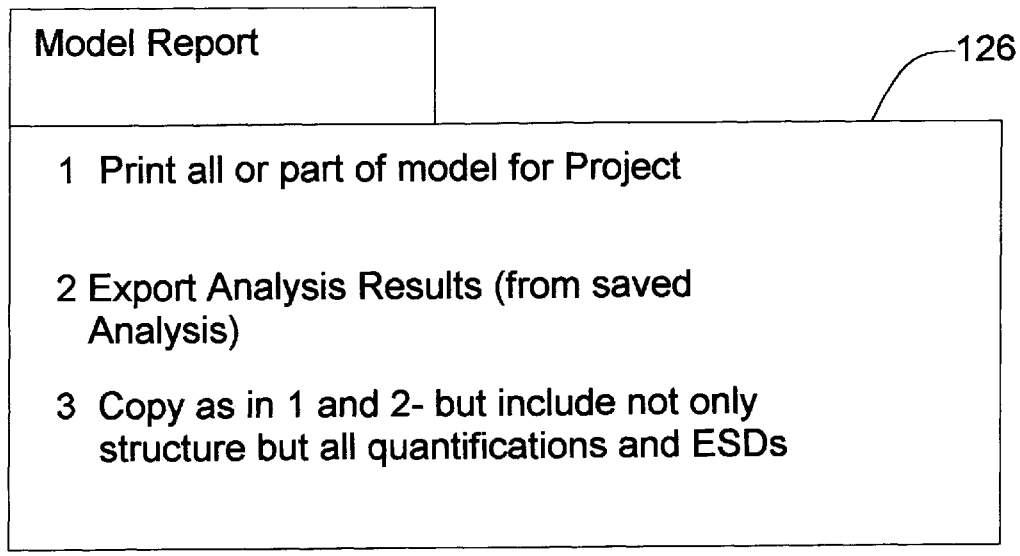
FIG. 20B shows options provided by the model report utility 126 of QRAS 12 of the present invention.
Figure 20C:
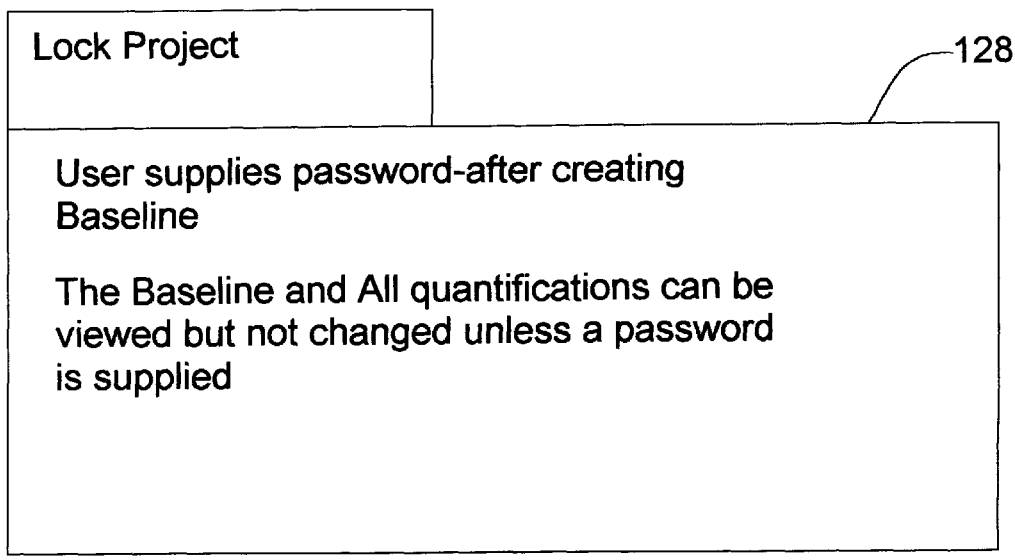
FIG. 20C shows a lock project utility 128 provided within QRAS 12 of the present invention.

FIGS. 20A, 20B, and 20C show utilities provided by QRAS 12 distributed across QRAS 12 and available to users from a variety of the modules 46–60 of QRAS shown in FIG. 4. The utilities shown in FIGS. 20A, 20B, and 20C are available from pull-down menus provided in QRAS 12. FIG. 20A shows edit functions copy and paste, applicable principally to the build hierarchy module 46 and provided therein. The edit utilities include coping part of the hierarchy 62 within itself, copying part of hierarchy 62 from one project 63 to another project 63, or copying as previously described but including not only the structure of the hierarchy 12 but all quantifications 50 and events sequence diagrams 74.

FIG. 20B shows options provided by the model report utility 126 of QRAS 12. In the model report utility 126, all or part of the model for a project (such as the hierarchy 62, the event sequence diagrams 74, the event trees 76, etc) can be printed on a printer. In addition, analysis results 59 (as shown FIG. 5A) can be exported from the QRAS 12 system installed on the current computer to a QRAS system 12 stored on another computer. Alternatively, just the structure of the hierarchy 62 can be printed, or all quantifications 50 and event sequence diagrams 74 can be printed (or exported).

FIG. 20C shows a lock project utility 128 provided within QRAS 12. The lock project utility 128 is applicable to the build hierarchy module 46, the create mission time line module 48, the quantified failure modes/documentation module 50, the build and quantify ESDs module 52, the include: multiplicities, dependencies, and redundancies module 54, and the create fixed base line module 56 of QRAS 12 after creating the base, the users supplies passwords which are required to alter any of the data inserted into the above-mentioned modules 46–56. Using the lock project utility 128, the base line and all quantifications can be viewed, but not changed unless a password is supplied. The lock project, therefore, preserves the model that is used for risk analysis.

EXAMPLE OF QRAS 12

The following section shows one example of QRAS 12 of the present invention, including WINDOWS-based screens and explanations of QRAS 12 functions provided by features selected from the screens. The following example shows how to create a system model and create and run an analysis using QRAS 12, and discusses the toolbox features and special features of QRAS 12, after a brief explanation of installing the example of QRAS 12.

QRAS 12 is installed by double clicking the QRAS.exe program. QRAS 12 requires conventional MATHEMATICA (Professional version). Once MATHEMATICA is installed on the computer, QRAS 12 must be linked to MATHEMATICA:

(a) In the MATHEMATICA directory is found two folders: Autoload and Addons. First, click on Addons and copy the Statistics sub-folder (located under Standard Packages) into the Autoload folder; (b) QRAS 12 expects MATHEMATICA to be in its standard place: C:\Program Files\Wolfram Research\Mathematica\3.0. If this is the case, then nothing needs to be done; however, if MATHEMATICA is installed elsewhere, the QRAS 12 file that links to MATHEMATICA must be modified. More particularly, in the file Qras.ini in the Windows directory on the C drive, the line beginning with: InitString=must be changed to read:

InitString=-linkname    'location    of Mathematica\mathkernel'-mathlink.

MATHEMATICA must be personalized by entering the password provided. To do this, click on mathematica.exe and enter the password in the designated field on the screen.

1. Creating a system model

Creating a system model begins with creating/opening/locking a project. All information about a specific system model resides in a single Windows 95 folder. This set of information is referred to as a "project." 63, discussed herein above. For example, a model of the Shuttle is a "project"; a model of a new turbopump could be a "project."

Figure 21:
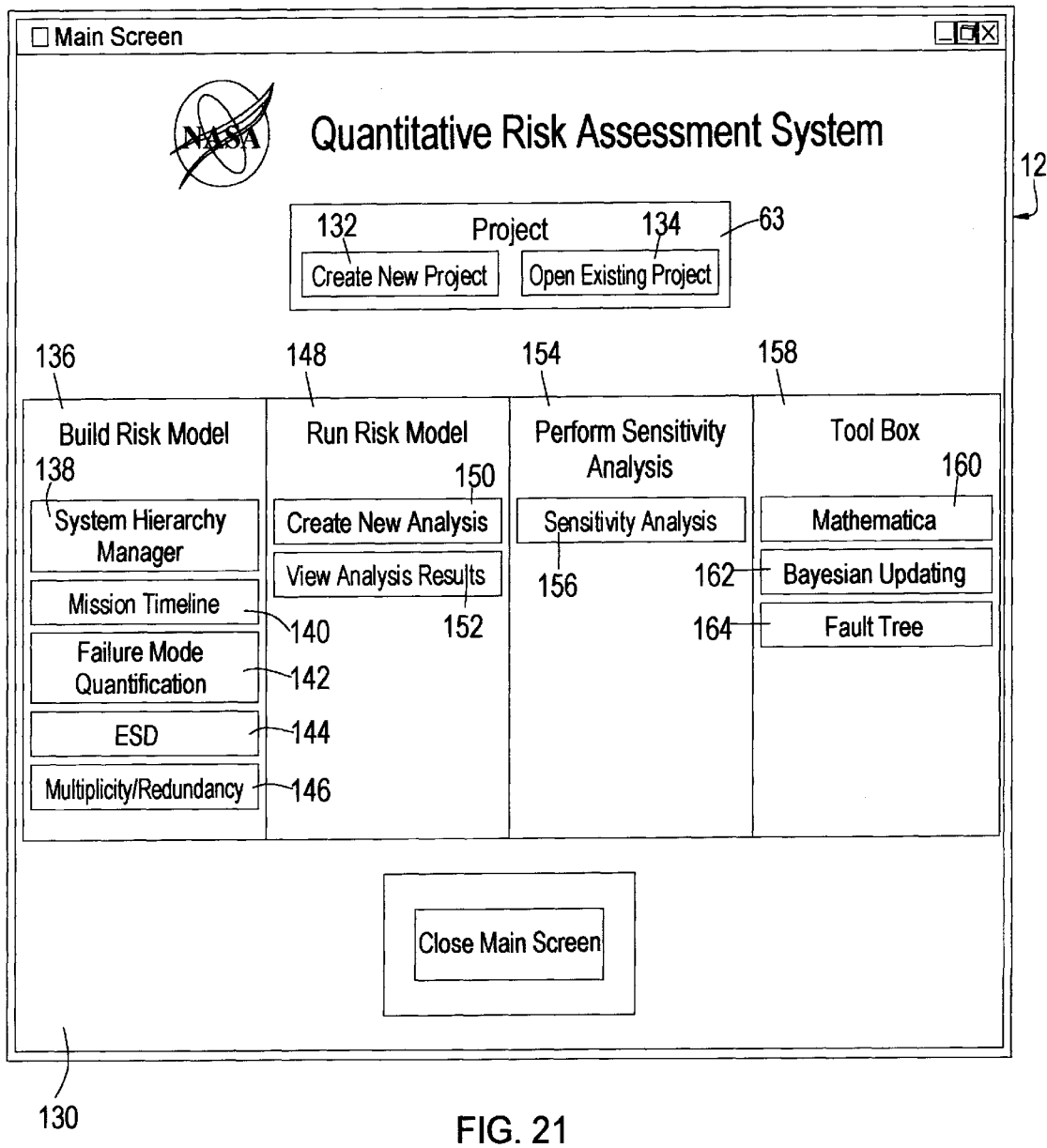
FIG. 21 shows an example of a main screen 130 of QRAS 12.

When the user first runs QRAS 12, the main screen 130 appears. The main screen 130 is shown in FIG. 21 and includes two active buttons: (a) Create New Project 132; and (b) Open Existing Project 134.

Clicking "Create New Project" 132 creates a dialog box, requesting a project name. This name is automatically used to create and name a new folder under the "Projects" folder. The new folder holds all information about the project 63, corresponding to the root or project shown in FIG. 5A. Clicking "Open Existing Project" 134 displays a list of current projects.

Also shown as options on the main screen 130 are the Build Risk Model function 136, corresponding to the Build Risk Model step S08 shown in FIG. 3 and the Build Risk Model Module 45 shown in FIG. 4. The Build Risk Model function 136 includes 4 active buttons: the System Hierarchy Manager 138, corresponding to the Build Hierarchy step S10 shown in FIG. 3 and to the Build Hierarchy module 46 shown in FIG. 4; the Mission Timeline function 140, corresponding to the Create Mission Timeline step S12 shown in FIG. 3 and to the Create Mission Timeline module shown in FIG. 4; the Failure Mode Quantification function 142, corresponding to the Quantify Failure Modes step S14 shown in FIG. 3 and to the Quantify Failure Modes/Documentation module 50 shown in FIG. 4; the ESD function 144, corresponding to the Build/Edit ESD step S16 shown in FIG. 3 and to the Build and Quantify ESDs module 52 shown in FIG. 4; and the Multiplicity/Redundancy function 146, corresponding to the Include: Multiplicities, Dependencies, and Redundancies step S18 shown in FIG. 3 and to the Include: Multiplicities, Dependencies, and Redundancies module 54 shown in FIG. 4.

The Run Risk Model function 148 shown in FIG. 21 includes 2 active buttons: the Create New Analysis function 150, corresponding to the Create Baseline and Generate Analysis step S20 shown in FIG. 3 and to the Create Fixed Baseline module 56 and the Generate Analysis Runs module 58 shown in FIG. 4; and the View Analysis Results function 152, which displays the results of the analysis generated by the Create New Analysis function 150 or by a previously-generated, and stored, analysis 59 shown in FIG. 5A.

The Perform Sensitivity Analysis function 154 includes the Sensitivity Analysis function active button 156, corresponding to the Perform Sensitivity Analysis step S22 shown in FIG. 3 and to the Perform Sensitivity Analysis module 60 shown in FIG. 4.

Main Screen 130 includes the Tool Box function 158. The Tool Box 158 corresponds to the Tool Box 16 shown in FIG. 5A. In the example shown in FIG. 21, the Tool Box 158 includes 3 active buttons, the selection of any of which invokes either conventional programs provided by the user or other conventional programs such as MATHEMATICA 160, Bayesian Updating 162, and Fault Tree 164.

2. Using the hierarchy manager

Figure 22:
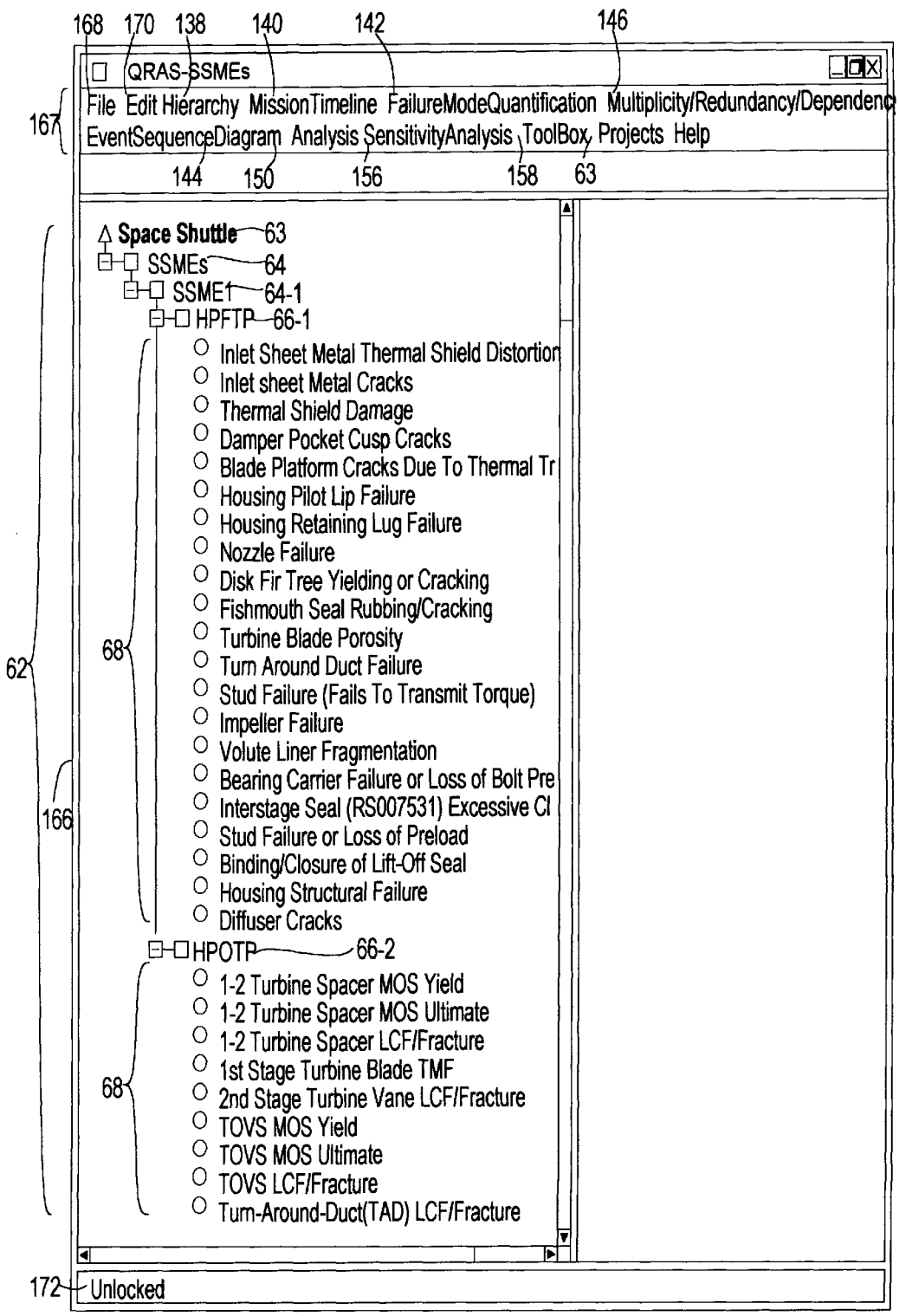
FIG. 22 shows an example of a hierarchy screen 166 of QRAS 12.

The user double clicks the desired project 63 and the hierarchy screen 166 shown in FIG. 22 is automatically generated. At the top of the hierarchy screen 166 appear menu options 167 for the user to go directly to the functions 138–158 described with reference to FIG. 21, to a different project 63, or to file 168 or edit 170 options. The file option 168 can be used to open or close a project.

The user can invoke any of the functions 138–158 shown on the main screen 130 either from the main screen 130 or from the hierarchy screen 166 (or from other screens as described).

Referring now to FIG. 22, the hierarchy screen 166 shows an element/subsystem/failure mode hierarchy 62, including a project 63, elements 64 and 64-1 of the project, subsystems 66-1 and 66-2 of the elements, and failure modes 68 corresponding, respectively to the elements 66-1 and 66-2.

The hierarchy screen 166 indicates that the element/subsystem/failure mode hierarchy 62 is unlocked 172. The hierarchy 62 appears in every window, and the user highlights the part of the hierarchy 62 in which the user is interested, and this highlighted part of the hierarchy serves as the link to other modules or features.

When the hierarchy is complete, all failure modes have been quantified, and all ESDs input, the project can be "Locked" to prevent modification of the input data. Under the "File" Option 168, a feature is available called "Lock Project." The user supplies a password and locks a given project; the user can also "unlock" the project and change passwords. These options appear under "File" 168 at the top of the screen.

The Hierarchy Manager is used to construct a decomposition of the system: root level, elements, subsystems, (sub-subsystems if desired) and failure modes-in descending order.

To begin, first click "Hierarchy" at the top of the screen 166 and select the "Build/Edit Hierarchy" option 138 in the pull-down menu. This will activate all options for the Hierarchy Manager. Again click "Hierarchy" and select the options to build the hierarchical decomposition. The options are, in almost every case, self explanatory. There are tool bar items for some of the options. These include "Add Element," "Add Subsystem," "Add Failure Mode," and "Rename." The "Rename" button allows changing the standard names such as "Element" or "Failure Mode" to specific names such as "SSME" or "Weld Failure." (One can also highlight the component (e.g., subsystem, failure mode) to rename and push the F2 key. This will automatically bring up the rename dialog). There are also "Move Up" and "Move Down" options. These allow interchanging positions of the highlighted element/subsystem/failure mode with the one below (or above) it.

In addition to creating the actual hierarchy, there are options for adding documentation (called "Documentation") and storing pictures (called "Images"). A "Documentation" button applies to subsystems and elements—not failure modes. Failure mode documentation is handled in the "Failure Mode Quantification" screens and in the "Event Sequence Diagram" screens, explained herein below.

An element cannot be nested under another element; however, a subsystem can be nested under another subsystem (in effect, to create a sub-subsystem). The OTIs (refer to the Mission Time Line discussion below) apply to the lowest level subsystem.

The Hierarchy is automatically saved as one builds it. Thus the "Save" button is not needed for the Hierarchy; all other features (e.g., the Event Sequence Diagram) must be saved by the user.

3. Creating the Mission Time Line

The mission time line (element 70 shown in FIG. 5A) does two things: creates global "phases" (for the system) and creates "operational time intervals" (for subsystems). "Phases" for a project are at the top system level, referred to as the "Root" 63 in the hierarchy 62. These phases represent global system demarcations, and most analyses are run by phase. For the Shuttle, the phases are "Ascent," "On-orbit," and "Reentry." The user defines up to 10 phases. At least 1 phase must be created. "Operational time intervals (OTIs)" are created for each subsystem (within an element), within a given phase. The OTIs establish the start and end times for distinct operating modes of a subsystem. Each subsystem must have at least 1 OTI. OTIs allow multiple quantifications and/or ESDs for a single failure mode within a phase. Therefore, OTIs apply to a subsystem, and each failure mode and ESD is tagged to a set of specific OTIs for that subsystem.

Figure 23:
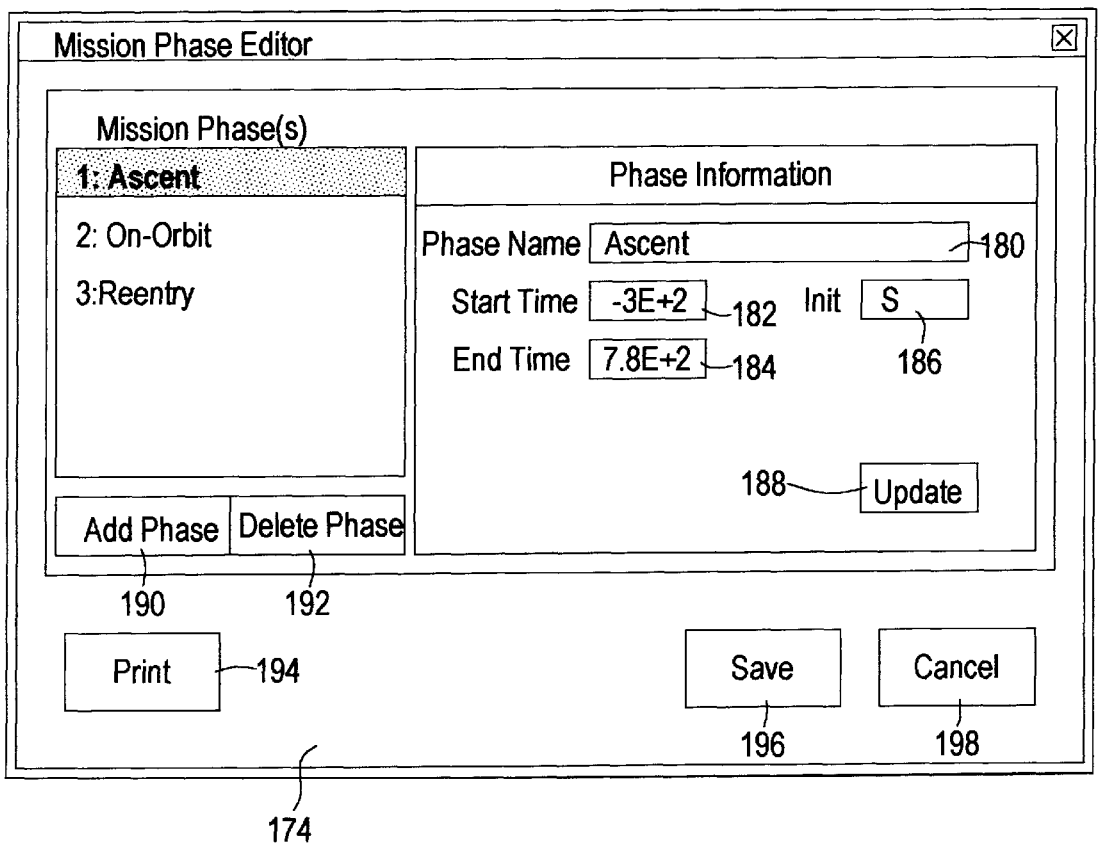
FIG. 23 shows an example of a Mission Phase Editor screen of QRAS 12.

To create a mission time line, first click "Mission Time Line." 140 Next click the "Define Mission Phases" option. The Mission Phase Editor 174 shown in FIG. 23 is then displayed. The subsequent buttons and operations for creating phases are self-explanatory, including the phase information 178, the phase name 180, the start time 182 for the phase, the end time 184 for the phase, the units 186 for the start time 182 and the end time 184, updating 188, adding a phase 190, deleting a phase 192, print 194, save 196, and cancel 198. The Mission Phase editor screen 174 allows the user to establish the global system operations phases, including the start and end times for each phase.

Figure 24:
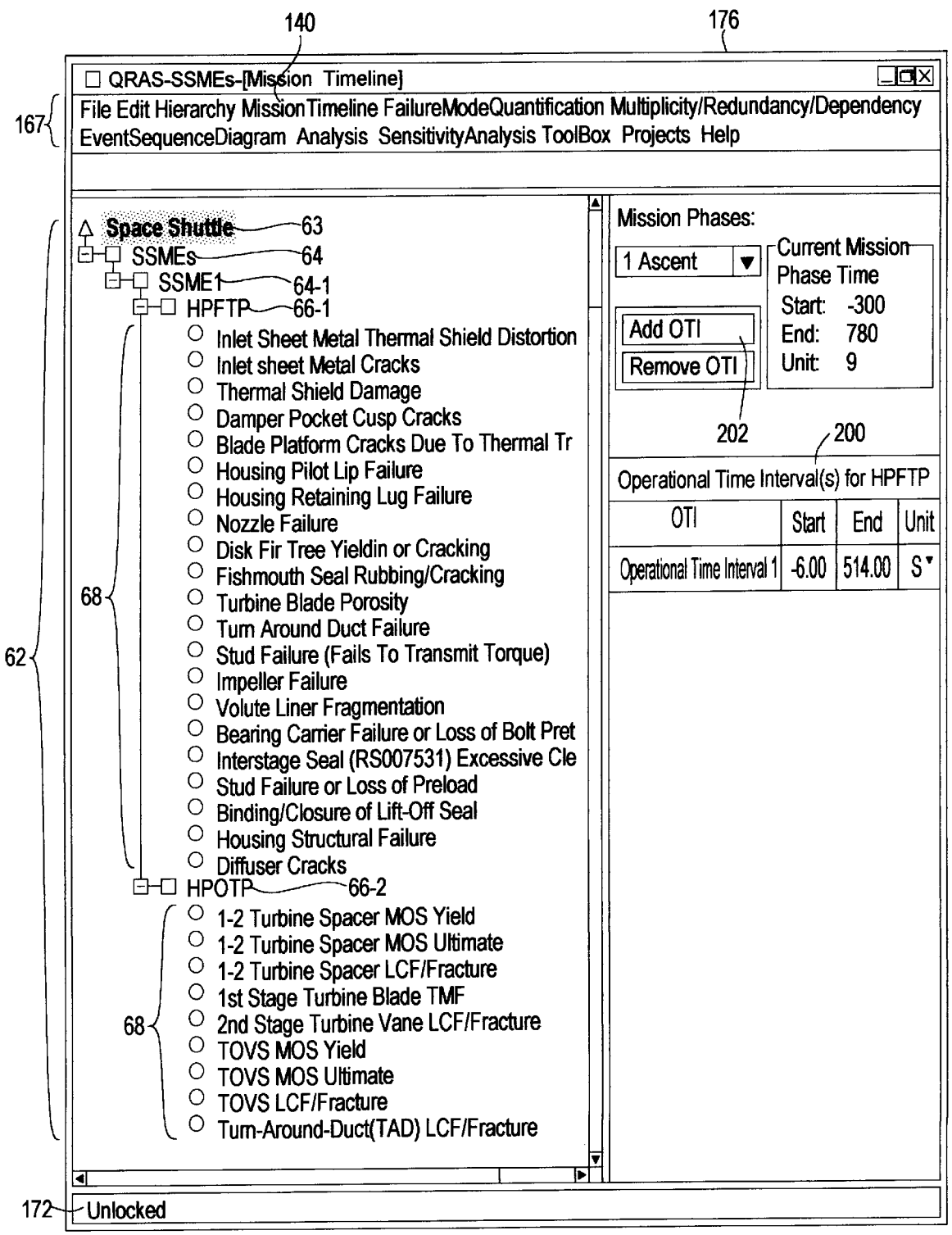
FIG. 24 shows an example of a Mission Timeline screen, specifically the defining of operational time intervals (OTIs), of QRAS 12.

To create OTIs, first highlight a subsystem 66-1 in the hierarchy 62 on the Operational Time Interval screen 176 shown in FIG. 24. Then click the "Create Operational Time Intervals" option 200 in the mission time line menu 140. Highlight the phase for the OTI and use the "Add OTI" button 202. All start and stop times must fall within a phase. Allowable times are displayed in green; erroneous or questionable times are displayed in red. In the example shown in FIG. 24, the High Pressure Fuel Turbopump (HPFTP) 66-1 has been highlighted, so the OTIs created will correspond to the HPFTP subsystem 66-1.

Finally, the failure modes in the system hierarchy must be tagged to the OTIs. To do this, highlight a failure mode 68 and then, in the mission time line menu 140, click "Make OTI Applicable." (not shown). A grid (not shown) will appear below the hierarchy 62, with a box called "APP"—for "applicable." (not shown). An "X" will appear within the box.

As discussed herein above, the mission phase times and OTI times may run from −x to +y. That is, the user can code minus times, if desired. In the Shuttle, for example, the ascent phase runs from −5 minutes to +13 minutes.

4. Quantifying Failure Modes

Figure 25:
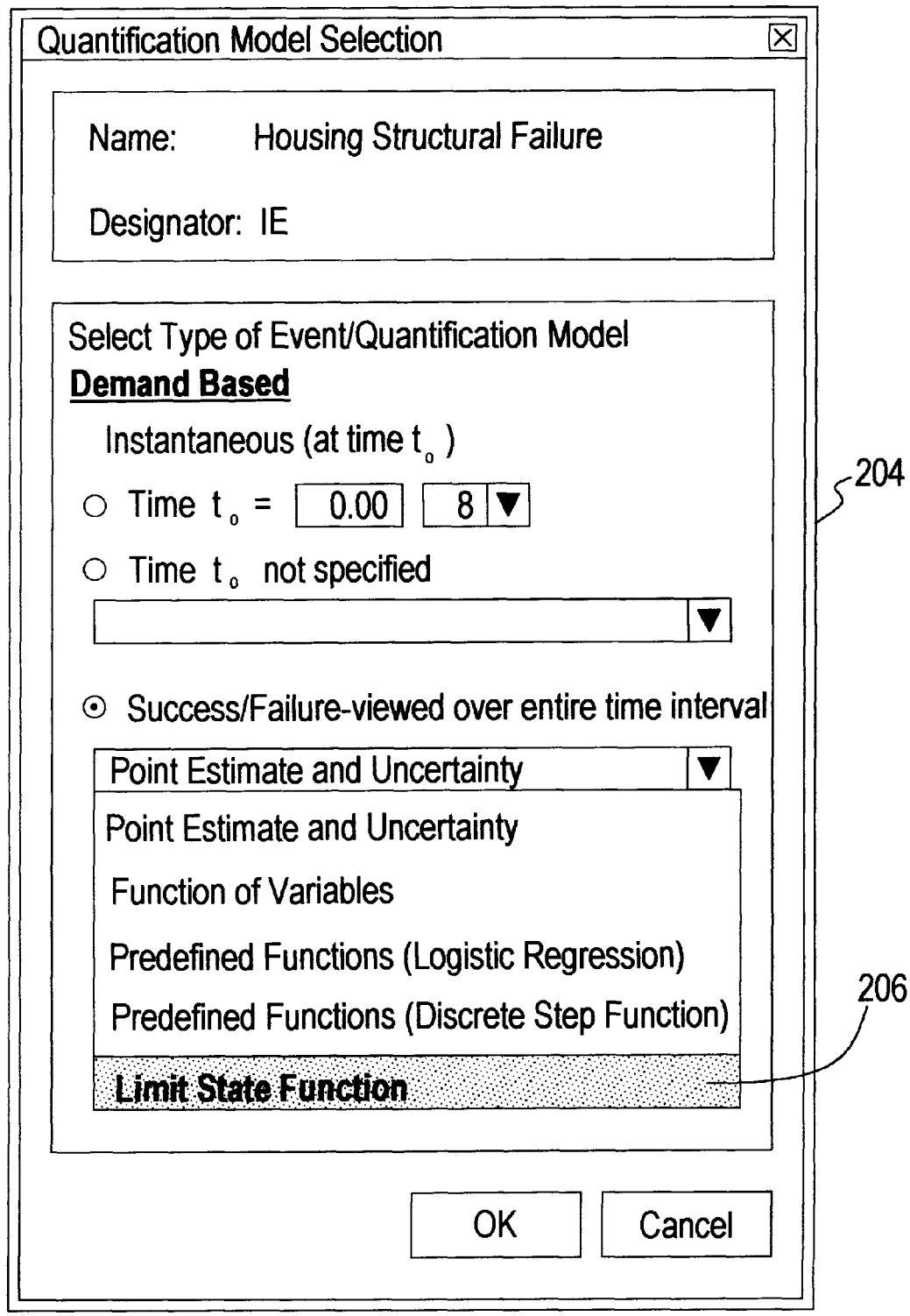
FIG. 25 shows an example of a Quantification Model Selection screen of QRAS 12.

The Quantification Model Selection screen 204 is shown in FIG. 25 and is the top level screen for Failure Mode Quantification. "Housing Structural Failure" has been highlighted in the hierarchy 62 (in the example shown in FIG. 25) and the limit state function 206 has been selected as a method of quantification in the example shown in FIG. 25.

Generally, in QRAS 12, to quantify a failure mode, first highlight the desired failure mode 68. Next, highlight an OTI in a grid below the hierarchy 62 (or in a dialog box to the left of the hierarchy). Finally, click on the top level menu option entitled "Failure Mode Quantification." The drop down menu that then appears has only one option: "Quantify Failure Mode." Clicking this option will bring up the main failure mode quantification screen.

There are now 2 main options for quantification: demand based, or time based.

Demand based. The demand based feature has 2 options: Instantaneous events (the user can enter a specific time $t_0$; or indicate the event is instantaneous but the time is not specified; e.g., fails to start, but start time not specified); or "Success/Failure-viewed over a time interval." This latter option allows quantification where a fixed time interval of operation is considered and the user wants to quantify whether failure has occurred at any time over the interval. In effect, the time interval is considered a single demand. For example, in the Space Shuttle, the high pressure oxidizer turbopumps run for approximately 520 seconds during ascent. One may want to quantify a failure mode of the turbopump by considering the probability of failure during ascent; i.e., a success/failure demand based, rather than strictly time based, quantification.

Figure 26:
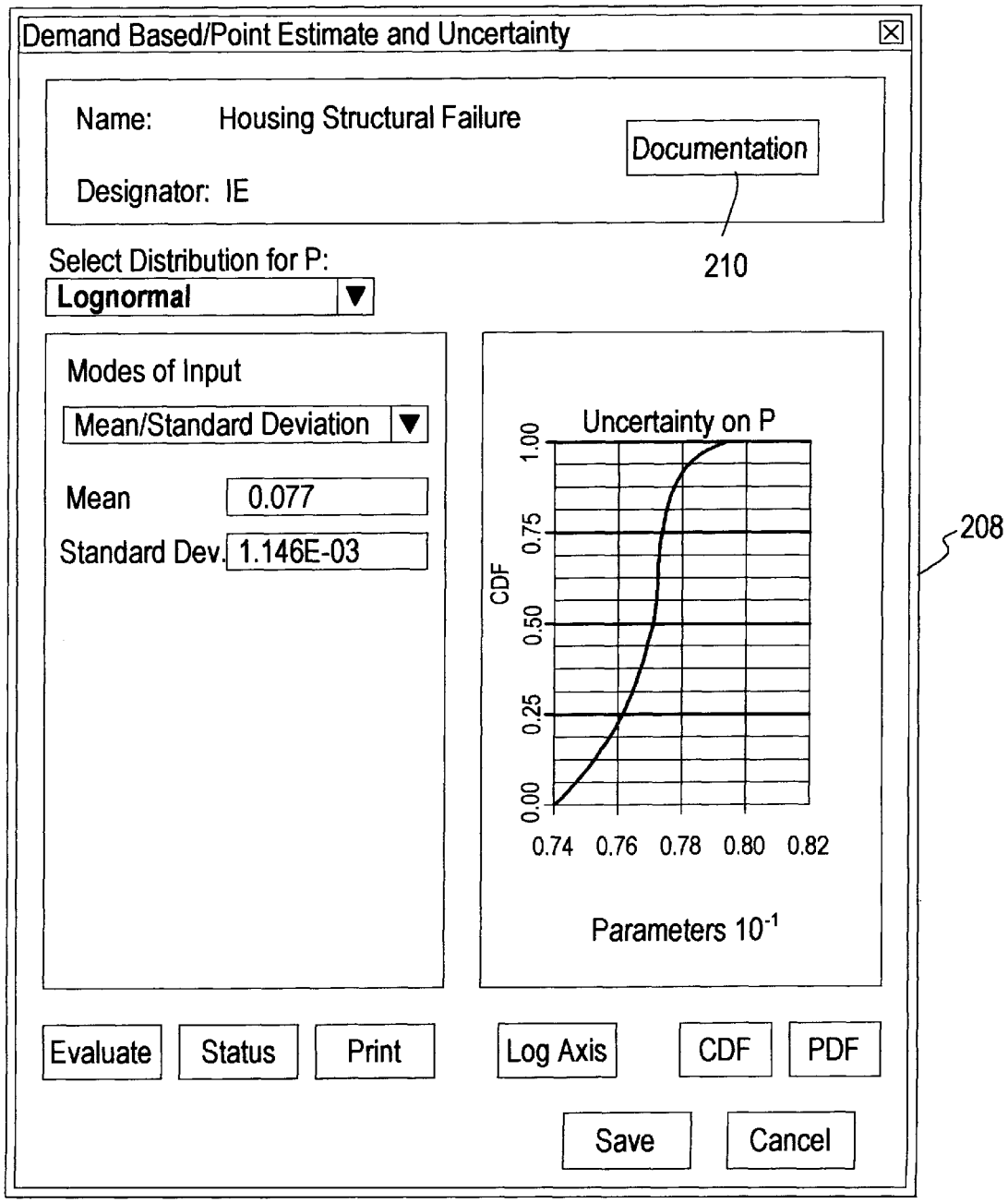
FIG. 26 shows an example of a Demand Based/Point Estimate and Uncertainty (lognormal) screen of QRAS 12.

FIG. 26 shows the Demand Based/Point Estimate and Uncertainty screen 208, which includes a Documentation button 210 for entering documentation. The lognormal distribution for P has been selected, and a graph of the uncertainty on P is displayed. Prior to quantification, a failure mode 68 in the hierarchy 62 has been highlighted. In addition, a probability density function (PDF) and a cumulative density function (CDF) can be selected on screen 208.

Time based. The time based option is self-explanatory.

A detailed description of the failure mode quantification options is provided herein below.

A failure mode must be quantified for each OTI for which it has been made "applicable."

In every quantification option, there is an input screen which contains a "Evaluate" button. "Evaluate" means: verify the legitimacy of the supplied input parameters and create the uncertainty distribution. The evaluate button must be clicked to complete a quantification.

When quantifying a failure mode, an uncertainty distribution on the probability of failure is input. The pull-down menus on various screens provide for allowable parameter combinations to determine the distribution. Once "Evaluate" is clicked, the software will determine if any part of the distribution lies outside the interval [0,1]. A message will appear indicating how much of the distribution will be truncated to fit in [0,1], and what the mean of the new distribution will be, based on this truncation.

The options for "limit state function" and "p as a function of variables" require the user to input a mathematical function. This function must be entered in Mathematica® notation.

5. Creating Event Sequence Diagrams

Event Sequence Diagrams (ESDs) represent the possible propagation of events, given the occurrence of an initiating event. For QRAS 12, "initiating events (IEs)" are synonymous with "failure modes." So, for each failure mode/OTI combination, an ESD 74 is constructed that shows the potential propagation of the initiating event to various "end states." The ESD screen allows the user to construct ESDs, quantify pivotal events, label end states, and store documentation.

An event tree 76 for each ESD 74 is automatically constructed and quantified when the Analysis screen is run. Also note, by definition, a complete path in an event tree is called a "scenario."

To construct an ESD, first highlight a failure mode 68 (in the hierarchy 62). Next, highlight the applicable OTI in the grid (not shown) below the hierarchy. Then, click on the "Event Sequence Diagram" option at the top of the screen. Finally, click on "Build/Edit Event Sequence Diagram" in the pull-down menu (not shown). A green circle (the IE or synonymously, Failure Mode 68) appears, connected to a dotted box—the "place holder." (not shown). There is a floating tool bar 212 on the upper left portion of the Event Sequence Diagram screen 214, shown in FIG. 27. This tool bar 212 contains buttons: an arrow, a pivotal event (square box), a comment (parallelogram), and an end state (diamond). Depressing the arrow will deactivate the other buttons.

One builds the ESD 74 by placing the cursor on a place holder 74-n and clicking. Whatever tool bar 212 symbol button has been depressed will then be placed in the ESD 74-n in lieu of the placeholder. The entire ESD 74 is constructed in this manner. In the example shown in FIG. 27, the Housing Structural Failure 68 is highlighted, and an event sequence diagram 74 is constructed for the Housing Structural Failure 68. The OTI grid 216 is checked by QRAS 12 to construct the ESD 74. The ESD 74 shown in FIG. 27 applies to the Housing Structural Failure 68 for the "Ascent/OTI 1" Phase combination.

Figure 27:
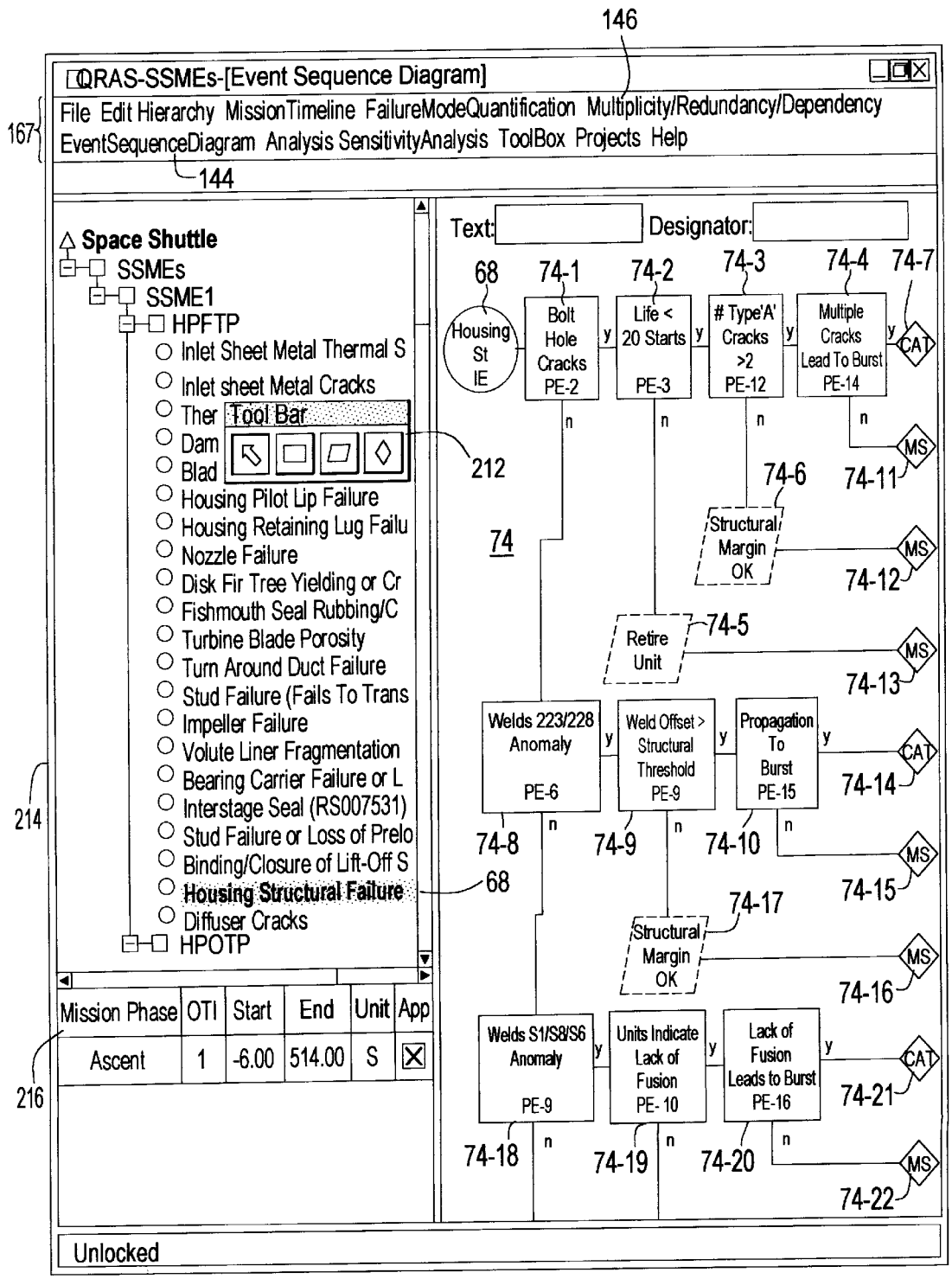
FIG. 27 shows an example of an Event Sequence Diagram Screen of QRAS 12.

There are additional features for inserting, copying, and deleting that appear in the Event Sequence Diagram pull-down menu 144, but which are not shown in FIG. 27.

To quantify and document the ESD pivotal events and to label end states, the pull down menu 144 can be used. Alternatively, click on an ESD element 74-n, and right click. If "select a place holder" message (not shown) appears, it means that the "arrow" in the floating tool bar 212 is not depressed; simply toggle it off. All options pertaining to that symbol will then appear in a pull-down menu.

A "PE Time Duration" option (not shown) is used when quantifying pivotal events with an exponential or Weibull distribution. The option allows the user to change the time duration for the pivotal event. The default is zero, so that the user must supply a time length; if none is supplied, a warning message will be given.

When using a "Copy" (not shown) option, only the structure of the ESD segment will be copied. The quantifications and names will not be copied.

An "Insert" (not shown) feature will insert an ESD symbol 74-n after the symbol that is clicked on.

The user can quantify the failure mode (or, equivalently, "initiating event") in the ESD; however, the quantification and documentation are preferably entered via the "Failure Mode Quantification" option 142 in the top-of-screen menu options 167.

6. Creating/Running an Analysis

Creating/Running an Analysis includes running a standard analysis and running a sensitivity analysis.

6a. Running a Standard Analysis

All standard analyses are run from the "Analysis" 150 top-of-screen menu option 167. Note that the pull-down menu for "Analysis" 150 contains 4 options: Create Baseline; Create/Run Analysis; View Prior Analysis Results; and Delete Baseline. Each of these 4 options is explained below.

6.a.1. Create Baseline. Assume that the hierarchy 62 is newly-established, the mission time line 70 has been newly-created, the failure modes 68 have been newly-quantified 50, and the ESDs 74 have been newly-created. The Baseline of QRAS 12 avoids continually generating scenario simulations, thus avoiding re-constructing and re-simulating all scenarios for each analysis run. Specifically, after all the data are input, the user runs a "Create Baseline" function of QRAS 12, which invokes the Create Fixed Baseline module 56 shown in FIG. 4. The Baseline is then constructed: this consists of the lowest level scenarios, with uncertainties simulated, at the OTI level. Then, when analysis runs are made, the Baseline model is used to "sum-up" the lowest level scenarios to produce the desired analysis.

The user can construct the Baseline in stages. A Baseline will be constructed for whatever level is highlighted in the hierarchy 62 (and, by definition, all lower levels). If other portions of the hierarchy 62 are then highlighted, that portion of the Baseline is constructed and appended to the other Baseline parts already constructed. Similarly, the user can delete portions of the Baseline—for example, if a quantification error was found—and rerun those parts.

Finally, the Baseline can be constructed for only point estimates or point estimates with uncertainty. The point-estimate-only version (which computes the "rare event" approximation) is useful when initially looking over the data; the full uncertainty version is needed to do a complete analysis. Two parameters that apply when generating the uncertainty option are the probability truncation limit and the Monte Carlo sample size. The defaults ($10^{-20}$ and 10,000 trials, respectively) can be changed in the qras.ini file included with QRAS 12.

Once the baseline is established, the baseline-creator can "lock" both the baseline and associated hierarchy/failure modes data/ESD data. This prevents other users from changing the basic data (e.g., a failure mode quantification). To "lock" the baseline and associated data, click on "File" 168 at the top of the screen 167, and then click on the "Lock" option (not shown). The user is then prompted for a password by QRAS 12. To later delete the baseline or modify the hierarchy (or failure mode/ESD data) this password must be supplied.

6.a.2. Create/Run Analysis. First the user highlights the highest level in the hierarchy 62 for which analyses are desired; e.g., highlight a failure mode 68, subsystem 66, element 64, or the root 63. Next the user clicks on "Create/Run Analysis." (not shown), in which the user enters a name for the analysis (the analysis will be saved and can be recalled later under that name) and highlights a phase or contiguous phases for analysis; or selects a "time slice" option (not shown), to create an analysis that contains any portion of the entire mission time line. The user then supplies any textual documentation desired and clicks the "Run" button (not shown). The Results screen 218 shown in FIG. 28 is automatically displayed.

The Results screen 218 contains 3 tabs: Quantitative Results Total 220; Quantitative Results Ranking 222; and Event Trees 224. The Total tab 220 provides the mean estimate of risk and uncertainties. One can highlight a higher or lower level in the hierarchy 62 (provided the analysis encompassed this level) and see the results for that level. (That is, when one runs an analysis at a given level, all analyses at lower levels are also computed). The Ranking tab 2222 provides a ranked list of scenarios (ranked by total mean contribution to risk—at the level highlighted in the hierarchy 62); or ranked by failure mode/initiating event. Risks can also be ranked by the median and by importance measures. One can also examine a scenario in detail by highlighting that scenario and clicking the "View Complete Scenario" button (not shown). To see an individual event tree, note first that each event tree is tagged to a failure mode—OTI combination. So first a failure mode is highlighted and an OTI (in the grid below the hierarchy) is highlighted. Then the Event Trees tab 224 is clicked.

Figure 28:
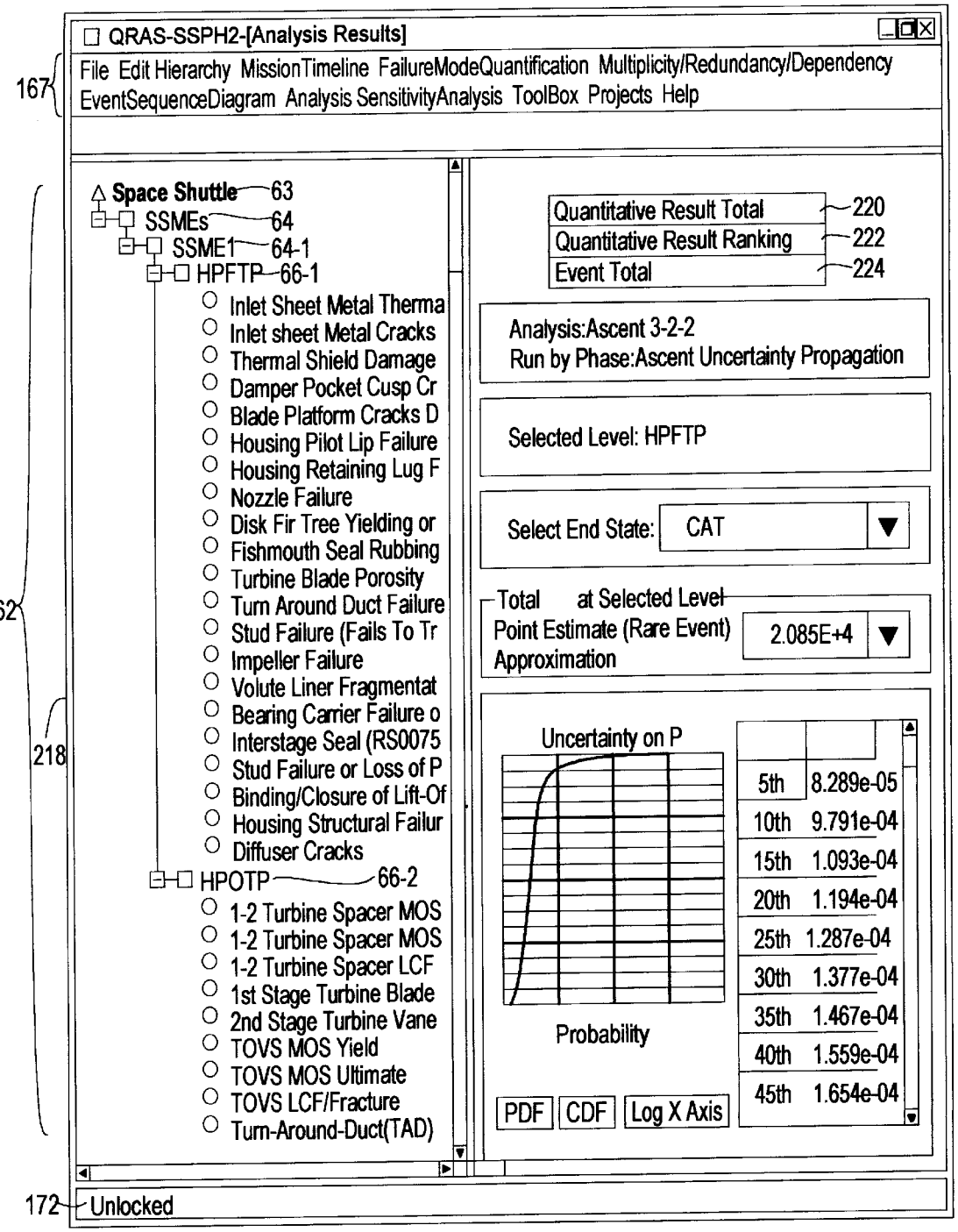
FIG. 28 shows an example of an Analysis Results screen (Quantitative Totals) of QRAS 12.

In the example shown in FIG. 28, the portion for the quantitative totals and uncertainty has been selected. The level selected is the HPFTP, so that the results are for this subsystem 66-1. Highlighting another part of the hierarchy 62 will automatically display the results for that level.

The view prior analysis results and the delete baseline options are self-explanatory based on the remarks above.

6.b. Running a Sensitivity Analysis

A sensitivity analysis, or "what if" analysis, allows the user to change quantifications of failure modes and/or event tree pivotal events, remove failure modes or subsystems; and add failure modes or entire subsystems. These changes are not permanently stored.

To create a sensitivity analysis, first the user highlights a level in the hierarchy 62. This level constitutes the "domain" of the sensitivity analysis; and all sensitivity analyses (for the given run) must be at or below this level. Also, a standard analysis must have been previously run covering this level. The requirement for an existing, stored, standard analysis is needed because the sensitivity analysis will display the original values along with the new sensitivity values.

Figure 29:
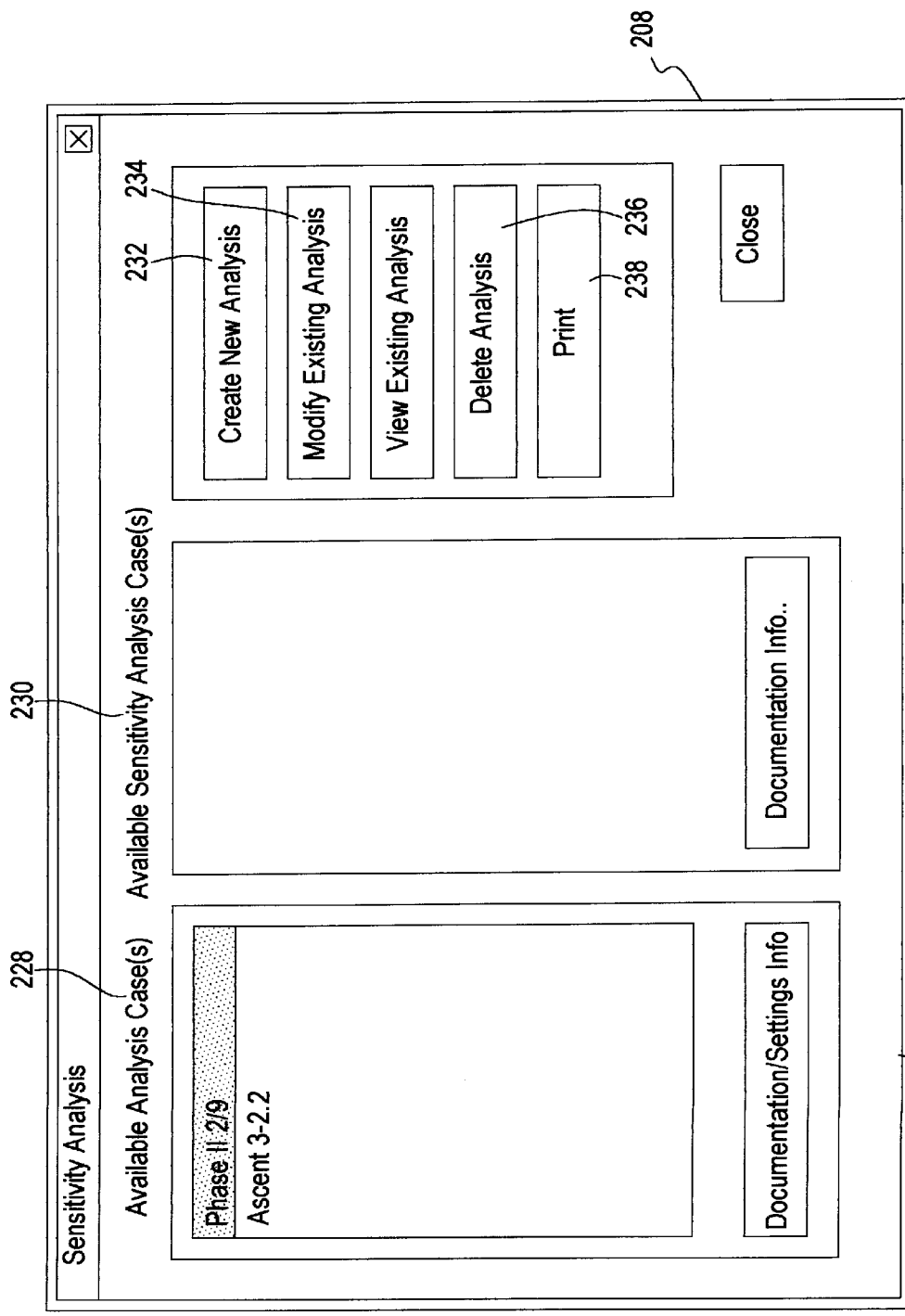
FIG. 29 shows an example of the options for dealing with Sensitivity Analyses of QRAS 12.

Next, the user clicks on the "Sensitivity Analysis" option 156 at the top of the screen 167. A single pull-down menu option of create/modify/view analysis is displayed (not shown). Clicking this menu option yields a Sensitivity Analysis screen 226 shown in FIG. 29 and displaying available standard analyses 228 that apply at the level selected (domain) in the hierarchy, as well as any stored sensitivity analyses 230 that may apply. The Sensitivity Analysis screen 226 shown in FIG. 29 is the screen displaying the main options for viewing/modifying/creating a new analysis.

Any standard analysis 228 conducted at any level above the level highlighted is listed because a standard analysis covers all levels at and below the selected level.

The user creates a new sensitivity analysis by highlighting an "available standard analysis" 228 and clicking the "Create New Analysis" button 232. A Sensitivity Analysis Options screen 242 shown in FIG. 30 with the following options 244, with radio buttons, is displayed:

modify quantification of a failure mode remove a subsystem replace a subsystem with a subsystem from another project remove a failure mode add a failure mode modify event sequence diagram.

First, the user enters a sensitivity analysis name. Then the user selects an option, and clicks "Continue" 246. Subsequent subscreens (not shown) are displayed automatically. After a given option is completed (by completing the subscreens), the main sensitivity option screen 242 is again displayed. The user can then cycle through another change. Once all desired changes are made, the user clicks "Save and Run" 248 or "Save and Do Not Run" 259. The latter will create and save a sensitivity run that can be executed at another time.

Figure 30:
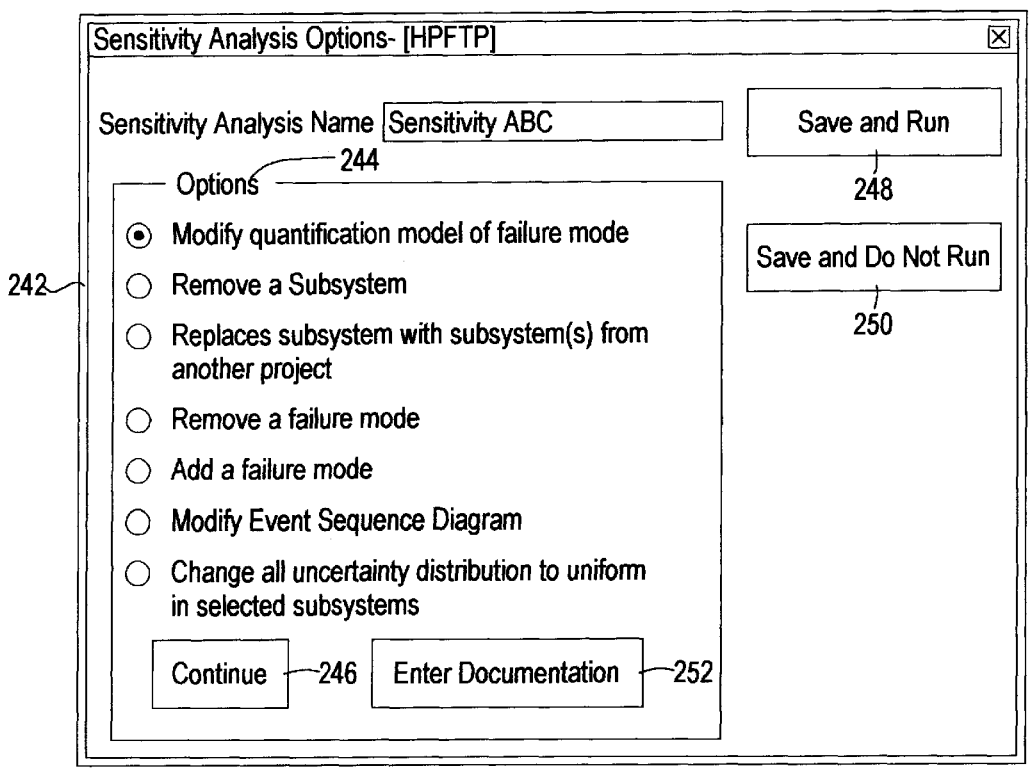
FIG. 30 shows an example of a Sensitivity Analysis Options screen of QRAS 12.

The Sensitivity Analysis Options screen 242, shown in FIG. 30, is the top level options screen for the main types of changes that can be made in an existing risk model for a project 63.

It is important to use the "Enter Documentation" button 252 on the sensitivity options screen. QRAS 12 does not generate, automatically, documentation of the changes made for a given sensitivity run. It is the user's responsibility to document the temporary changes made so that one will know what the sensitivity results are based on.

The analysis results for a sensitivity run are automatically displayed (not shown). The display format is almost identical to the analysis results format, except that both sensitivity quanitifications and rankings are displayed juxtaposed with the compared standard analysis.

The other options on the main sensitivity screen 226 are straightforward. One can modify the already-made changes in a stored sensitivity analysis to create a new analysis 234; and options allow for viewing the results of a prior sensitivity analysis 236. An analysis can be deleted 238 or printed 240. In all cases, the user simply highlights the analysis name and clicks the appropriate button.

7. Tool Box

The Tool Box contains stand-alone programs, either commercially-available or user-developed, that are useful in risk analysis. Two examples of programs in the area are to which links are supplied are: MATHEMATICA; and a BAYESIAN UPDATE PROGRAM.

8. Special Features

There are 2 features that are important for creating or building up "projects" 63, and that were mentioned herein above. These are the "Copy/Paste" and the "Copy/Paste Special" features in the Edit menu 168. These features apply almost exclusively to the hierarchy 62. The foregoing features are not shown, but the functions thereof are discussed.

Assume first that one wants to copy parts of an existing hierarchy internally within a given project. as "Copy" and "Paste" can be used. The user highlights the element 64, or subsystem 66 (a failure mode 68 cannot be copied), and clicks on "copy." Next, the user highlights the element 64 or subsystem 66 below which the group is to be pasted and clicks "paste." The previously copied hierarchy structure will be pasted. If one wants to copy not only the hierarchy structure 62, but also the failure mode quantifications, OTIs, and ESDs, the user uses "Paste Special" rather than "Paste." The above features will thus allow duplication internally within a hierarchy.

The phrase "below which" used in describing the copy and paste features is explained. If, for example, one wants to copy a another subsystem as part of an Element, highlight the Element; the subsystem will be copied as the last subsystem under the Element. One does not highlight a subsystem under the Element and seek to copy the source subsystem below this highlighted subsystem. Assume now one wants to copy parts (or all) of a hierarchy from one project to another distinct project. (Assume that both projects reside on the same computer, within the QRAS 12 directory). Noting that more than a single project can be "open" in QRAS, use the same method(s) noted above. In this way, new projects or parts of projects be directly added to a hierarchy to build-up a model.

When using "Paste Special" between projects, the phases for the mission time line of the source and target projects should match (the system only requires that the numbers of the source project does not exceed the number of phases of the target project). The QRAS 12 will check and alert the user if the number phases of the source is greater than that of the target project. The QRAS 12 will not check to see that the actual phase times are identical. The target phases will be used. Because OTIs are defined at the subsystem level, the OTIs are transferred directly.

Finally, suppose a user has created a project and wishes to transfer the project to another user on another computer. Attaching a project via e-mail is not satisfactory because a "project" is a folder containing approximately 125 files, and each would have to be attached separately. The user can, however, transfer the project folder via a File Transfer Protocol (FTP) program. In this way, any project can be transferred to any other user. (Code Q is establishing an FTP server site for this purpose).

One can create a copy of a project to modify that does not contain a baseline, and hence does not have a locked hierarchy, mission time line, etc. First, create a new project. Then add mission phases to the new project (this is necessary because the Paste Special feature will check to insure an equal number of phases between projects). Finally, use Paste Special to copy the source project into the new project.

"Copy/Paste," "Copy/Paste Special," and FTP are useful in dealing with system/subsystem upgrades. For example, once a system is modeled, a user can develop an upgraded subsystem. The original subsystem can be deleted and the upgraded subsystem can then be pasted into the model—to assess risk impact.

9. Failure Mode Quantifications are discussed in detail.

Failure mode models are input in any of the following forms:

9.a. Point estimate and uncertainty

Quantification is in the form of a point estimate and an uncertainty density function (with parameters specified) from Table 2. In some cases, parameters or percentile bounds are given to characterize the uncertainty distribution (so, in these cases, specification of a point estimate is not needed).

9.b. Function of physical variables

Quantification is in the explicit form $p=f(x_1, \ldots, x_k)$ where p is a real-valued function in [0,1], the $x_i$ (i=1 to k) represent physical variables, each with an uncertainty density function (chosen from Table 2) which describes the probability of the allowed physical values, and $k \leq 3$.

TABLE 2

Uncertainty Density Functions and Parameters to be Specified

| Density Function | Specify the one of the following parameters sets: |
|---|---|
| Uniform | Mean and standard deviation; mean and maximum; maximum and minimum; 5th and 95th percentiles |
| Normal | Mean and standard deviation; 5th and 95th percentiles |
| Lognormal | Mean and standard deviation; mean and error factor; median and error factor; 5th and 95th percentiles |
| Triangular (symmetrical) | Mean and standard deviation; maximum and minimum |
| Beta | Mean and standard deviation; 5th and 95th percentiles; $x_0$ and $s_0$ parameters (failures, successes) |
| Gamma | Mean and standard deviation; 5th and 95th percentiles; shape ($\alpha$) and scale ($\beta$) parameters |
| Weibull | Mean and standard deviation; scale ($\alpha$) and shape ($\beta$) parameters |
| Discrete | Number of intervals ($\leq 20$) and end point for each interval to form a histogram |

The Density Functions shown in Table 2 are individually conventional and individually known, but the tools/options to enter the parameters and the uncertainties do not exist in other software packages.

9.c. Predefined functions for p

Quantification, as in b., above, is in the form $p=f(x_1, \ldots, x_k)$ with $k \leq 3$. But in this case standard "canned" functions are specified from the following list:

(1) Logistic Regression Model: $p=f(_1, \ldots, x_k)=1/(1+1/\exp(a_0+a_1x_1, \ldots, a_kx_k))$. Specified are the variables, $x_1, \ldots, x_k$, their associated $a_i$ parameters, and density functions (chosen from Table 2) for the $x_i$.

(2) Discrete function:

$$p = f(x_1, \ldots, x_k) = \begin{pmatrix} c_1 \\ \ldots \\ c_j \end{pmatrix}.$$

Specified are the intervals and the constant values on each interval. Also specified are density functions for each $x_i$ from Table 2.

9.d. Limit state function

Quantification is in the form of a limit state function, $g(x_1, \ldots, x_k)$. This function has the property that g smaller than a limit value, $c_0$ (a constant, usually 0), denotes failure ($g \geq c_o$ denotes success). The probability of failure is therefore $p=\text{Prob}[g<c_o]$. Specified are:

(1) the function g;
(2) the limit value, $c_o$; and
(3) the uncertainty density functions (chosen from Table 2) for each variable $x_i$.
(4) The uncertainty density around the point estimate for the probability of $g<c_o$; the options are:
 (a) Lognormal: probability of $g<c_o$ is assumed to be the median; user specifies the error factor.
 (b) Uniform: probability of $g<c_o$ is assumed to be the mean $\mu$; user can specify min as $k\mu$, where $0 \leq k<1$. k is specified by the user.
 (c) Beta: with probability of $g<c_o$ assumed to be the mean $\mu$; and N is specified, where N represents the sample size (as $\mu$=f/N, where f is viewed as the number of failures. In this way the uncertainty expands or contracts, based upon the decreasing or increasing size of N, respectively).

9.e. Reliability for time interval [0,$t_o$]

For a given failure mode, the probability of failure for the time period of operation is specified; e.g., probability of failure over 128 seconds for an SRB failure mode. Let $R(t;\alpha_1, \ldots \alpha_k)$ denote a reliability function, with parameters $\alpha_i$, for example, $R(t;\lambda)=\exp(-\lambda t)$. Note now that if a subsystem functions for a time $t_o$, the reliability at $t=t_o$ is simply $R(t_o;\lambda)$ and the failure probability is $1-R(t_o;\lambda)$. This is the value specified, as a point estimate. The precise form of the reliability function, $R(t;\alpha_1, \ldots, \alpha_k)$, must be specified along with the uncertainty as a density function for each parameter $\alpha_i$ of R from Table 2.

9.f. Reliability function (exponential)

Similar to e., above, but based on an exponential reliability function:

$$R(t)=e^{-\lambda t}$$

The mean failure rate, $\lambda$, is specified, along with an uncertainty about $\lambda$ from the density options in Table 2.

9.g. Reliability function (piecewise exponential)

Quantification is in the form of a piecewise exponential reliability function:

$$R(t)=e^{-\lambda_1 t} \text{ for } t \leq t_1$$

$$R(t)=e^{-\lambda_1 t_1}e^{-\lambda_2(t-t_1)} \text{ for } t_1 < t \leq t_2 \text{ etc.}$$

Specified are:

(1) Time intervals,: start and end times, $t_i$, for each. Note that there is a limit of 3 time intervals.

For each interval i, an uncertainty density for $\lambda_i$ is specified from Table 2.

9.h. Reliability function (Weibull)

R(t) is given as:

$$R(t) = e^{-\left(\frac{t}{\alpha}\right)^\beta}$$

where $\alpha$ is the scale parameter and $\beta$ is the shape parameter.

Both $\alpha$ and $\beta$ are specified along with their respective uncertainty densities—chosen from Table 2.

Summary

In summary, the present invention QRAS 12 provides hierarchical decomposition of a system—from top level down to elements (these are "collections" of subsystems), to subsystems down to failure failures—that serves as both the visual organization and internal link to: quantification, event sequence diagrams, analysis, and sensitivity features.

The QRAS 12 system is an integration of: Hierarchy; Mission Time Line (System and subsystem times of functioning); Failure Mode Quantifications and ensuing scenarios (Event Sequence Diagrams); Multiplicity/Redundancy/Dependency structure; an Analysis module; a Sensitivity Module; and a Stand-alone "Tool Box".

Further, QRAs 12 is an integration of all the following in a single linked unit: a) system decomposition (with multiplcities, redundancies, dependencies); b) subsystem times of functioning and global top level system "phases" (mission time line); c) failure mode quantification and documentation (per element, subsystem, failure mode, and ensuing pivotal events); d) event sequence diagrams; e) analysis module (to allow, at any hierarchy level—and below, automatically—a presentation of the risk—by end state—with uncertainties; a ranking by failure mode, scenario, sybsystems based on mean, median, uncertainty); and f) an multiple sensitivity analyses based an analysis run, allowing changes in multiple parts of the original risk model.

Further, QRAS 12 uses Event Sequence Diagrams (as distinguished from event trees (event trees are automatically generated)) and links these to the failure modes (equivalently, "initiating events.").

In addition, QRAS 12 is user-friendly and provides a wide variety of quantification options—incorporating both standard reliability quantifications, standard and some nonstandard (e.g., "conditional") failure probability quantifications, and probabilistic fast probability integration (FPI) engineering design methods. Each option allows for inclusion of uncertainties in estimates. QRAS 12 includes a documentation feature integrated with the actual quantified model—and automatically calls a text editor for documentation input; and stores images. Thes features are easily accessed through the hierarchy and the applicable risk model module (e.g., Failure Mode Quantification).

Further features included in QRAS 12 are summarized herein below.

To facilitate speed and ease of analysis, simulations at the lowest possible level are generated only once and stored as a "Baseline." Other analyses then access this "Baseline"—rather than recreating all fundamental simulations again for each analysis. Analyses are stored and serve as a comparison for any sensitivity runs. That is sensitivity analyses are not viewed as independent runs—but are compared with an original stored analysis run. Also, the Baseline is not changed by a sensitivity run. It is fixed.

To enable use by multiple engineers/analysts, the risk model (hierarchy, mission time line, quantifications, ESDs, Baseline, etc.) is "locked"—using a user-supplied password. Thus, no inadvertent changing of the primary model data can occur. This, in turn, ensures that all runs and results obtained are consistent across users.

QRAS 12 includes a Risk Analysis Based Copy/Paste Feature which allows copying the hierarchy/quantifications/ and event sequence diagrams (or just the hierarchy structure) both within a "project" and across "projects. A benefit is that this allows different users to develop different parts of a risk model (e.g. a subsystem of a larger system) and then another individual can assemble the entire model. (see below). Also, coupling this feature—across projects—with the use of File Transfer Protocol (FTP) allows a project created by any user at one computer machine to be used by another user on a different computer machine.

The software architecture and flow of the QRAS 12 are organized so that both a skilled engineer/analyst or a high level manager can develop, access, and/or view the estimated risk values, uncertainties ranking and risk model documentation of a complex engineered system.

The QRAS 12 provides a Mission Time Line which serves to partition the global system operation (into contiguous "Phases"), and to both communicate the operational time intervals (OTIs) for each subsystem and to allow (automatically) failure mode/reliability quantifications based on time—without reentering time values.

The QRAS 12 design allows finer gradations of time intervals for quantification—by allowing Phases (contiguous, discreet intervals of system operation) and subsystem "Operational Time Intervals" (OTIs) that provide for tagging failure modes to particular time intervals for each subsystem within the large system Phases.

Regarding statistical density failure mode quantification, the QRAS 12 allows specification of one of a set of parameters that uniquely characterize the distribution; automatically, other sets of parameters that would also characterize the distribution are computed internally and displayed for the user.

For uncertainty density computation and truncation by QRAS 12: when a user enters parameters to characterize an uncertainty distribution (which must lie in the interval [0,1]), software will determine what percentage of distribution must be truncated so that is in the [0,1,] interval and display message along with new computed mean value.

QRAS 12 allows a copy/paste feature with event sequence diagrams.

For multiplicity and redundancy: QRAS 12 uses a simple schema via the Hierarchy to indicate and internally compute risk for multiple "elements," "subsystems," and failure modes; in a similar hierarchy modification, QRAS 12 handles redundancy within the same type of unit.

For multiplicity in QRAS 12: element, subsystem, or failure mode X is displayed in the Hierarchy as X(k), where k is the Multiplicity; Redundancy: subsystem X is displayed as X(k-of-n), where k out of n are required for success.

Generally, QRAS 12 provides a unique method to handle multiplicities and redundancies for subsystems (and failure mode for multiplicities) by having a graphical entry of an integer into a system hierarchical decomposition.

For dependency in QRAS 12: Based on design of combining the Hierarchy with a "fault tree-behind-the-hierarchy"—to handle dependencies between differing elements and/or subsystems; and the inclusion of a screen with "$\beta_{cat}=$" and "$\beta_{PermFailure}=$" to handle "Common Cause" beta factors.

The analysis feature in QRAS 12 allows running software at a given level of the hierarchy and generating analysis results at that level and all lower levels.

In addition, QRAS 12 provides the ability to store and recall prior analyses; similar feature for sensitivity analyses.

QRAS 12 also provides the capability to perform Sensitivity Analyses, with features including:
  (a) —change failure mode quantification;
  (b) —change ESD;
  (c) —delete failure mode;
  (d) —delete subsystem;
  (e) —replace subsystem with subsystem from another project;
  (f) —modify redundancy, multiplicity, or common cause dependency beta value.

The "Tool Box" Feature of QRAS 12: Allows stand-alone programs to be added to the software platform. Tool Box, itself, is a repository and functions as an interface to these stand-alone programs.

Further, the QRAS 12 Platform is integrated with Mathematica.

Also, QRAS 12 provides a Baseline with a capability to selectively delete parts of the Baseline and reestablish— without deleting remaining parts of the Baseline.

Analysis computations for ranking risks by both individual scenarios or collectively by failure mode is provided by QRAS 12. QRAS 12 collects all scenarios initiated by a given failure mode. QRAS 12 also ranks risk by subsystem; in all rankings, the basis is by by median, by mean, or by uncertainty.

QRAS 12 provides for determination of risk by various End States (e.g., catastrophic end state for system; permanent failure of a subsystem).

QRAS 12 also provides risk ranking: by mean; median; uncertainty measures.

Report Feature to printout the entire risk model (or selective parts) in total is provided by QRAS 12.

In addition to printing all analysis results, QRAS 12 provides the capability to export electronic analysis files— for use in other reports or to transfer electronically.

In QRAS 12, there is an organization of models by "Project." Each project is self-contained, and multiple projects may be opened and used together. The discrete, self-contained set-up of each project means that a project received from one user is directly usable by another user.

QRAS 12 also provides an embedded text editor (for documentation) and uniformity of documentation via a fixed format text document that is called-up when the failure mode documentation feature is accessed.

Further in QRAS 12 are Functional Subsystem Groupings, which is a feature to allow grouping various elements and/or subsystems and/or failure modes in the hierarchy viewed as performing a specific function (e.g., "propulsion") and determining the risk and risk rankings by this functional grouping.

In QRAS 12, quantifications of failure modes allow not only absolute probabilities, but conditional probabilities. This is integrated with the multiple "Phases" time line.

An event tree automatically generated by QRAS 12 from Event Sequence Diagrams, and can be viewed as part of the analysis module. While fault trees handle only a single type of "end state" failure for a given tree, and software links fault trees to event trees by tagging fault trees to the underlying event tree initiating and pivotal events (in the event tree, or ESD), QRAS 12 views fault trees at a higher level (rather than a lower level) and essentially uses the event tree (or ESD) scenarios to propagate up the fault tree. In this way, different types of "end states" are considered by QRAS 12.

QRAS 12 also provides a "Time Slice" Feature: Given Phases, the design allows for analysis combining phases and by "slicing" between phases: e.g., given [start, stop]$_1$, [start, stop]$_2$, [start, stop]$_3$ as representing Phases 1, 2, 3 respectively, can specify a Start time within Phase 1 and a Stop time within Phase 3 and risks are computed for this period of a globally specified Start and Stop time.

While current software can rank scenarios or failure modes, the QRAS 12 also allows ranking at higher levels— by subsystems, clusters of subsystems, functional groupings of subsystems. Also, because the Hierarchy allows multiple "indentations" (or subsystems of subsystems), one can group failure causes under a "subsystem" and thus rank a set of failure causes for a higher level failure mode in QRAS 12.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus assessing risk of failure of a system, said apparatus comprising:
  a build risk model module building a risk model of the system, said risk model including an element/ subsystem/failure mode hierarchy, a mission timeline linked with the hierarchy by indicating what are phases for global system functioning and providing time intervals for failure modes for each subsystem, mulitiplicities, redundancies, and dependencies across the system and at a subsystem level and above by an embedded fault tree behind the hierarchy, a failure mode quantification, event sequence diagrams that link with initiating events of the event sequence diagrams being the failure modes in the hierarchy, tagged by Phase and operational time intervals of the respective subsystems;

a create fixed baseline/generate analysis runs module, coupled to the build risk model module, creating a fixed baseline of the system that generates and stores the lowest-level scenarios of the risk model preserved in event-tree structure, with linkage via the hierarchy to time-based or demand-based quantification, and providing for multiple user-defined analysis runs using the fixed baseline; and a perform sensitivity analysis module, coupled to the create fixed baseline/generate analysis runs module, altering any of the components or combination thereof that are fundamental to construct the baseline without modifying the baseline itself, and using an existing analysis run, generating the sensitivity run with the user-supplied sensitivity changes, presenting both the original runs and the new sensitivity-derived results.

2. The apparatus according to claim 1, wherein the build a risk model module further comprises a create mission timeline module creating the mission timeline of the system comprising top level, contiguous phases for the system and multiple operational time intervals for each discrete subsystem, wherein the create mission timeline module tags failure modes to the operational time intervals.

3. The apparatus according to claim 2, wherein the build risk model module further comprises a quantify failure modes/documentation module quantifying the failure modes of the system tagged to the operational time intervals and storing documentation displayed upon user request.

4. The apparatus according to claim 3, wherein the build risk model module further comprises a build and quantify ESDs module building and editing event sequence diagrams tagged to the operational time intervals and phases.

5. The apparatus according to claim 4, wherein the build risk model module further comprises an include multiplicities, dependencies, and redundancies module which includes in the risk model the multiplicities, dependencies, and redundancies of the system at the element, and/or subsystem, and/or failure mode levels.

6. The apparatus according to claim 5, wherein the create fixed baseline/generate analysis runs module determines the probabilities of failure over scenarios and ranks risks by subsystems or failure modes using fundamental units of failure.

7. The apparatus according to claim 6, wherein risks are ranked by end states.

8. The apparatus according to claim 5, wherein the build and quantify ESDs module automatically generates event trees from the event sequence diagrams.

9. The apparatus according to claim 5, wherein the hierarchy is combined with the fault tree behind the hierarchy to account for dependencies between differing elements or subsystems.

10. The apparatus according to claim 9, wherein risk models are organized by project independent of other projects.

11. The apparatus according to claim 9, wherein a percentage of distribution which must be truncated to allow uncertainty between 0 and 1, inclusive, is determined and a corresponding message is displayed to the user.

12. The apparatus according to claim 9, further comprising a toolbox including a set of internal codes/programs quantifying, off-line, the components of the risk model.

13. The apparatus according to claim 1, wherein the element/subsystem/failure mode hierarchy comprises a multiplicity number k corresponding to an element, a subsystem, or a failure mode of the element/subsystem/failure mode hierarchy, and that the corresponding element, the corresponding subsystem, or the corresponding failure mode is accounted for k times in the element/subsystem/failure mode hierarchy by the risk model.

14. The apparatus according to claim 1, wherein the baseline is locked and unlocked using a password.

15. A method of assessing risk of failure of a system, said method comprising:

building a risk model of the system by a build risk model module, said risk model including an element/subsystem/failure mode hierarchy, a mission timeline linked with the hierarchy by indicating what are phases for the system functioning and providing time intervals for failure modes for each subsystem, mulitiplicities, redundancies, and dependencies across the system and at the subsystem level and above by an embedded fault tree behind the hierarchy, a failure mode quantification, event sequences diagrams that link the initiating events of the event sequence diagrams with the failure modes in the hierarchy, tagged by Phase and operational time intervals of the respective subsystems; and analyzing risk in the system by creating a fixed baseline of the system and providing for individual risk analyses by accessing the baseline and tagged to levels of the hierarchy, said fixed baseline generating and storing the lowest-level scenarios of the risk model preserved in event-tree structure, with linkage via the hierarchy to time-based quantification, and providing for multiple user-defined analysis runs using the fixed baseline by altering the components or combinations thereof that are fundamental to construct the baseline without modifying the baseline itself with user-supplied sensitivity changes, and using an existing stored analysis run, generating a sensitivity run with the user-supplied sensitivity changes, presenting both the original run and the new sensitivity-derived results.

16. The method according to claim 15, wherein the mission timeline comprises top level, contiguous phases for the system and multiple operational time intervals for each discrete subsystem, and wherein the the failure modes are tagged to the operational time intervals.

17. The method according to claim 16, wherein building a risk model further comprises quantifying the failure modes of the system tagged to the operational time intervals and storing documentation displayed upon user request.

18. The method according to claim 17, wherein building a risk model further comprises building event sequence diagrams tagged to the operational time intervals and automatically generating event trees displayed on individual analysis runs.

19. The method according to claim 18, wherein building a risk model further comprises including multiplicities, dependencies, and redundancies, at the element, subsystem, or failure mode levels.

20. The method according to claim 15, wherein the element/subsystem/failure mode hierarchy comprises a multiplicity number k corresponding to one of an element, a subsystem, and/or a failure mode of the element/subsystem/failure mode hierarchy, and that the one of the element, the subsystem, and/or the failure mode are accounted for k times in the element/subsystem/failure mode hierarchy by the risk model, and having a fault tree capability behind the hierarchy to handle failure, redundancy, dependency of the elements and/or subsystems, across differing elements and/or subsystems.

21. The method according to claim 20, further comprising addressing common cause failures by the inclusion of a $\beta$ factor.

22. A computer-readable medium storing a program, said program directing a computer to assess risk of failure of a system by executing the steps of:

building a risk model of the system by a build risk model module, said risk model including an element/subsystem/failure mode hierarchy, a mission timeline linked with the hierarchy by indicating what are phases for the system functioning and providing time intervals for failure modes for each subsystem, mulitiplicities, redundancies, and dependencies across the system and at the subsystem level and above by an embedded fault tree behind the hierarchy and inclusion of k or k-of-n in the hierarchy decomposition levels, a failure mode quantification, event sequences diagrams that link initiating events of the event sequence diagrams with the failure modes in the hierarchy, tagged by Phase and operational time intervals of the respective subsystems; and analyzing risk in the system by creating a fixed baseline of the system and providing for individual risk analyses by accessing the baseline and tagged to levels of the hierarchy, said fixed baseline generating and storing the lowest-level scenarios of the risk model preserved in event-tree structure, with linkage via the hierarchy to time-based and demand-based quantification, and providing for multiple user-defined analysis runs using the fixed baseline, and using an existing analysis run, generating a sensitivity run by altering any of the components or combination thereof that are fundamental to construct the baseline without modifying the baseline itself with the user-supplied sensitivity changes, presenting both the original runs and the new sensitivity-derived results.

23. The computer-readable medium according to claim 22, wherein building a risk model further comprises creating a mission timeline comprising top level, contiguous phases for the system and multiple operational time intervals for each discrete subsystem, wherein the create mission timeline module tags failure modes to the operational time intervals, by phase.

24. The computer-readable medium according to claim 23, wherein building a risk model further comprises quantifying the failure modes of the system tagged to the operational time intervals and storing documentation displayed upon user request.

25. The computer-readable medium according to claim 24, wherein building a risk model further comprises building event sequence diagrams tagged to the operational time intervals and automatically generating event trees displayed on individual analysis runs, and quantifying the pivotal events in the event sequence diagrams, selecting various end states, and allowing for documentation of the pivotal events and initiating event.

26. The computer-readable medium according to claim 25, wherein building a risk model further comprises including multiplicities, dependencies, and redundancies, at the element, subsystem, or failure mode levels linked directly to the hierarchy.

27. The computer-readable medium according to claim 22, wherein the element/subsystem/failure mode hierarchy comprises a multiplicity number k corresponding to an element, a subsystem, and/or a failure mode of the element/subsystem/failure mode hierarchy, and that the element, the subsystem, and/or the failure mode are accounted for k times in the element/subsystem/failure mode hierarchy by the risk model, and having a fault tree capability behind the hierarchy to handle failure, redundancy, dependency of the elements and/or subsystems, across differing elements, and/or subsystems.

28. The computer-readable medium according to claim 27, further comprising addressing common cause failures by the inclusion of a first $\beta$ factor for common cause failures that are directly catastrophic, and a second $\beta$ factor for permanent but non-catastrophic failures which, in combination, lead to catastrophic failures.

* * * * *